(12) United States Patent
Saito et al.

(10) Patent No.: US 10,694,396 B2
(45) Date of Patent: Jun. 23, 2020

(54) RELAY DEVICE, TERMINAL DEVICE, COMMUNICATION CONTROL DEVICE, AND METHOD

(71) Applicant: SONY CORPORATION, Tokyo (JP)

(72) Inventors: Shin Saito, Kanagawa (JP); Fumio Teraoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/071,752

(22) PCT Filed: Oct. 27, 2016

(86) PCT No.: PCT/JP2016/081953
§ 371 (c)(1),
(2) Date: Jul. 20, 2018

(87) PCT Pub. No.: WO2017/130495
PCT Pub. Date: Aug. 3, 2017

(65) Prior Publication Data
US 2019/0037414 A1    Jan. 31, 2019

(30) Foreign Application Priority Data
Jan. 29, 2016   (JP) ................................ 2016-016599

(51) Int. Cl.
| | | |
|---|---|---|
| *H04W 16/26* | (2009.01) | |
| *H04W 8/26* | (2009.01) | |
| *H04W 80/04* | (2009.01) | |
| *H04W 84/00* | (2009.01) | |

(52) U.S. Cl.
CPC ............ *H04W 16/26* (2013.01); *H04W 8/26* (2013.01); *H04W 80/04* (2013.01); *H04W 84/00* (2013.01)

(58) Field of Classification Search
None
See application file for complete search history.

(56) References Cited

U.S. PATENT DOCUMENTS

| | | | |
|---|---|---|---|
| 8,228,861 B1* | 7/2012 | Nix ....................... | H04W 36/00 370/329 |
| 2009/0207856 A1* | 8/2009 | Makela ............... | H04W 40/248 370/474 |

(Continued)

FOREIGN PATENT DOCUMENTS

| | | |
|---|---|---|
| EP | 2 661 127 A1 | 11/2013 |
| JP | 2015-522963 A | 8/2015 |

OTHER PUBLICATIONS

3GPP TS 36.300 version 12.8.0 Release 12; ETSI TS 136 300 V12.8.0, LTE: Evolved Universal Terrestrial Radio Access (E-UTRA) and Evolved Universal Terrestrial Radio Access Network (E-UTRAN); Overall Description; Stage 2, Jan. 2016.

(Continued)

*Primary Examiner* — Lonnie V Sweet
(74) *Attorney, Agent, or Firm* — Xsensus LLP

(57) ABSTRACT

A mechanism related to a relay node in consideration of movement. The relay device includes: a relay unit that relays a wireless signal between a first device that is a connection destination and one or more subordinate second devices; and a control unit that assigns a network layer IP address, which has a prefix portion that is at least partially common, to each of the one or more second devices.

7 Claims, 45 Drawing Sheets

(56) References Cited

U.S. PATENT DOCUMENTS

| | | | |
|---|---|---|---|
| 2010/0095007 A1* | 4/2010 | Cherian | H04W 80/045 709/227 |
| 2012/0178450 A1* | 7/2012 | Kuru | H04W 36/08 455/436 |
| 2013/0182644 A1* | 7/2013 | Kim | H04W 28/0215 370/328 |
| 2014/0204832 A1 | 7/2014 | Van Phan et al. | |
| 2015/0351141 A1* | 12/2015 | Naoe | H04W 8/26 370/329 |
| 2016/0036772 A1* | 2/2016 | Pratapa | H04L 61/2061 709/245 |
| 2016/0150454 A1* | 5/2016 | Kephart, Jr. | H04W 36/18 455/442 |
| 2016/0330077 A1* | 11/2016 | Jin | H04L 41/0806 |

OTHER PUBLICATIONS

Extended Search Report issued in European Application 16888080.5-1214 dated Oct. 17, 2018.

* cited by examiner

FIG. 14

| Container ID | Description (Network to MS Direction) |
|---|---|
| 0001H | P-CSCF IPv6 Address Request |
| 0002H | IM CN Subsystem Signaling Flag |
| 0003H | DNS Server IPv6 Address Request |
| 0004H | Policy Control rejection code |
| 0005H | Selected Bearer Control Mode; |
| 0006H | Reserved |
| 0007H | DSMIPv6 Home Agent Address |
| 0008H | DSMIPv6 Home Network Prefix |
| 0009H | DSMIPv6 IPv4 Home Agent Address |
| 000AH | reserved |
| 000BH | reserved |
| 000CH | P-CSCF IPv4 Address |
| 000DH | DNS Server IPv4 Address |
| 000EH | MSISDN Request |
| C021H | LCP (refer to RFC 3232) |
| C023H | PAP (refer to RFC 3232) |
| C223H | CHAP (refer to RFC 3232) |
| 8021H | IPCP (refer to RFC 3232) |
| FF00H | FFFFH reserved for operator specific use. |

RELAY DEVICE, TERMINAL DEVICE, COMMUNICATION CONTROL DEVICE, AND METHOD

TECHNICAL FIELD

The present disclosure relates to a relay device, a terminal device, a communication control device, and a method.

BACKGROUND ART

In a cellular network, a relay device called a relay node has been designed. The relay node is located between a base station and a user terminal and has a function of relaying wireless communication. For example, a standard related to the relay node in 3GPP has been examined in the following Non-Patent Literature 1.

CITATION LIST

Non-Patent Literature

Non-Patent Literature 1: 3GPP TS 36.300 Release 12 V12.8.0 (2016-01) Evolved Universal Terrestrial Radio Access (E-UTRA) and Evolved Universal Terrestrial Radio Access Network (E-UTRAN); Overall description; Stage 2

DISCLOSURE OF INVENTION

Technical Problem

However, in the above Non-Patent Literature 1, the relay node is assumed to be fixed and a standard in which the relay node is assumed to move is not described. Therefore, it is desirable to provide a mechanism related to a relay node in consideration of movement.

Solution to Problem

According to the present disclosure, there is provided a relay device including: a relay unit that relays a wireless signal between a first device that is a connection destination and one or more subordinate second devices; and a control unit that assigns a network layer IP address, which has a prefix portion that is at least partially common, to each of the one or more second devices.

In addition, according to the present disclosure, there is provided a terminal device including: a processing unit that performs communication with a relay device by using a first network layer IP address, which is assigned to one or more terminal devices connected to the same relay device, and has a prefix portion that is at least partially common.

In addition, according to the present disclosure, there is provided a communication control device including: a processing unit that notifies a relay device that relays a wireless signal between a first device that is a connection destination and one or more subordinate second devices and assigns a network layer IP address, which has a prefix portion that is at least partially common, to each of the one or more second devices of the common portion of the prefix portion.

In addition, according to the present disclosure, there is provided a method including: relaying a wireless signal between a first device that is a connection destination and one or more subordinate second devices; and a control unit that assigns a network layer IP address, which has a prefix portion that is at least partially common, to each of the one or more second devices by a processor.

In addition, according to the present disclosure, there is provided a method including: performing, by a processor, communication with a relay device by using a first network layer IP address, which is assigned to one or more terminal devices connected to the same relay device, and has a prefix portion that is at least partially common.

In addition, according to the present disclosure, there is provided a method including: notifying, by a processor, a relay device that relays a wireless signal between a first device that is a connection destination and one or more subordinate second devices and assigns a network layer IP address, which has a prefix portion that is at least partially common, to each of the one or more second devices of the common portion of the prefix portion.

Advantageous Effects of Invention

According to the present disclosure, a mechanism related to a relay node in consideration of movement is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is an explanatory diagram of technical features in the embodiment.

MODE(S) FOR CARRYING OUT THE INVENTION

Figure 1:
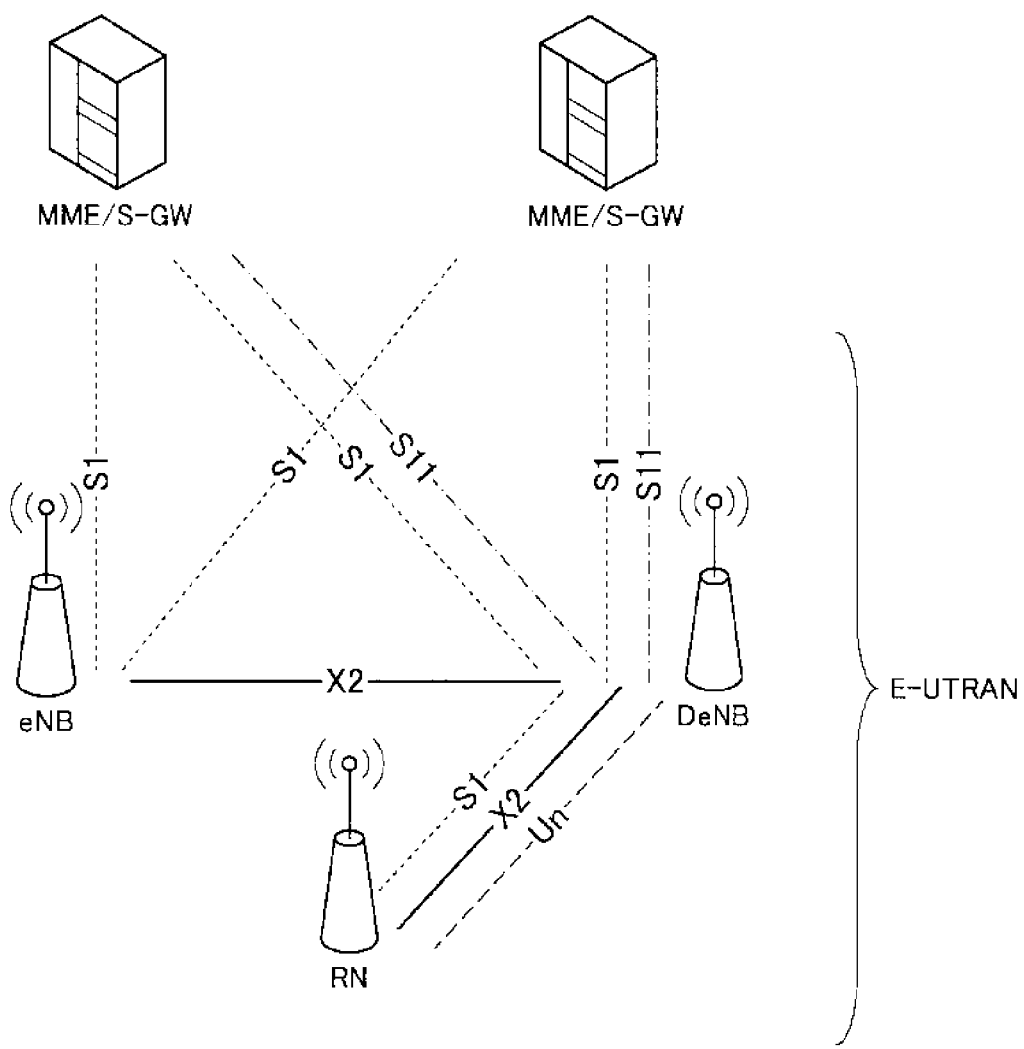
FIG. 1 is an E-UTRAN architecture that supports a relay node.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which elements having substantially the same functional configuration are distinguished by adding different letters after the same reference numeral. For example, a plurality of elements having substantially the same functional configuration are distinguished as terminal apparatuses 100A, 100B, and 100C as necessary. However, when it is not necessary to particularly distinguish a plurality of elements having substantially the same functional configuration, only the same reference numeral is attached. For example, when it is not necessary to particularly distinguish terminal apparatuses 100A, 100B and 100C, they are referred to simply as a "terminal apparatus 100."

Note that description will be given in the following order.
1. Introduction
 1.1. Relay node
 1.2. Technical problems
2. Configuration example
 2.1. Configuration example of system
 2.2. Configuration example of UE
 2.3. Configuration example of URN
 2.4. Configuration example of P-GW
3. First Embodiment
 3.1. Initial assignment of network layer IP address
 3.2. Handling of network layer IP address during handover
 3.3. Handling of transport layer IP address during handover
 3.4. Effects
4. Second Embodiment
 4.1. Introduction
 4.2. Flow of Processing
 4.3. Effects
5. Use case
6. Application example
7. Conclusion

1. INTRODUCTION

<1.1. Relay Node>>

First, a relay node will be described with reference to FIGS. 1 to 5.

FIG. 1 is an evolved universal terrestrial radio access network (E-UTRAN) architecture that supports a relay node. A relay node (RN) is an entity that relays wireless communication performed by a user terminal (user equipment: UE). A donor eNB (DeNB) is an eNB that is connected to the relay node. As illustrated in FIG. 1, an S1 interface is set between the eNB and MME/S-GW. In addition, the S1 interface and an S11 interface are set between the DeNB and the MME/S-GW. Also, an X2 interface is set between the eNB and the DeNB. In addition, the S1 interface, the X2 interface, and a Uu interface are set between the DeNB and the relay node (RN).

Figure 2:
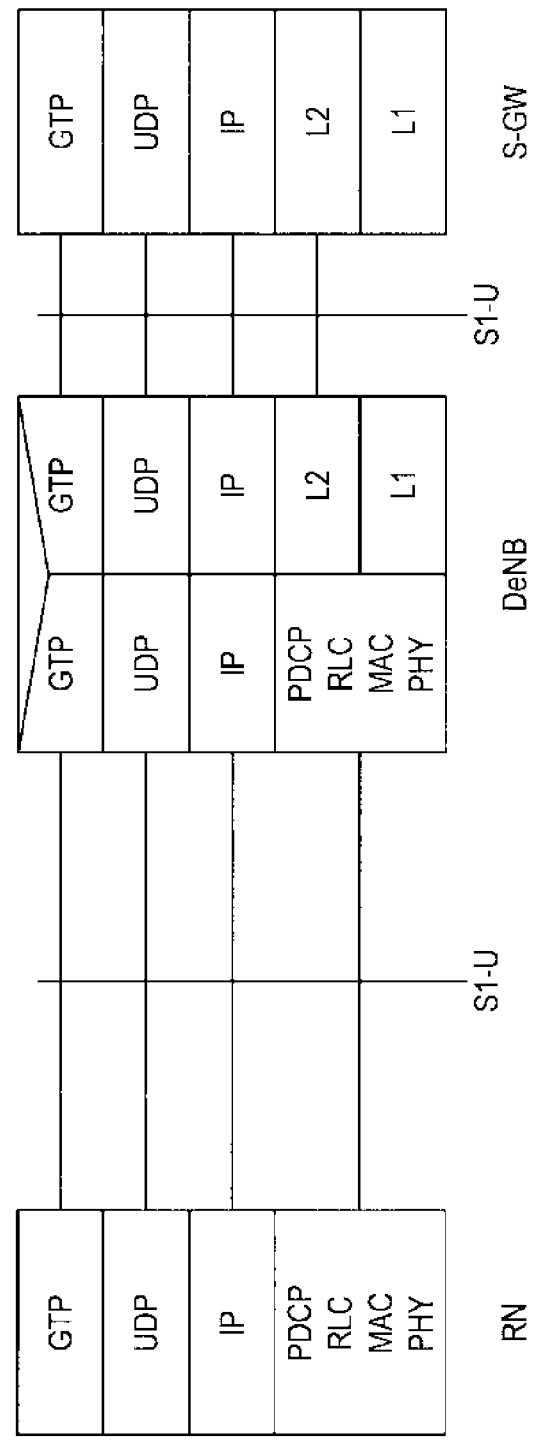
FIG. 2 is a diagram illustrating a protocol stack in an S1 user plane.
Figure 3:
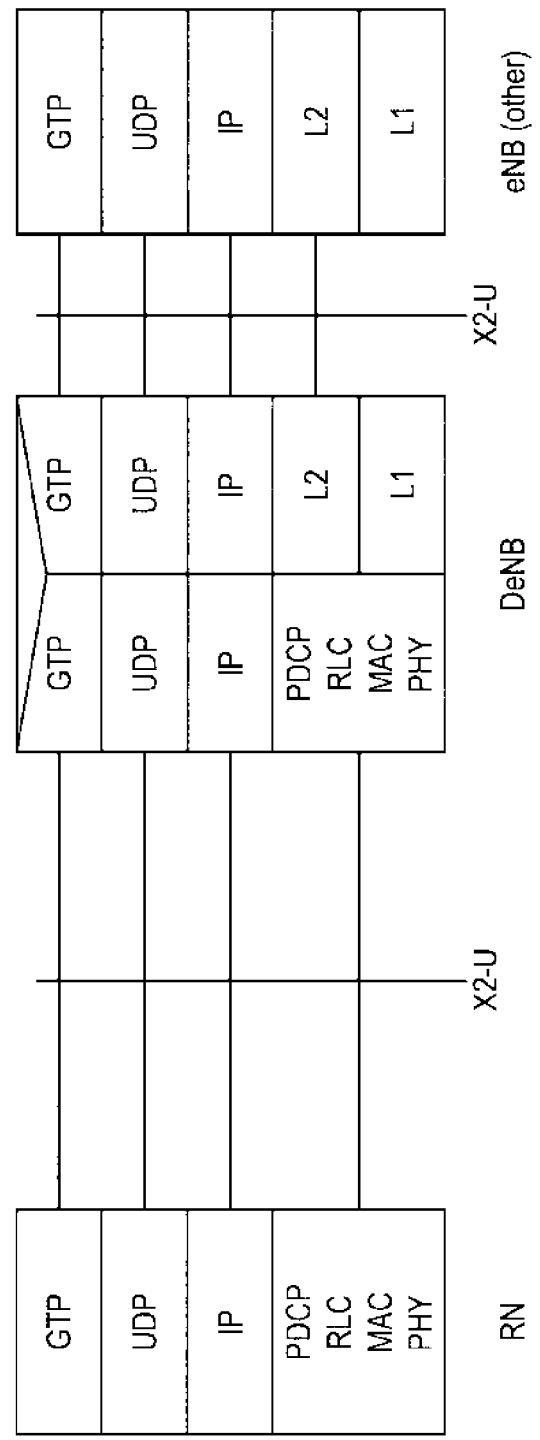
FIG. 3 is a diagram illustrating a protocol stack in an X2 user plane.
Figure 4:
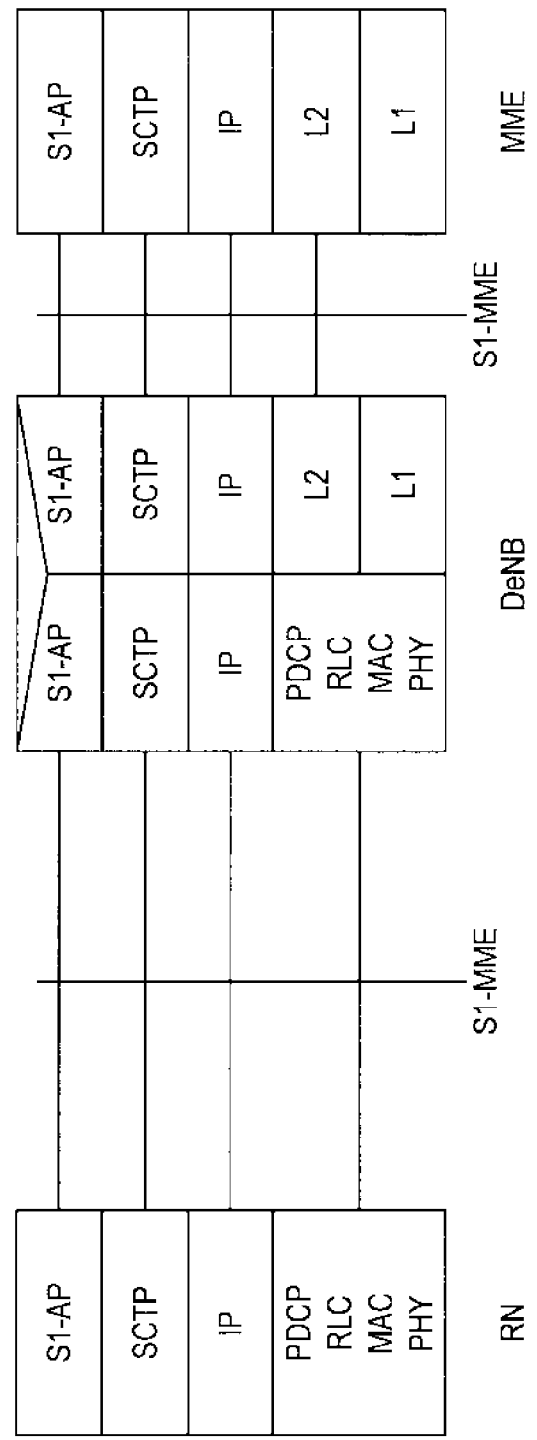
FIG. 4 is a diagram illustrating a protocol stack in an S1 control plane.
Figure 5:
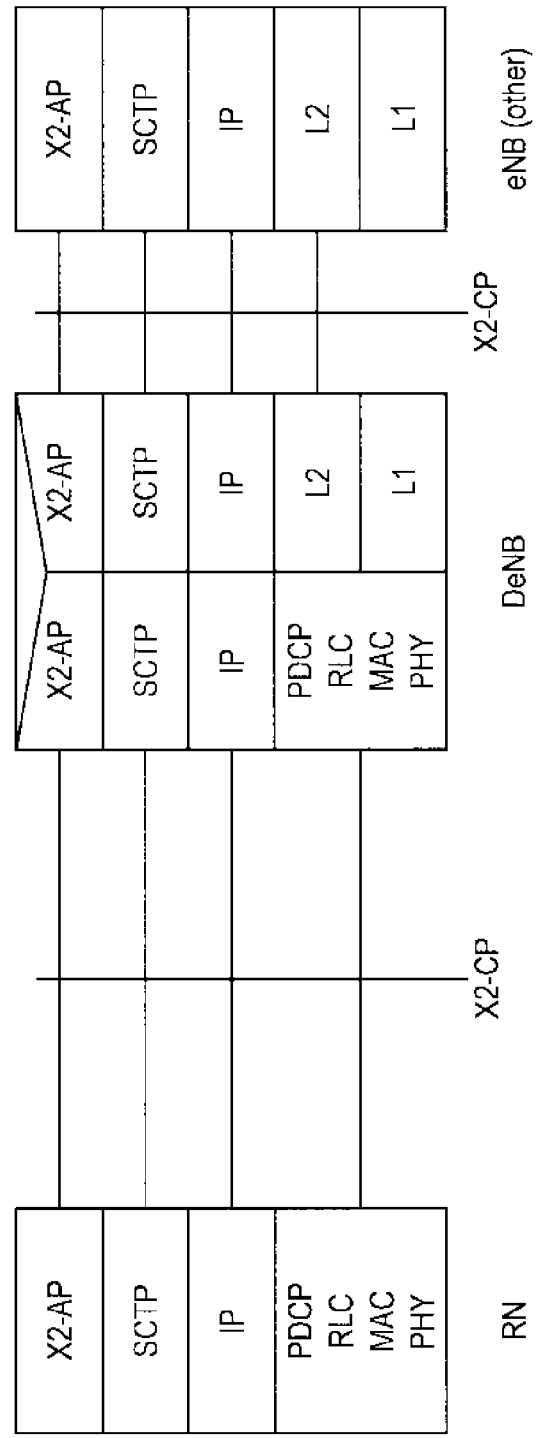
FIG. 5 is a diagram illustrating a protocol stack in an X2 control plane.

FIG. 2 is a diagram illustrating a protocol stack in an S1 user plane. FIG. 3 is a diagram illustrating a protocol stack in an X2 user plane. FIG. 4 is a diagram illustrating a protocol stack in an S1 control plane. FIG. 5 is a diagram illustrating a protocol stack in an X2 control plane. Here, all the "IPs" in FIGS. 2 to 5 are IPs in a transport layer. That is, an IP in a network layer has not been assumed for the relay node.

<1.2. Technical Problems>
(1) Problems

First, since the relay node does not have a network layer IP address, it is difficult to use an IP application when the relay node behaves as a UE.

Second, mobility of the relay node has not been taken into consideration. Therefore, although the relay node has a transport layer IP address, transmittivity that accompanies movement related to the IP is not secured. Even if the relay node acquires a network layer IP address, a similar problem may occur.

Third, in a case in which a terminal group such as a UE that is connected to the relay node voluntarily performs an attachment procedure (Attachment Procedure), performs position registration in an MME, and individually establishes a bearer every time the relay node moves, much signaling is needed.

Fourth, if the terminal group moves often, the position registration in the MME is also performed often, and in accordance with this, much signaling is needed. Otherwise, it becomes difficult for the terminal group to receive a push application such as paging.

The present disclosure provides an example of a new protocol that solves the aforementioned four technical problems.

(2) PRIOR ARTS

As examples of technologies for realizing moving transmittivity of an IP address, there are a Mobile IP (RFC3775), a Proxy Mobile IP (RFC5213), and a Network Mobility (RFC3963) defined by the Internet Engineering Task Force (IETF), for example. However, according to these technologies, it is difficult to secure the IP moving transmittivity of a user terminal in a case in which a relay node is connected to a relay node and a mobile network is hierarchically formed, a case in which handover is performed between mobile networks, and the like.

In addition, a technology of applying a plurality of IP addresses to a relay node is disclosed in International Publication No. 2012/114527 (PCT/JP2011/054401) as an example of the technologies related to the aforementioned technical problems. More specifically, a technology in which a DeNB applies a plurality of IP addresses to a subordinate relay node and an IP address from among the plurality of IP addresses is applied to another relay node connected to the relay node is disclosed. The aforementioned related arts are technologies that are used when relay nodes are connected in series in a row. As described above in the technical problems, the prior arts are not related to the IP address to be applied to the subordinate terminal group of the relay node.

In addition, Table 1 is a table in which existing mobility support protocols are summarized. The mobility support protocols can be classified in terms of two viewpoints. The first viewpoint is a viewpoint regarding which of a (node mobility) protocol that realizes movement of a node alone and a (network mobility: NEMO) protocol that realizes movement of a node group (network) a mobility support protocol is. The second viewpoint is a viewpoint regarding which of a (host-based global mobility) protocol, in which a moving node (or a moving router) relates to signaling for movement management and a moving range is the entire Internet, and a (network-based localized mobility) protocol in which a moving node (or a moving router) does not relate to signaling for movement management and the moving range is only a limited range a mobility support protocol is.

A proposed protocol according to the embodiment is a protocol in which NEMO and a moving node are not related to signaling for movement management and a moving range is only a limited range.

TABLE 1

| | Node Mobility | Network Mobility (NEMO) |
|---|---|---|
| Host-Based Global Mobility | Mobile IPv4[1] | NEMO Basic Support Protocol [2] |
| | Mobile IPv6[3] | NEMO Extensions for MIPv4[4] |
| Network-Based Localized Mobility | PMIPv6[5] | N-PMIPv6[6] |
| | PMIPv4[7] | N-NEMO[8] |
| | IPv4 Support for PMIPv6[9] | P-NEMO[10] |
| | | PNEMO[11] |
| | | PMIPv6-NEMO[12] |

Note that the respective protocols in Table 1 are described in detail in the following documents:
[1] C. Perkins. IP Mobility Support for IPv4, Revised, November 2010. RFC 5944.
[2] V. Devarapalli, R. Wakikawa, A. Petrescu, and P. Thubert. Network Mobility (NEMO) Basic Support Protocol, January 2005. RFC 3963.
[3] C. Perkins, D. Johnson, and J. Arkko. Mobility Support in IPv6, July 2011. RFC 6275.
[4] K. Lueng, G Dommety, V. Narayanan, and A. Petrescu. Network Mobility (NEMO) Extensions for Mobile IPv4, April 2008. RFC 5177.
[5] S. Gundavelli, K. Lueng, V. Devarapalli, K. Chowdhury, and B. Patil. Proxy Mobile IPv6, August 2008. RFC 5213.
[6] I. Soto, C. J. Bernardos, M. Calderon, A. Banchs, and A. Azcorra. Nemo-Enabled Localized Mobility Support for Internet Access in Automotive Scenarios. IEEE Communications Magazine, Vol. 47, No. 5, pp. 152-159, 2009.
[7] K. Lueng, G Dommety, P. Yegani, and K. Chowdhury. WiMAX Forum/3GPP2 Proxy Mobile IPv4, February 2010. RFC 5563.
[8] Z. Yan, S. Zhang, H. Zhou, H. Zhang, and I. You. Network Mobility Support in PMIPv6 Network. In Proceedings of 3rd International Conference on Ubiquitous and Future Networks (ICUFN2011), 2011.
[9] R. Wakikawa and S. Gundavelli. IPv4 Support for Proxy Mobile IPv6, May 2010. RFC 5844.
[10] J. H. Lee, T. Ernst, and N. Chilamlurti. Performance Analysis of PMIPv6-Based NEtwork MObility for Intelligent Transportation Systems. IEEE Transactions on Vehicular Technology, Vol. 61, No. 1, January 2012.
[11] T. Arita and F. Teraoka. PNEMO: A Network-Based Localized Mobility Management Protocol for Mobile Networks. Journal of Information Processing, Vol. 20, No. 2, February 2012.
[12] X. Zhou, J. Korhonen, C. Williams, S. Gundavelli, and CJ. Bernardos. Prefix Delegation Support for Proxy Mobile IPv6, March 2014. RFC 7148.

2. CONFIGURATION EXAMPLE

<2.1. Configuration Example of System>

Figure 6:
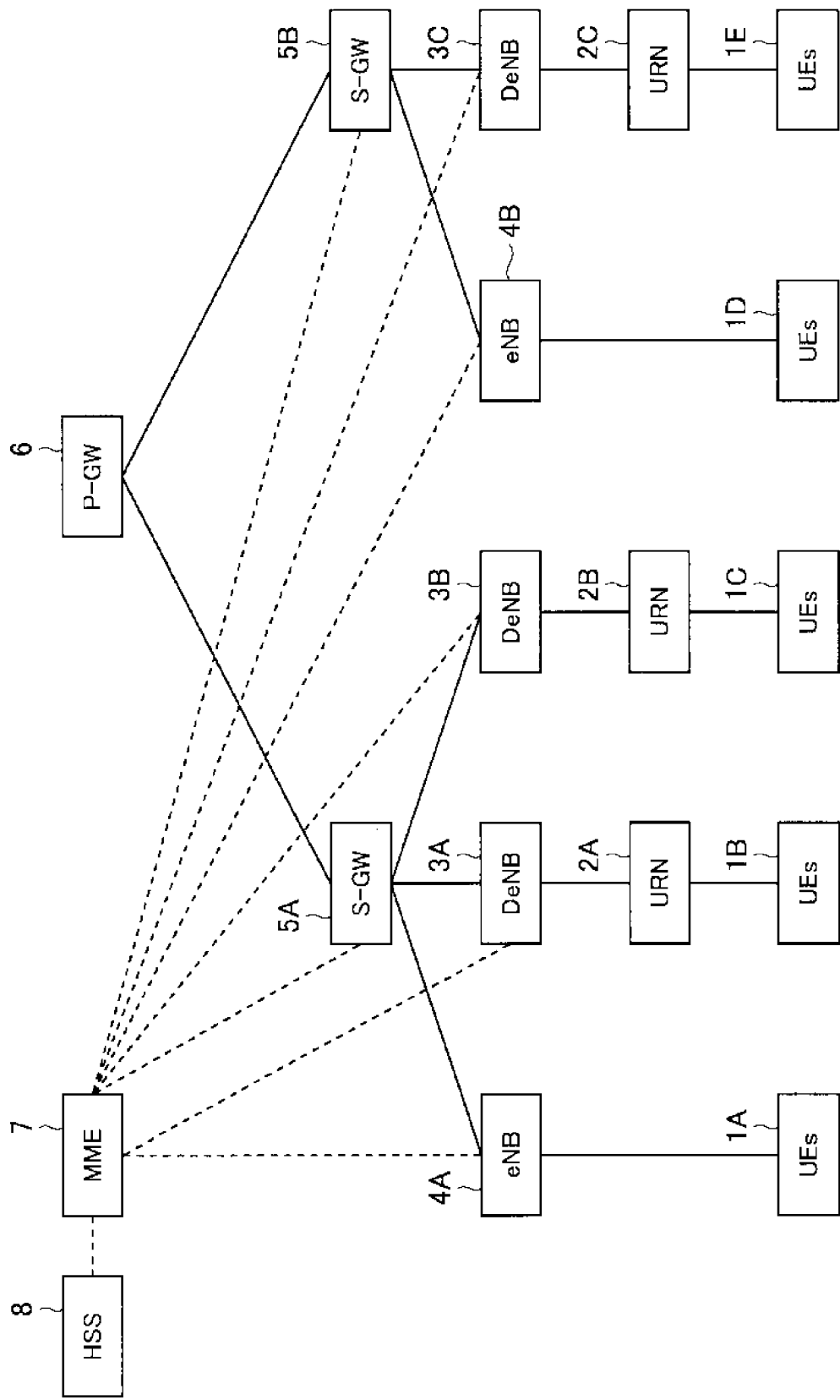
FIG. 6 is a diagram illustrating an example of a schematic configuration of a system according to an embodiment of the present disclosure.

FIG. 6 is a diagram illustrating an example of a schematic configuration of a system according to an embodiment of the present disclosure. As illustrated in FIG. 6, the system according to the embodiment includes UEs 1, a URN 2, a DeNB 3, an eNB 4, an S-GW 5, a P-GW 6, an MME 7, and an HSS 8. The solid lines connecting the respective parts represent user planes while the broken lines represent control planes. In addition, UEs represent a plurality of UEs 1. The proposed protocol can operate in a domain (network range) of a mobile phone network, for example, as illustrated in FIG. 6. It is a matter of course that the domain may be another network configuration.

The UE 1 is a terminal device. The user-relay-node (URN) 2 is a relay device capable of operating as an UE or an RN. The DeNB 3 is a base station to which the relay node is connected. The eNB 4 is a base station. The serving gateway (S-GW) 5 is a gateway that transmits user data. The P-GW 6 is a gateway that services as a contact point between a core network and an external packet data network (PDN) and is a communication control device that performs assignment of an IP address or the like. The mobility management entity (MME) 7 performs movement management of the UE 1, authentication, setting of a transfer route of user data, and the like. The home subscriber server (HSS) 8 manages user information. In addition, the system according to the embodiment can include an entity such as a policy and charging rules function (PCRF) that decides policy control such as QoS and charging control rules, which are applied to the S-GW 5 and the P-GW 6.

Figure 7:
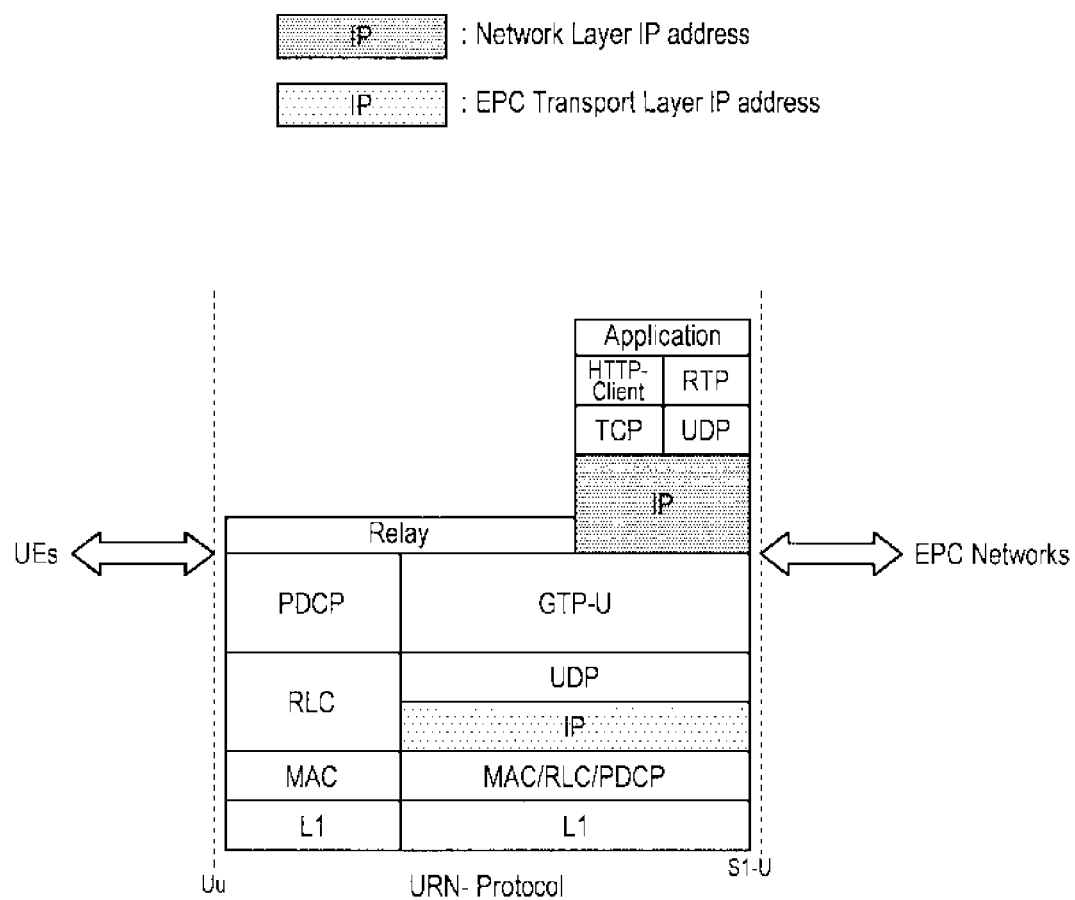
FIG. 7 is a diagram illustrating an example of a protocol stack in a URN according to the embodiment.

FIG. 7 is a diagram illustrating an example of a protocol stack in the URN 2 according to the embodiment. As illustrated in FIG. 7, the URN 2 has a network layer IP address (that is utilized by an application on the UE 1 or the URN 2) in addition to an EPC transport layer IP address.

Figure 8:
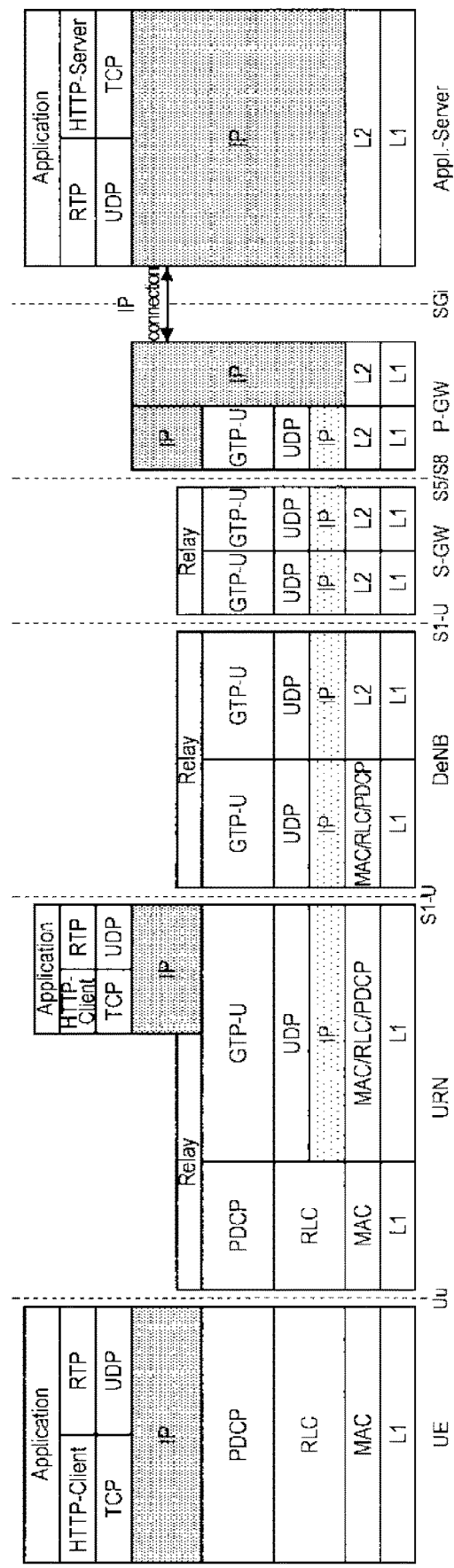
FIG. 8 is a diagram illustrating an example of a protocol stack in communication between UE and a server on a PDN through the URN according to the embodiment.

FIG. 8 is a diagram illustrating an example of a protocol stack in communication between the UE 1 and a server on the PDN through the URN 2 according to the embodiment. As illustrated in FIG. 8, the URN 2 is connected to the DeNB 3 and performs communication with an application server on the PDN through an EPC (the S-GW 5 and the P-GW 6). In addition, the URN 2 relays wireless communication between the subordinate UE 1 and the DeNB 3 that is a connection destination.

<2.2. Configuration Example of UE>

Figure 9:
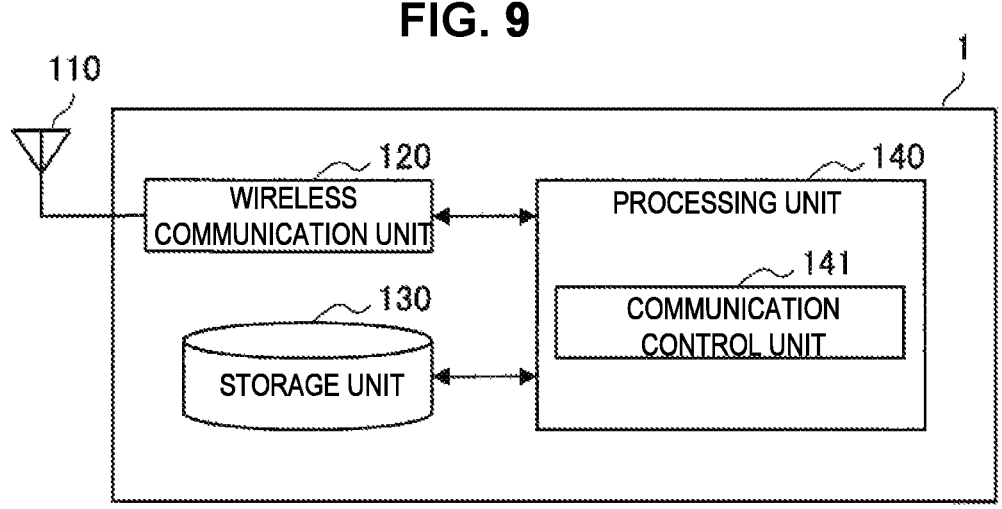
FIG. 9 is a block diagram illustrating an example of a configuration of the UE according to the embodiment.

Next, an example of a configuration of the UE 1 according to the embodiment will be described with reference to FIG. 9. FIG. 9 is a block diagram illustrating an example of the configuration of the UE 1 according to the embodiment. Referring to FIG. 9, the UE 1 includes an antenna unit 110, a wireless communication unit 120, a storage unit 130, and a processing unit 140.

(1) Antenna Unit 110

The antenna unit 110 releases a signal output from the wireless communication unit 120 as electric waves into a space. In addition, the antenna unit 110 converts the electric waves in the space into a signal and outputs the signal to the wireless communication unit 120.

(2) Wireless Communication Unit 120

The wireless communication unit 120 transmits and receives signals. The wireless communication unit 120 receives a downlink signal from the URN 2 or the eNB 4 and transmits an uplink signal to the URN 2 or the eNB 4.

(3) Storage Unit 230

The storage unit 130 temporarily or permanently stores a program and various kinds of data for operations of the UE 1.

(4) Processing Unit 140

The processing unit 140 provides various functions of the UE 1. The processing unit 140 includes a communication control unit 141. Note that the processing unit 140 can further include components other than these components. That is, the processing unit 140 can perform operations other than operations of these components. The communication control unit 141 has a function of controlling communication with the URN 2.

<2.3. Configuration Example of URN>

Figure 10:
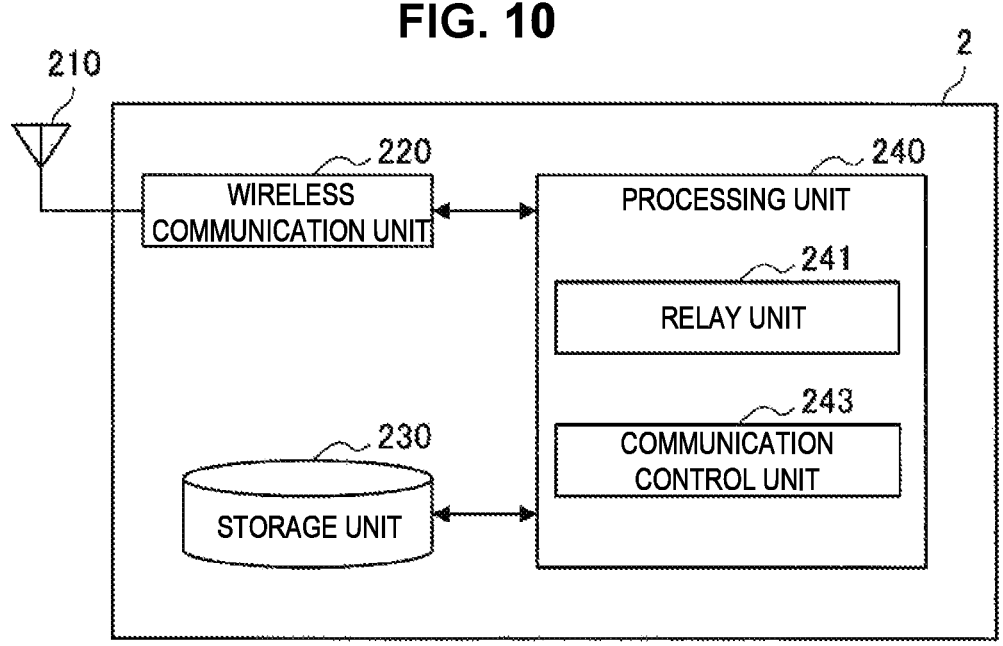
FIG. 10 is a block diagram illustrating an example of a configuration of the URN according to the embodiment.

Next, an example of a configuration of the URN 2 according to the embodiment will be described with reference to FIG. 10. FIG. 10 is a block diagram illustrating an example of the configuration of the URN 2 according to the embodiment. Referring to FIG. 10, the URN 2 includes an antenna unit 210, a wireless communication unit 220, a storage unit 230, and a processing unit 240.

(1) Antenna Unit 210

The antenna unit 210 releases a signal output from the wireless communication unit 220 as electric waves into a space. In addition, the antenna unit 210 converts the electric waves in the space into a signal and outputs the signal to the wireless communication unit 220.

(2) Wireless Communication Unit 220

The wireless communication unit 220 transmits and receives signals. For example, the wireless communication unit 220 receives a downlink signal from the DeNB 3 that is a connection destination or the URN 2 that is a connection destination and transmits an uplink signal to the DeNB 3 that is a connection destination or the URN 2 that is a connection destination. In addition, the wireless communication unit 220 receives an uplink signal from the UE 1 and transmits a downlink signal to the UE 1, for example.

(3) Storage Unit 230

The storage unit 230 temporarily or permanently stores a program and various kinds of data for operations of the URN 2.

(4) Processing Unit 240

The processing unit 240 provides various functions of the URN 2. The processing unit 240 includes a relay unit 241 and a communication control unit 243. Note that the processing unit 240 can further include components other than these components. That is, the processing unit 240 can perform operations other than the operations of these components.

The relay unit 241 has a function of relaying a wireless signal between the DeNB 3 (that is, the first device) that is a connection destination and one or more subordinate UEs 1 or one or more subordinate URNs 2 (that is, the second device). The communication control unit 243 has a function of controlling communication with the UEs 1 and performing connection processing, handover processing, or the like with the DeNB that is a connection destination or the URNs 2 that are the connection destinations.

<2.4. Configuration Example of P-GW>

Figure 11:
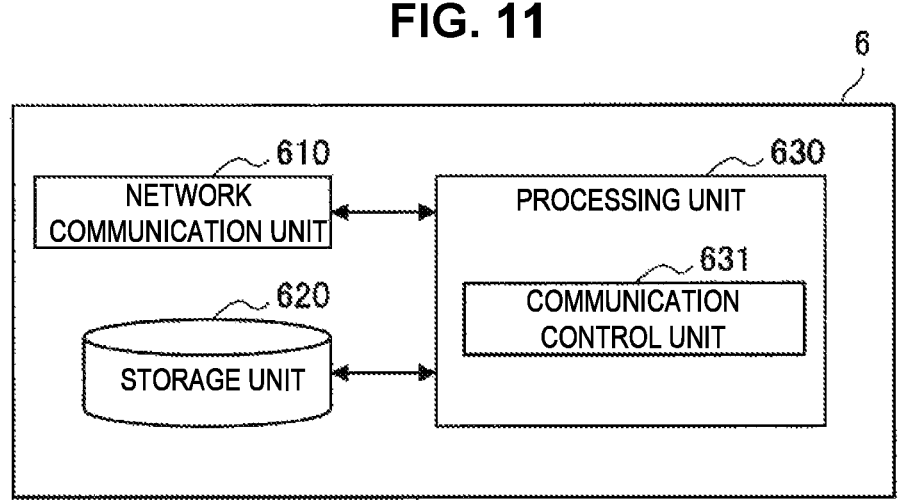
FIG. 11 is a block diagram illustrating a configuration of a P-GW according to the embodiment.

Next, an example of a configuration of the P-GW 6 according to the embodiment will be described with reference to FIG. 11. FIG. 11 is a block diagram illustrating an example of the configuration of the P-GW 6 according to the embodiment. Referring to FIG. 11, the P-GW 6 includes a network communication unit 610, a storage unit 620, and a processing unit 630.

(1) Network Communication Unit 610

The network communication unit 610 is an interface that performs communication with other devices. For example, the P-GW 6 performs communication with other EPC entities in the core network or a server and the like on the PDN.

(2) Storage Unit 620

The storage unit 620 temporarily or permanently stores a program and various kinds of data for operations of the P-GW 6.

(3) Processing Unit 630

The processing unit 630 provides various functions of the P-GW 6. The processing unit 630 includes a communication control unit 631. Note that the processing unit 630 can further include components other than these components.

That is, the processing unit 630 can perform operations other than the operations of these components.

The communication control unit 631 has a function of performing various kinds of processing related to processing of connection of the UE 1 or the URN 2 to the network.

3. FIRST EMBODIMENT

<3.1. Initial Assignment of Network Layer IP Address>

Initial assignment of a network layer IP address will be described below with reference to FIGS. 12 to 29. In this section, the network layer IP address will also be simply referred to as an IP address.

Figure 12:
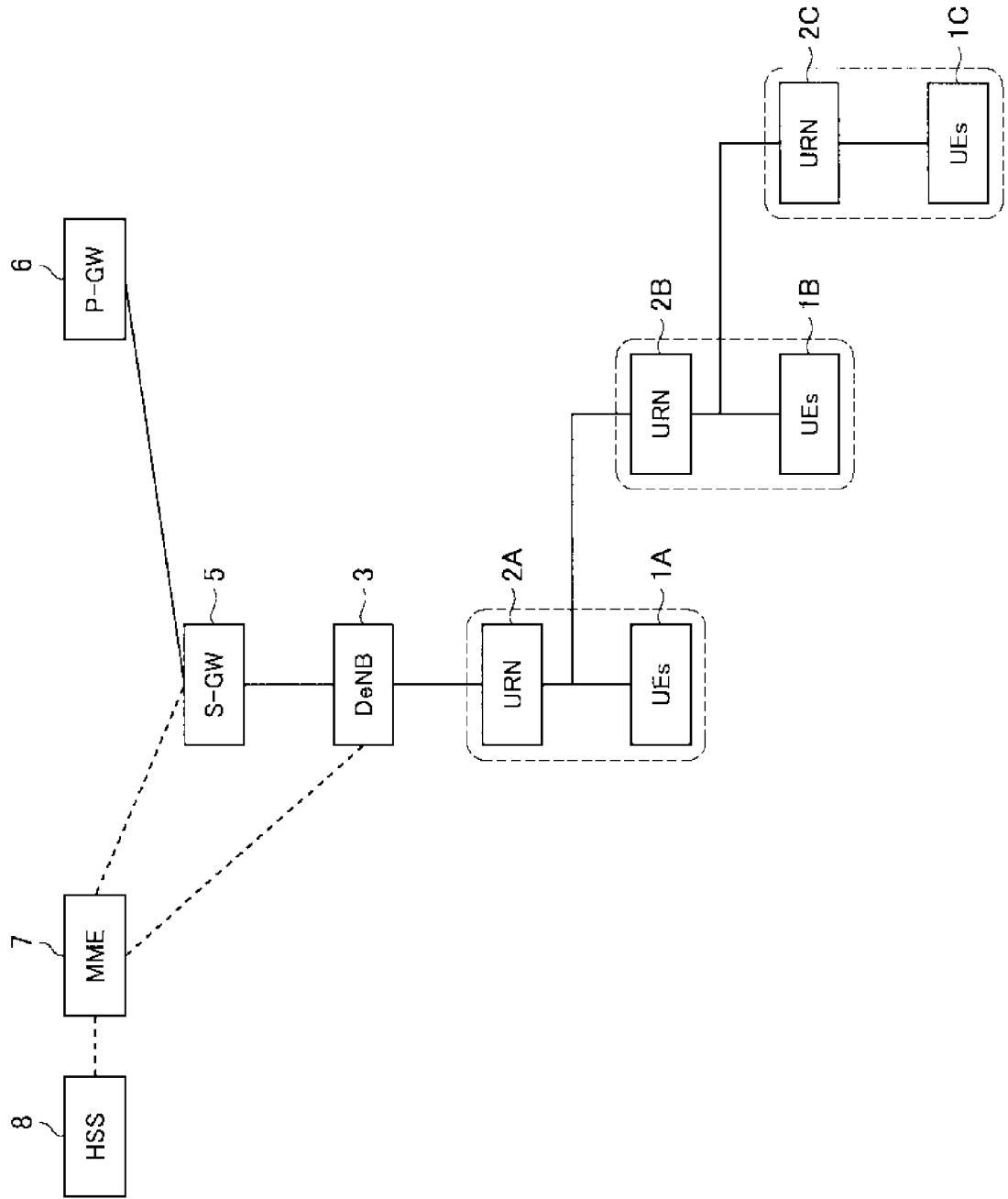
FIG. 12 is an explanatory diagram of technical features in a first embodiment.

FIG. 12 is an explanatory diagram of initial assignment of the IP address. In this section, the initial assignment of the IP address will be described on the assumption of the network configuration illustrated in FIG. 12. As illustrated in FIG. 12, a UE 1A and a URN 2B are connected to a URN 2A, a UE 1B and a URN 2C are connected to a URN 2B, and a UE 1C is connected to the URN 2C in this network configuration. A mobile network that each URN 2 forms is also referred to as a moving cell or a virtual cell in the following description. In FIG. 12, the virtual cell is represented as a rectangle of a broken line. Here, a structure in which another virtual cell is connected to a virtual cell like the virtual cell formed by the URN 2B and the virtual cell formed by the URN 2C is also referred to as a nested structure. In addition, the virtual cell formed by the URN 2B is also referred to as a nested virtual cell.

In the frame of 3GPP, an IP address (static IP) registered in advance in the HSS 8 and an IP address (dynamic IP) secured in advance in the P-GW 6 is assigned to the UE 1 in the attachment procedure. In the embodiment, the URN 2 acquires the IP address first through the attachment procedure, and the IP address is then assigned to the subordinate UE 1.

(1) Assignment of IP Address to URN

If the URN 2 that is also capable of operating as the UE 1 is taken into consideration, it is desirable that an IP address also be assigned to the URN 2. Thus, the URN 2 performs an IP address assignment process to receive assignment of the IP address and assigns the IP address to the URN 2 itself by transmitting an attachment request message to the MME 7 in a manner similar to that in the UE 1.

Note that the S-GW 5 and the P-GW 6 may be realized as function entities for a relay node provided inside the DeNB 3. For example, such a configuration can be realized by a virtualization function based on network functions virtualization (NFV).

(1-1) In Case of Static IP

Figure 13:
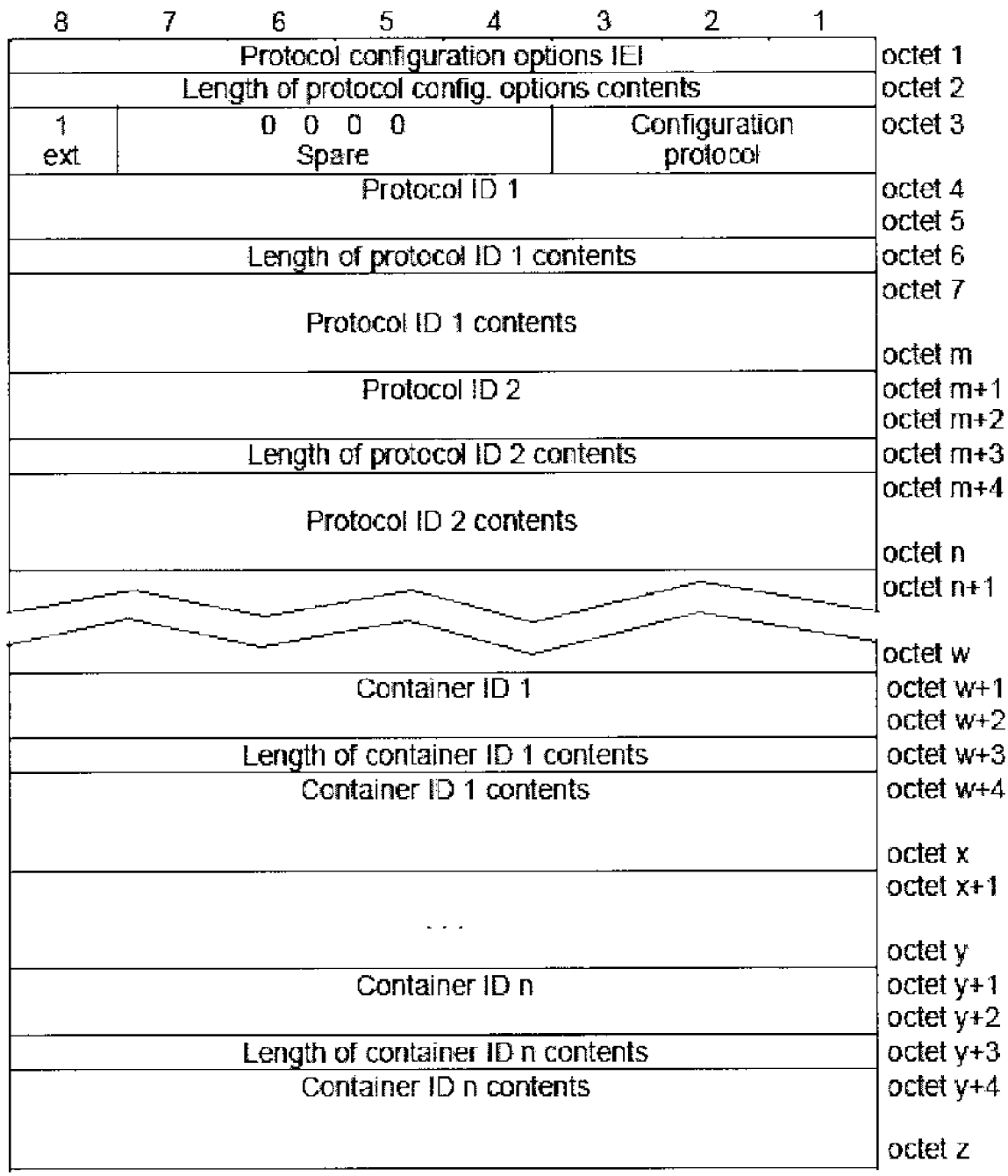
FIG. 13 is an explanatory diagram of technical features in the embodiment.

In a case in which an IP address corresponding to identification information (identification: ID) of the URN 2 is registered in the HSS 8, the IP address may be included in the attachment acceptance message, and the URN 2 may be notified of the IP address. In that case, a protocol configuration options (PCO) field defined in a non-access stratum (NAS) protocol may be utilized as an example of means. FIGS. 13 and 14 are diagrams illustrating a PCO format. The IP address is assigned to the URN 2 through such a procedure.

(1-2) In Case of Dynamic IP

An IP address assignment request is transmitted to the MME 7 through an attachment request from the URN 2. However, in a case in which there is no IP address registered in advance in the HSS 8, a request for assigning an IP address to the URN 2 is provided to the P-GW 6.

The P-GW 6 generates an ID (interface identifier (64 bits) in IPv6, for example) to be applied to the URN 2 that is a request source and notifies the URN 2 of the ID. This notification may be included in an attachment approval message, for example. In addition, the P-GW 6 generates and stores association between a global unique terminal ID (international mobile subscriber identity (IMSI), for example) of the URN 2 and a prefix portion (for example, Prefix/64 of IPv6) of the IP address.

For example, the URN 2 may generate a link local address (Link Local Address) by using the applied ID (for example, an interface identifier of IPv6), transmit an RS message (Router Advertisement Message) that is a so-called IP protocol to the P-GW 6, and acquire the prefix portion (for example, Prefix/64 of IPv6) of the IP address. For example, the prefix portion of the IP address may be included in the router advertisement (RA) message (Router Advertisement Message) transmitted by the P-GW 6. Then, the URN 2 may generate an IPv6 address by linking the acquired prefix portion to the interface identifier. It is a matter of course that the URN 2 may generate an interface identifier that is different from the interface identifier generated by the P-GW 6 and generate the IPv6 address. However, it is preferable that the interface identifier generated here not overlap the interface identifier generated by the P-GW 6. In addition, the URN 2 may acquire an IP address from a DHCP server by using a DHCPv6 protocol instead of the RS message and the RA message. In this manner, the URN 2 can assign the IP address of the URN 2 itself.

Hereinafter, an example of a specific sequence of processing of assigning an IP address to the URN 2 will be described with reference to FIG. 15.

Figure 15:
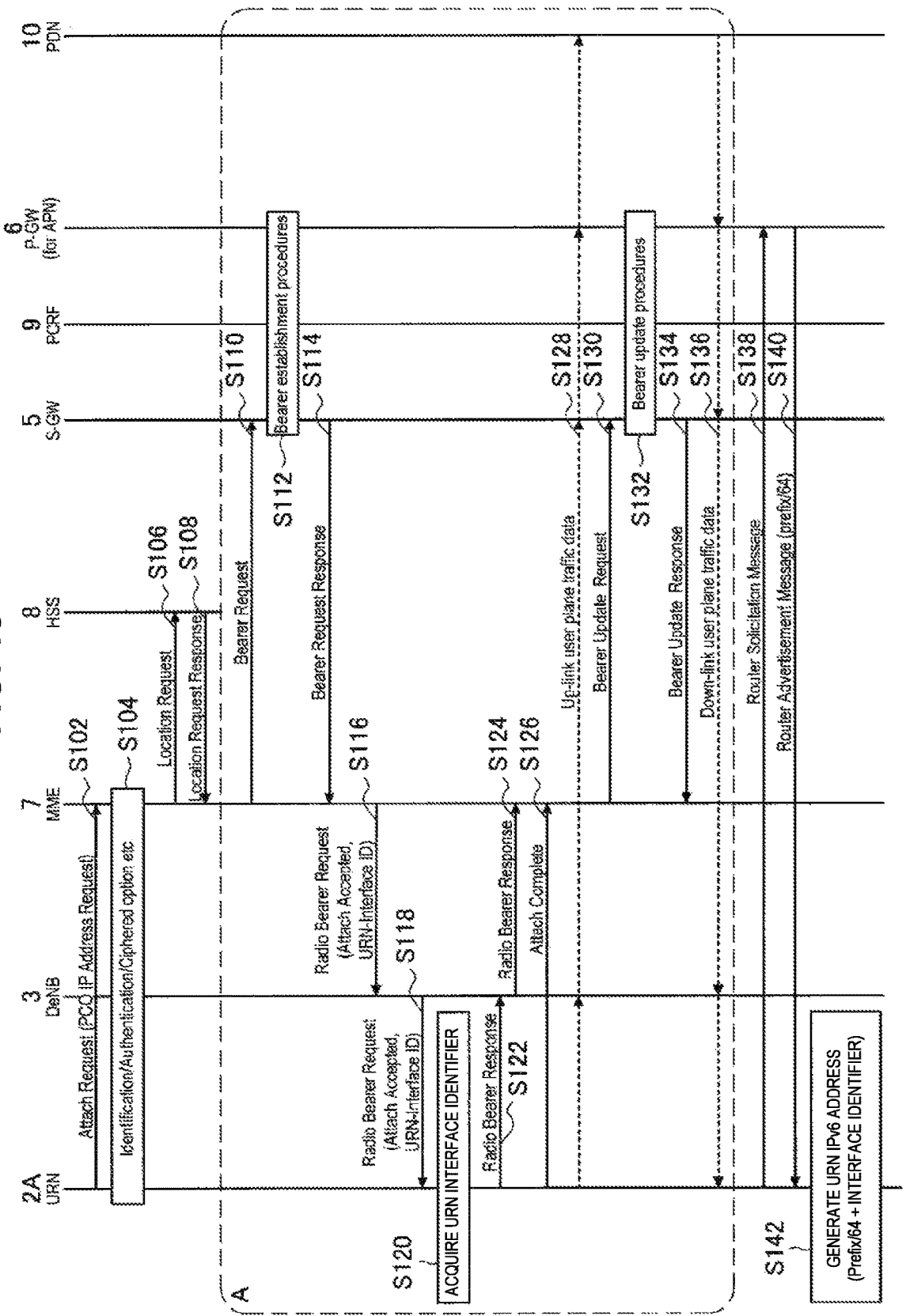
FIG. 15 is an explanatory diagram of technical features in the embodiment.

FIG. 15 is a sequence diagram illustrating an example of a flow of processing of assigning an IP address to the URN 2 according to the embodiment. The URN 2, the DeNB 3, the S-GW 5, the P-GW 6, the MME 7, the HSS 8, and the PCRF 9 are involved in the sequence.

As illustrated in FIG. 15, the URN 2A transmits an attachment request (Attach Request (PCO IP Address Request)) to the MME 7 first (Step S102). Then, the URN 2A performs identification, authentication, encryption, and the like (Identification/Authentication/Ciphered option etc.) with the DeNB 3, the MME 7, and the HSS 8 (Step S104). Next, the MME 7 transmits a location request (Location Request) to the HSS 8 (Step S106). Then, the HSS 8 transmits a location request response (Location Request Response) to the MME 7 (Step S108). Next, the MME 7 transmits a bearer request (Bearer Request) to the S-GW 5 (Step S110). Then, the S-GW 5 performs bearer establishment procedures (Bearer establishment procedures) with the PCRF 9 and the P-GW 6 (Step S112). Next, the S-GW 5 transmits a bearer request response (Bearer Request Response) to the MME 7 (Step S114). Then, the MME 7 transmits attachment acceptance (Attach Accepted) and a radio bearer request (Radio Bearer Request) including the interface ID (URN-Interface ID) of the URN 2A to the DeNB 3 (Step S116). Next, the DeNB 3 transmits attachment acceptance (Attach Accepted) and a radio bearer request (Radio Bearer Request) including the interface ID (URN-Interface ID) of the URN 2A to the URN 2A (Step S118). In this manner, the URN 2A acquires an interface ID (URN Interface ID) of the URN 2A itself (Step S120). Then, the URN 2A transmits a radio bearer response (Radio Bearer Response) to the DeNB 3 (Step S122). Then, the DeNB 3 transmits the radio bearer response (Radio Bearer Response) to the MME 7 (Step S124). Then, the URN 2A transmits attachment completion (Attach Complete) to the MME 7

(Step S126). Next, the URN 2A can transmit uplink user plane traffic data to the PDN 10 via the DeNB 3, the S-GW 5, and the P-GW 6 (Step S128). Then, the MME 7 transmits a bearer update request (Bearer Update Request) to the S-GW 5 (Step S130). Next, the S-GW 5 performs bearer update procedures (Bearer update procedures) with the PCRF 9 and the P-GW 6 (Step S132). Then, the S-GW 5 transmits a bearer update response (Bearer Update Response) to the MME 7 (Step S134). This makes it possible to transmit downlink user plane traffic data from the PDN 10 to the URN 2A via the P-GW 6, the S-GW 5, and the DeNB 3 (Step S136). Then, the URN 2A transmits a router solicitation (RS) message (Router Solicitation Message) to the P-GW 6 (Step S138). Next, the P-GW 6 transmits an RA message (Router Advertisement Message) including prefix/ 64 to the URN 2A (Step S140). Then, the URN 2A generates an IPv6 address (URN IPv6 Address) of the URN 2A itself that includes prefix/64 and an interface identifier (Step S142).

(2) Assignment of IP Address to UE

Next, assignment of an IP address to the subordinate UE 1 of the URN 2A will be described.

The IP address can be assigned to the UE 1 in a manner similar to that in the URN 2 described above. In the embodiment, in particular, the URN 2 assigns an IP address, which has a prefix portion that is at least partially common (that is, the same), to each of one or more subordinate UEs 1 or one or more subordinate URNs 2. In this manner, the IP addresses with the prefix portions that are at least partially common are assigned to the one or more UEs 1 or URN 2 connected to the same URN 2. Then, the subordinate UEs 1 or URNs 2 perform communication with the URN 2 and a higher-order network (P-GW 6 or the like) by using the assigned IP address. The prefix portion may be a subnet prefix in IPv6. For example, the subnet prefix may be 64 higher bits in 128 bits of IPv6, and 56 higher bits (hereinafter, also described as Prefix/56) among the 64 bits may be the common portion.

For example, the URN 2 utilizes a DHCP-prefix delegation (PD) protocol after completion of the connection and acquires the prefix portion commonly assigned to the subordinate UEs 1 from the P-GW 6 or the DHCP server. Therefore, the P-GW 6 notifies the URN 2 of the common portion (IPv6 Prefix/56) of the prefix portion. The URN 2 may create Prefix/64 designating the lower bits of "0000 0000," for example, as Prefix/56 and assign the IP address when the IP address is assigned to the UE 1 that has actually sent the connection request. Note that DHCP-PD is described in detail in "O. Troan and R. Droms. IPv6 Prefix Options for Dynamic Host Configuration Protocol (DHCP) version 6, December 2003. RFC 3633."

For example, the UE 1 generates a link local address (Link Local Address) by utilizing the ID (for example, the interface identifier of the IPv6) applied in an ordinary procedure. Then, the UE 1 may transmit an RS message that is a so-called IP protocol to the URN 2 and acquire the prefix portion (Prefix/64) of the IP address generated by the URN 2. For example, Prefix/64 may be included in the RA message. In addition, the UE 1 may acquire the IP address of the UE 1 from the DHCP server by using the DHCP protocol instead of the RS message and the RA message. At that time, the DHCP server can create Prefix/64 by designating the lower bits of "0000 0000", for example, for Prefix/56 acquired by the DHCP-PD and notify the UE 1 of Prefix/64 by the URN 2 that is a connection destination of the UE 1. At this time, the UE 1 can acquire connection information of the DNS server or the DHCP server and the IP address of the URN 2 that is the connection destination by utilizing the PCO or the like. In this manner, the UE 1 can assign the IP address to the UE 1 itself.

Here, a mapping table for generating a bearer on each entity (the P-GW 6, the S-GW 5, the DeNB 3, or the like) can be created and stored in each entity for each bearer tunnel realized on a network. In 3GPP, the mapping table is created in response to an instruction from the MME 7. In addition, the MME 7 provides an instruction for updating the bearer from a source to a target entity (for example, the DeNB 3 or the S-GW 5) in accordance with movement of the terminal device (for example, the UE 1 or the URN 2), and the mapping table is also updated in accordance with this. In the embodiment, the URN 2 acquires Prefix/56, for example, by using the DHCP-PD for a UE 1 group connected to the URN 2. It is desirable that information that associates the acquired Prefix/56 with the acquired URN 2 (for example, identification information (URN_ID) or the like that the MME 7 creates in a terminal connection process) be added to the mapping table that the P-GW 6, the S-GW 5, the DeNB 3, or the like stores. Therefore, the P-GW 6 to which Prefix/56 has been assigned, for example, may notify the S-GW 5 and the DeNB 3 of the information for association. This message is also referred to as route setup in the following description. Note that the route setup and the mapping table will be described later in detail.

Hereinafter, an example of a specific sequence of processing of assigning an IP address to the UE 1 will be described with reference to FIGS. 16 and 17.

Figure 16:
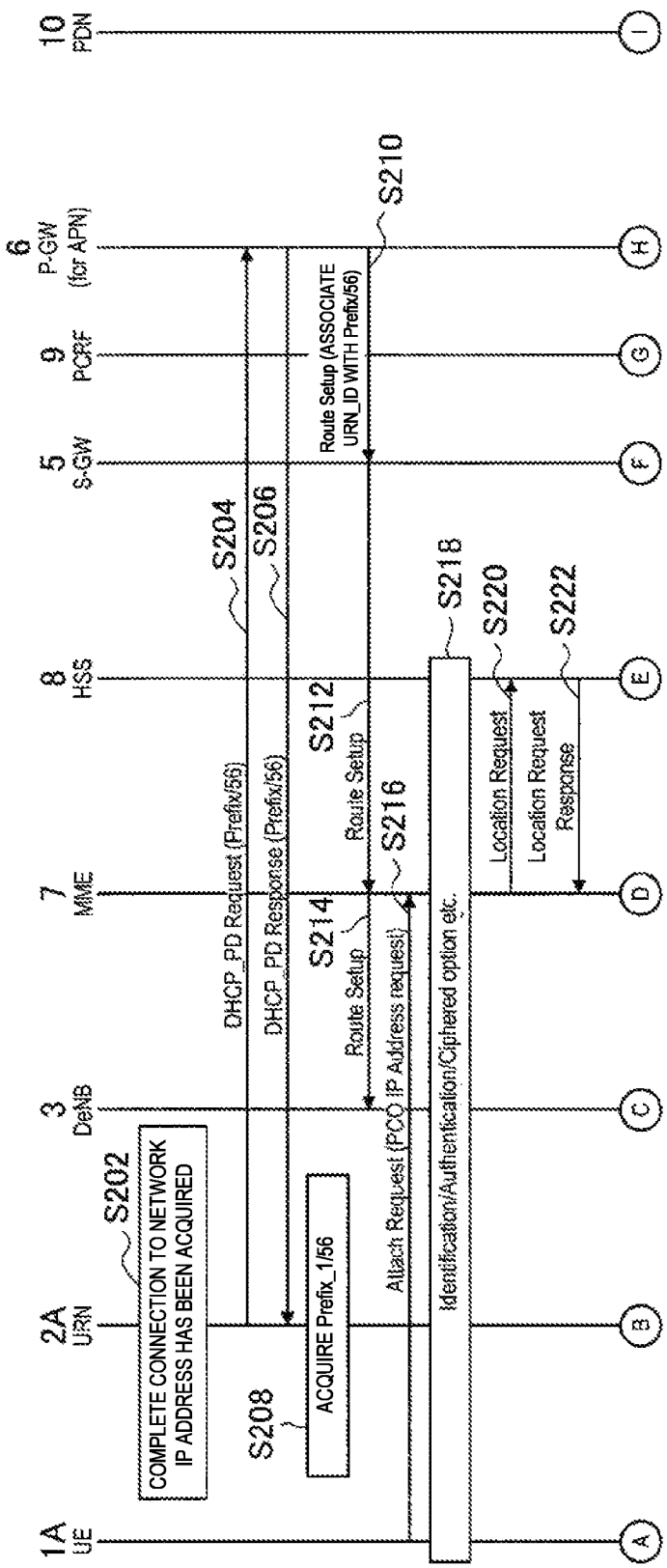
FIG. 16 is an explanatory diagram of technical features in the embodiment.
Figure 17:
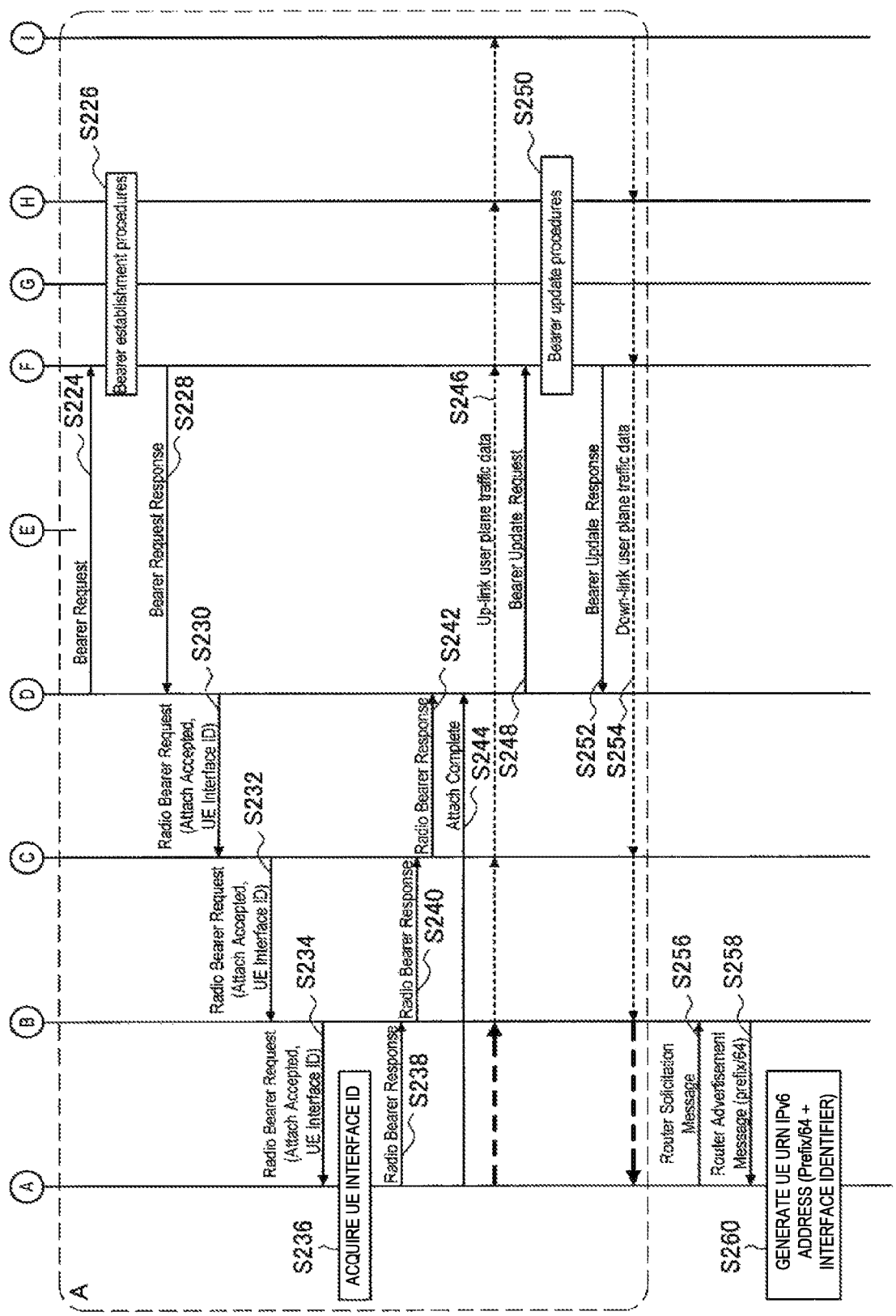
FIG. 17 is an explanatory diagram of technical features in the embodiment.

FIGS. 16 and 17 are sequence diagrams each illustrating an example of a flow of processing of assigning an IP address to the UE 1A according to the embodiment. The UE 1A, URN 2A, the DeNB 3, the S-GW 5, the P-GW 6, the MME 7, the HSS 8, and the PCRF 9 are involved in the sequence.

As illustrated in FIG. 16, it is assumed that the URN 2A has completed the connection to the network through the aforementioned procedure with reference to FIG. 15, for example, first, and has acquired the IP address (Step S202). Then, the URN 2A transmits a DHCP-PD request (DHCP_PD Request) that is for requesting the prefix portion (Prefix/56) of the IP address of the UE 1A to the P-GW 6 (Step S204). Next, the P-GW 6 transmits a DHCP-PD response (DHCP_PD Response) including the prefix portion (Prefix/56) of the IP address of the UE 1A to the URN 2A (Step S206). In this manner, the URN 2A acquires the prefix portion (Prefix/56) of the IP address of the UE 1A (Step S208). On the other hand, the P-GW 6 transmits the route setup (Route Setup) for associating the identification information (URN_ID) of the URN 2A with the prefix portion (Prefix/56) to the S-GW 5 (Step S210). The S-GW 5 transfers the route setup (Route Setup) to the MME 7 (Step S212). The MME 7 transfers the route setup (Route Setup) to the DeNB 3 (Step S214). Next, the UE 1A transmits an attachment request (Attach Request (PCO IP Address Request) to the MME 7 (Step S216). Then, the UE 1A performs identification, authentication, encryption (Identification/Authentication/Ciphered option etc.) with the URN 2A, the DeNB 3, the MME 7, and the HSS 8 (Step S218). Next, the MME 7 transmits a location request (Location Request) to the HSS 8 (Step S220). Then, the HSS 8 transmits a location request response (Location Request Response) to the MME 7 (Step S222).

Next, the MME 7 transmits a bearer request (Bearer Request) to the S-GW 5 as illustrated in FIG. 17 (Step S224). Then, the S-GW 5 performs bearer establishment procedures (Bearer establishment procedures) with the PCRF 9 and the P-GW 6 (Step S226). Then, the S-GW 5 transmits a bearer request response (Bearer Request Response) to the MME 7 (Step S228). Then, the MME 7 transmits an attachment acceptance (Attach Accepted) and radio bearer request (Radio Bearer Request) including the interface ID (UE-Interface ID) of the UE 1A to the DeNB 3 (Step S230). Next, the DeNB 3 transmits an attachment acceptance (Attach Accepted) and a radio bearer request (Radio Bearer Request) including the interface ID (UE-Interface ID) of the UE 1A to the URN 2A (Step S232). Then, the URN 2A transmits an attachment acceptance (Attach Accepted) and a radio bearer request including an interface ID (UE-Interface ID) of the UE 1A to the UE 1A (Step S234). In this manner, the UE 1A acquires the interface identifier (UE interface ID) of the UE 1A itself (Step S236). Next, the UE 1A transmits a radio bearer response (Radio Bearer Response) to the URN 2A (Step S238). Then, the URN 2A transmits a radio bearer response (Radio Bearer Response) to the DeNB 3 (Step S240). Next, the DeNB 3 transmits a radio bearer response (Radio Bearer Response) to the MME 7 (Step S242). Then, the UE 1A transmits attachment completion (Attach Complete) to the MME 7 (Step S244). Next, the UE 1A can transmit uplink user plane traffic data to the PDN 10 via the URN 2A, the DeNB 3, the S-GW 5, and the P-GW 6 (Step S246). Then, the MME 7 transmits a bearer update request (Bearer Update Request) to the S-GW 5 (Step S248). Next, the S-GW 5 performs bearer update procedures (Bearer update procedures) with the PCRF 9 and the P-GW 6 (Step S250). Then, the S-GW 5 transmits a bearer update response (Bearer Update Response) to the MME 7 (Step S252). This makes it possible to transmit downlink user plane traffic data from the PDN 10 to the UE 1A via the P-GW 6, the S-GW 5, the DeNB 3, and the URN 2A (Step S254). Then, the UE 1A transmits an RS message (Router Solicitation Message) to the URN 2A (Step S256). Next, the URN 2A transmits an RA message (Router Advertisement Message) including Prefix/64 to the UE 1A (Step S258). Then, the UE 1A generates an IPv6 address (UE IPv6 Address) of the UE 1A itself including Prefix/64 and the interface identifier (Step S260).

(3) Assignment of IP Address Related to URN with Nested Structure

Next, assignment of an IP address related to the URN 2 with the nested structure will be described.

Hereinafter, an example of a specific sequence of processing of assigning an IP address related to the URN with the nested structure will be described with reference to FIGS. 18 to 21. Here, an example of a flow of processing of assigning IP addresses to the URN 2B connected to the URN 2A and the UE 1B connected to the URN 2B will be described as an example.

FIGS. 18 to 21 are sequence diagrams illustrating an example of a flow of processing of assigning IP addresses to the URN 2B connected to the URN 2A and the UE 1B connected to the URN 2B according to the embodiment. The UE 1B, the URN 2B, the URN 2A, the DeNB 3, the S-GW 5, the P-GW 6, the MME 7, the HSS 8, and the PCRF 9 are involved in the sequence.

Figure 18:
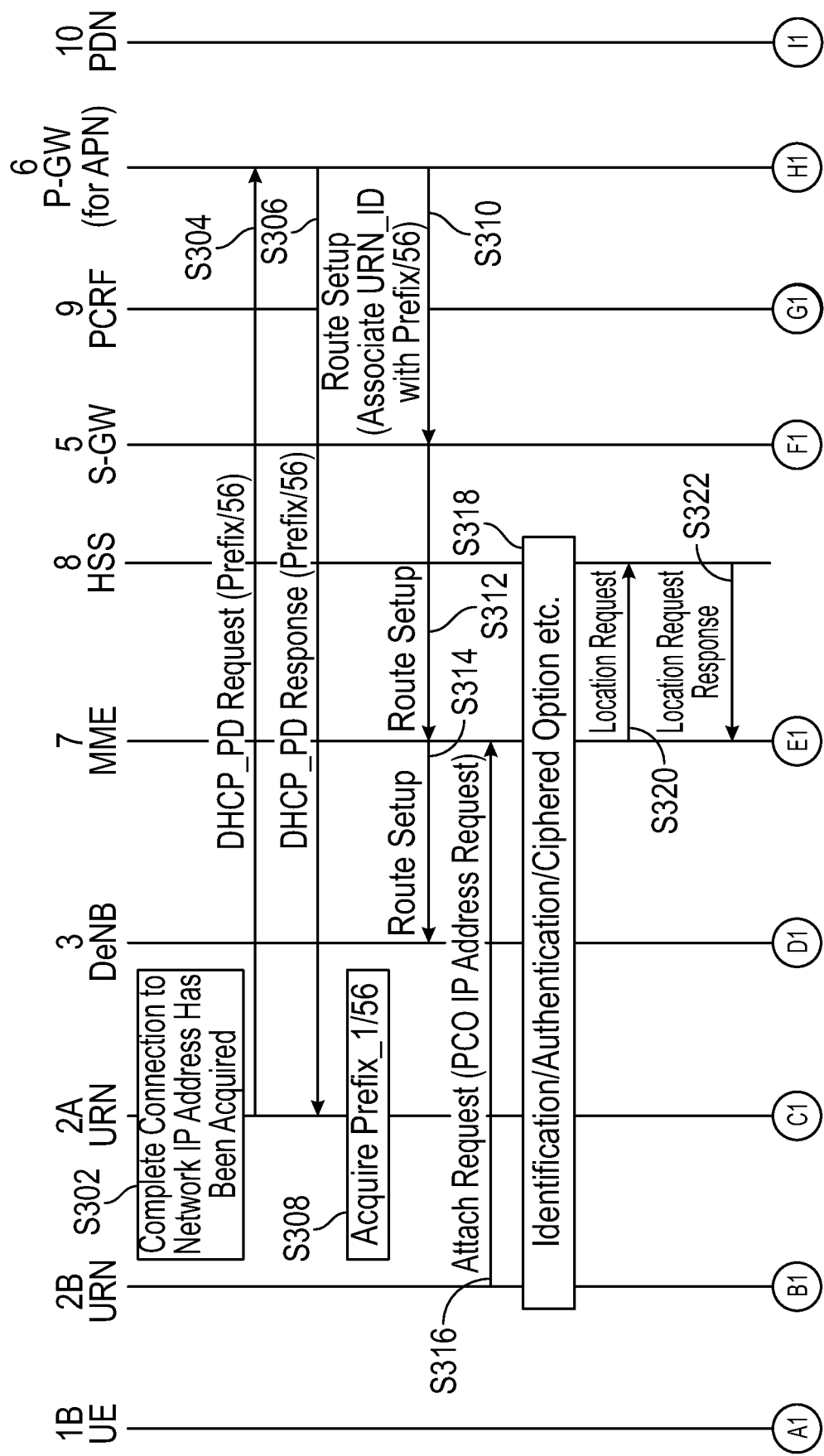
FIG. 18 is an explanatory diagram of technical features in the embodiment.

As illustrated in FIG. 18, it is assumed that the URN 2A has completed the connection to the network through the aforementioned procedure with reference to FIG. 15, for example, first, and has acquired the IP address (Step S302). Then, the URN 2A transmits a DHCP-PD request (DHCP_PD Request) that is for requesting the prefix portion (Prefix/56) of the IP address of the URN 2B to the P-GW 6 (Step S304). Next, the P-GW 6 transmits a DHCP-PD response (DHCP_PD Response) including the prefix portion (Prefix/56) of the IP address of the URN 2B to the URN 2A (Step S306). In this manner, the URN 2A acquires the prefix portion (Prefix/56) of the IP address of the URN 2B (Step S308). On the other hand, the P-GW 6 transmits the route setup (Route Setup) for associating the identification information (URN_ID) of the URN 2B with the prefix portion (Prefix/56) to the S-GW 5 (Step S310). The S-GW 5 transfers the route setup (Route Setup) to the MME 7 (Step S312). The MME 7 transfers the route setup (Route Setup) to the DeNB 3 (Step S314). Next, the URN 2B transmits an attachment request (Attach Request (PCO IP Address Request) to the MME 7 (Step S316). Then, the URN 2B performs identification, authentication, encryption (Identification/Authentication/Ciphered option etc.) with the URN 2A, the DeNB 3, the MME 7, and the HSS 8 (Step S318). Next, the MME 7 transmits a location request (Location Request) to the HSS 8 (Step S320). Then, the HSS 8 transmits a location request response (Location Request Response) to the MME 7 (Step S322).

Figure 19:
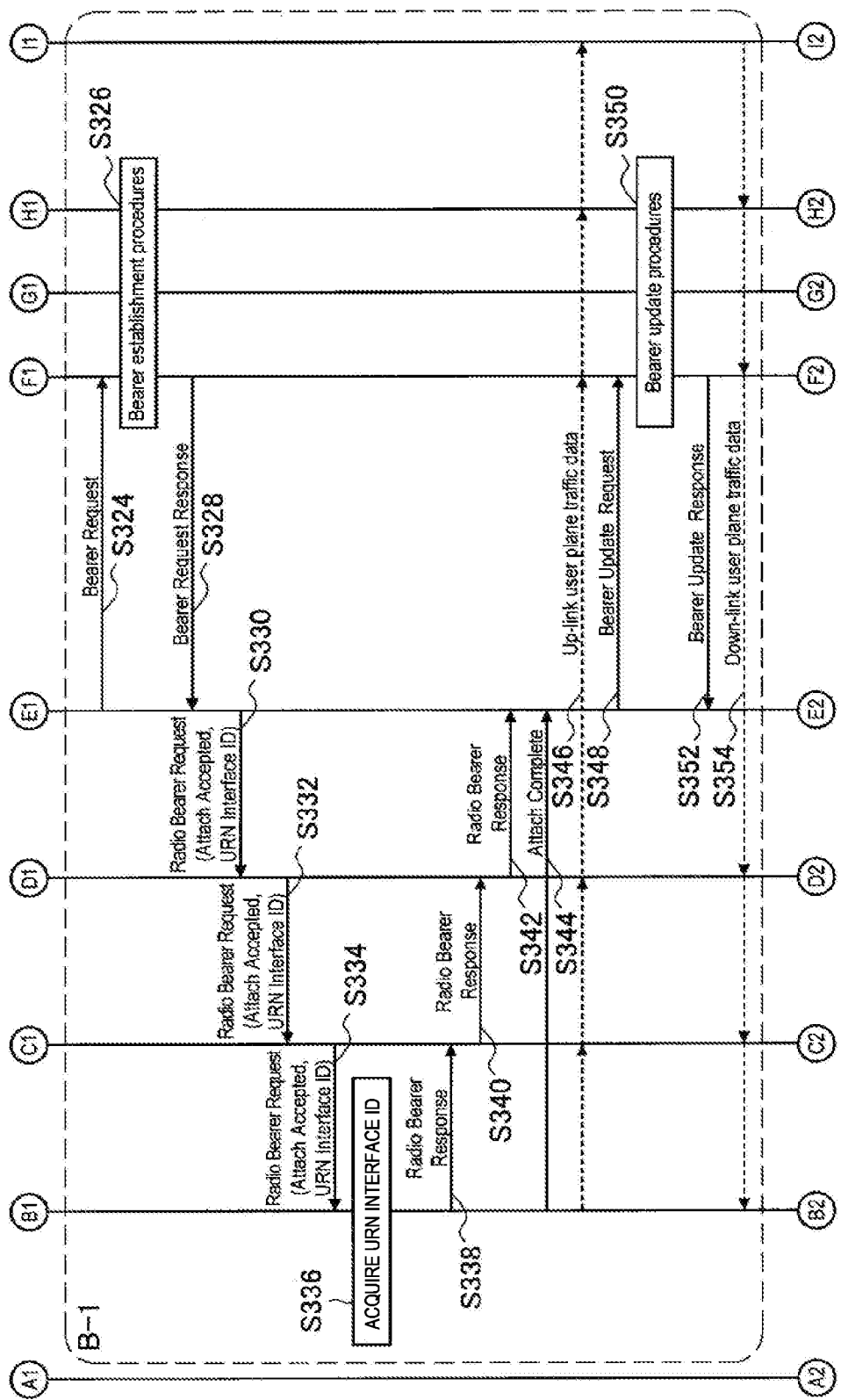
FIG. 19 is an explanatory diagram of technical features in the embodiment.

Next, the MME 7 transmits a bearer request (Bearer Request) to the S-GW 5 as illustrated in FIG. 19 (Step S324). Then, the S-GW 5 performs bearer establishment procedures (Bearer establishment procedures) with the PCRF 9 and the P-GW 6 (Step S326). Then, the S-GW 5 transmits a bearer request response (Bearer Request Response) to the MME 7 (Step S328). Then, the MME 7 transmits an attachment acceptance (Attach Accepted) and radio bearer request (Radio Bearer Request) including the interface ID (URN Interface ID) of the URN 2B to the DeNB 3 (Step S330). Next, the DeNB 3 transmits an attachment acceptance (Attach Accepted) and a radio bearer request (Radio Bearer Request) including the interface ID (URN Interface ID) of the URN 2B to the URN 2A (Step S332). Then, the URN 2A transmits an attachment acceptance (Attach Accepted) and a radio bearer request including an interface ID (URN Interface ID) of the URN 2B to the URN 2B (Step S334). In this manner, the URN 2B acquires the interface identifier (UE interface ID) of the URN 2B itself (Step S336). Next, the URN 2B transmits a radio bearer response (Radio Bearer Response) to the URN 2A (Step S338). Then, the URN 2A transmits a radio bearer response (Radio Bearer Response) to the DeNB 3 (Step S340). Next, the DeNB 3 transmits a radio bearer response (Radio Bearer Response) to the MME 7 (Step S342). Then, the URN 2B transmits attachment completion (Attach Complete) to the MME 7 (Step S344). Next, the URN 2B can transmit uplink user plane traffic data to the PDN 10 via the URN 2A, the DeNB 3, the S-GW 5, and the P-GW 6 (Step S346). Then, the MME 7 transmits a bearer update request (Bearer Update Request) to the S-GW 5 (Step S348). Next, the S-GW 5 performs bearer update procedures (Bearer update procedures) with the PCRF 9 and the P-GW 6 (Step S350). Then, the S-GW 5 transmits a bearer update response (Bearer Update Response) to the MME 7 (Step S352). This makes it possible to transmit downlink user plane traffic data from the PDN 10 to the URN 2B via the P-GW 6, the S-GW 5, the DeNB 3, and the URN 2A (Step S354).

Figure 20:
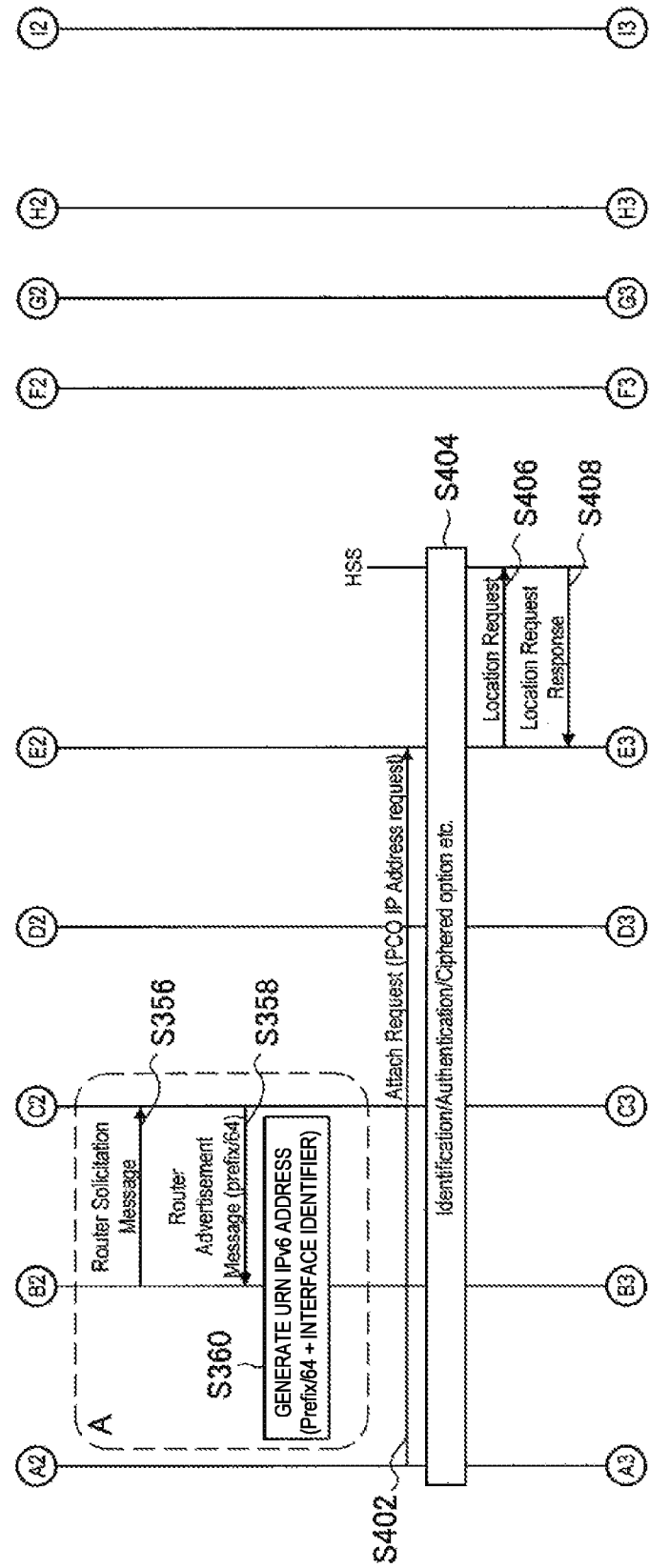
FIG. 20 is an explanatory diagram of technical features in the embodiment.
Figure 21:
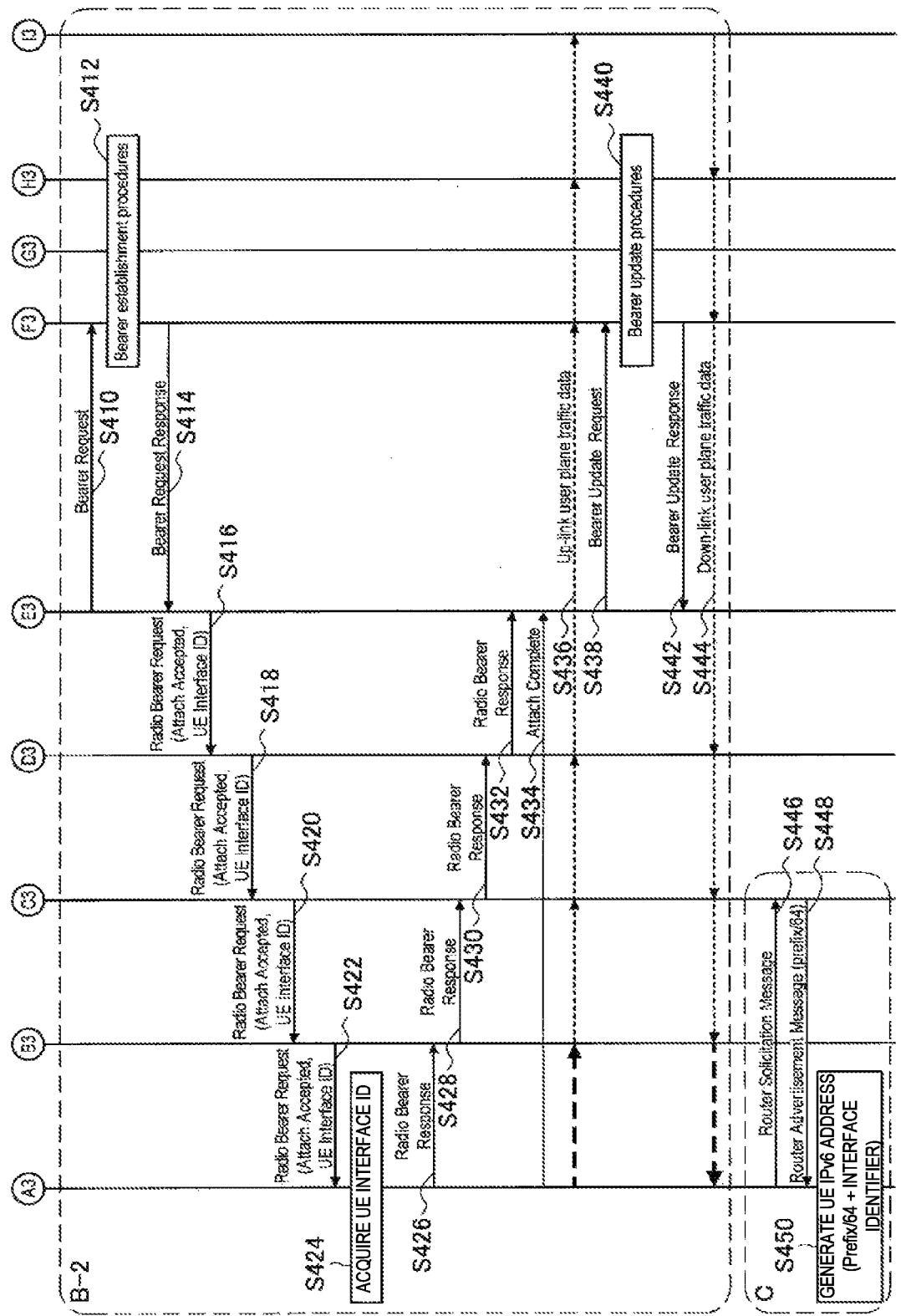
FIG. 21 is an explanatory diagram of technical features in the embodiment.

Then, the URN 2B transmits an RS message (Router Solicitation Message) to the URN 2A as illustrated in FIG. 20 (Step S356). Next, the URN 2A transmits an RA message (Router Advertisement Message) including Prefix/64 to the URN 2B (Step S358). Then, the URN 2B generates an IPv6 address (URN IPv6 Address) of the URN 2B itself that includes Prefix/64 and the interface identifier (Step S360).

The processing of assigning the IP address to the URN 2B connected to the URN 2A has been described above. Next, processing of assigning an IP address to the UE 1B connected to the URN 2B will be described.

First, the UE 1B transmits an attachment request (Attach Request (PCO IP Address Request) to the MME 7 (Step S402). Then, the UE 1B performs identification, authentication, encryption (Identification/Authentication/Ciphered option etc.) with the URN 2B, the URN 2A, the DeNB 3, the MME 7, and the HSS 8 (Step S404). Next, the MME 7 transmits a location request (Location Request) to the HSS 8 (Step S406). Then, the HSS 8 transmits a location request response (Location Request Response) to the MME 7 (Step S408).

Next, the MME 7 transmits a bearer request (Bearer Request) to the S-GW 5 as illustrated in FIG. 17 (Step S410). Then, the S-GW 5 performs bearer establishment procedures (Bearer establishment procedures) with the PCRF 9 and the P-GW 6 (Step S412). Then, the S-GW 5 transmits a bearer request response (Bearer Request Response) to the MME 7 (Step S414). Then, the MME 7 transmits an attachment acceptance (Attach Accepted) and radio bearer request (Radio Bearer Request) including the interface ID (UE-Interface ID) of the UE 1A to the DeNB 3 (Step S416). Next, the DeNB 3 transmits an attachment acceptance (Attach Accepted) and a radio bearer request (Radio Bearer Request) including the interface ID (UE-Interface ID) of the UE 1A to the URN 2A (Step S418). Then, the URN 2A transmits an attachment acceptance (Attach Accepted) and a radio bearer request including an interface ID (UE-Interface ID) of the UE 1B to the URN 2B (Step S420). Next, the URN 2B transmits an attachment acceptance (Attach Accepted) and a radio bearer request including an interface ID (UE-Interface ID) of the UE 1B to the UE 1B (Step S422). In this manner, the UE 1A acquires the interface identifier (UE interface ID) of the UE 1A itself (Step S424). Then, the UE 1B transmits a radio bearer response (Radio Bearer Response) to the URN 2B (Step S426). Next, the URN 2B transmits a radio bearer response (Radio Bearer Response) to the URN 2A (Step S428). Then, the URN 2A transmits a radio bearer response (Radio Bearer Response) to the DeNB 3 (Step S430). Next, the DeNB 3 transmits a radio bearer response (Radio Bearer Response) to the MME 7 (Step S432). In this manner, the UE 1B transmits attachment completion (Attach Complete) to the MME 7 (Step S434). Next, the UE 1A can transmit uplink user plane traffic data to the PDN 10 via the URN 2B, the URN 2A, the DeNB 3, the S-GW 5, and the P-GW 6 (Step S436). Then, the MME 7 transmits a bearer update request (Bearer Update Request) to the S-GW 5 (Step S438). Next, the S-GW 5 performs bearer update procedures (Bearer update procedures) with the PCRF 9 and the P-GW 6 (Step S440). Then, the S-GW 5 transmits a bearer update response (Bearer Update Response) to the MME 7 (Step S442). This makes it possible to transmit downlink user plane traffic data from the PDN 10 to the UE 1B via the P-GW 6, the S-GW 5, the DeNB 3, the URN 2A, and the URN 2B (Step S444). Then, the UE 1B transmits an RS message (Router Solicitation Message) to the URN 2A (Step S446). Next, the URN 2A transmits an RA message (Router Advertisement Message) including Prefix/64 to the UE 1A (Step S448). Then, the UE 1B generates an IPv6 address (UE IPv6 Address) of the UE 1A itself including Prefix/64 and the interface identifier (Step S450).

Here, the prefix portion may be hierarchized to correspond to the network with the nested structure. The hierarchization of the prefix portion will be described with reference to FIGS. 22 and 23.

Figure 22:
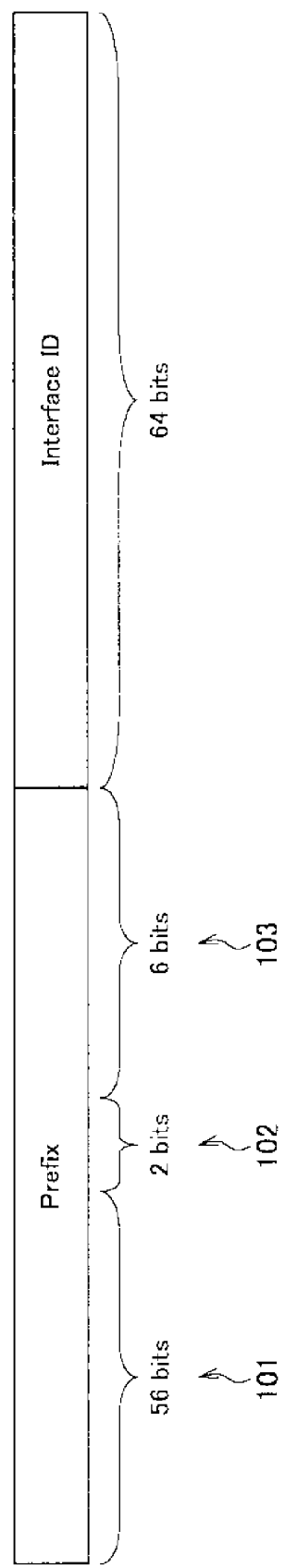
FIG. 22 is an explanatory diagram of technical features in the embodiment.

FIG. 22 is an explanatory diagram of hierarchization of the prefix portion of the IPv6 according to the embodiment. As illustrated in FIG. 22, the IP address of the IPv6 is 128 bits. The higher bits among them are also referred to as a prefix portion, and the remaining lower bits are also referred to an interface identifier. Although the respective lengths are arbitrary, both the lengths are assumed to be 64 bits in this specification. In addition, each of the plurality of virtual cells formed by the URN 2 or another URN 2 may be identified by the non-common portion of the prefix portion of the IP address of 64 bits. For example, a higher portion 101 (56 bits in the example illustrated in FIG. 22) is a region that is prefix-delegated by the highest URN 2. In addition, a middle portion 102 (2 bits in the example illustrated in FIG. 22) is a region for identifying a virtual network. Note that the virtual network is a network with a nested structure including the plurality of virtual cells. In addition, a lower portion 103 (6 bits in the example illustrated in FIG. 22) is a region for identifying a virtual cell in each virtual network. It is possible to express the network with the nested structure illustrated in FIG. 23, for example, by such hierarchization.

Figure 23:
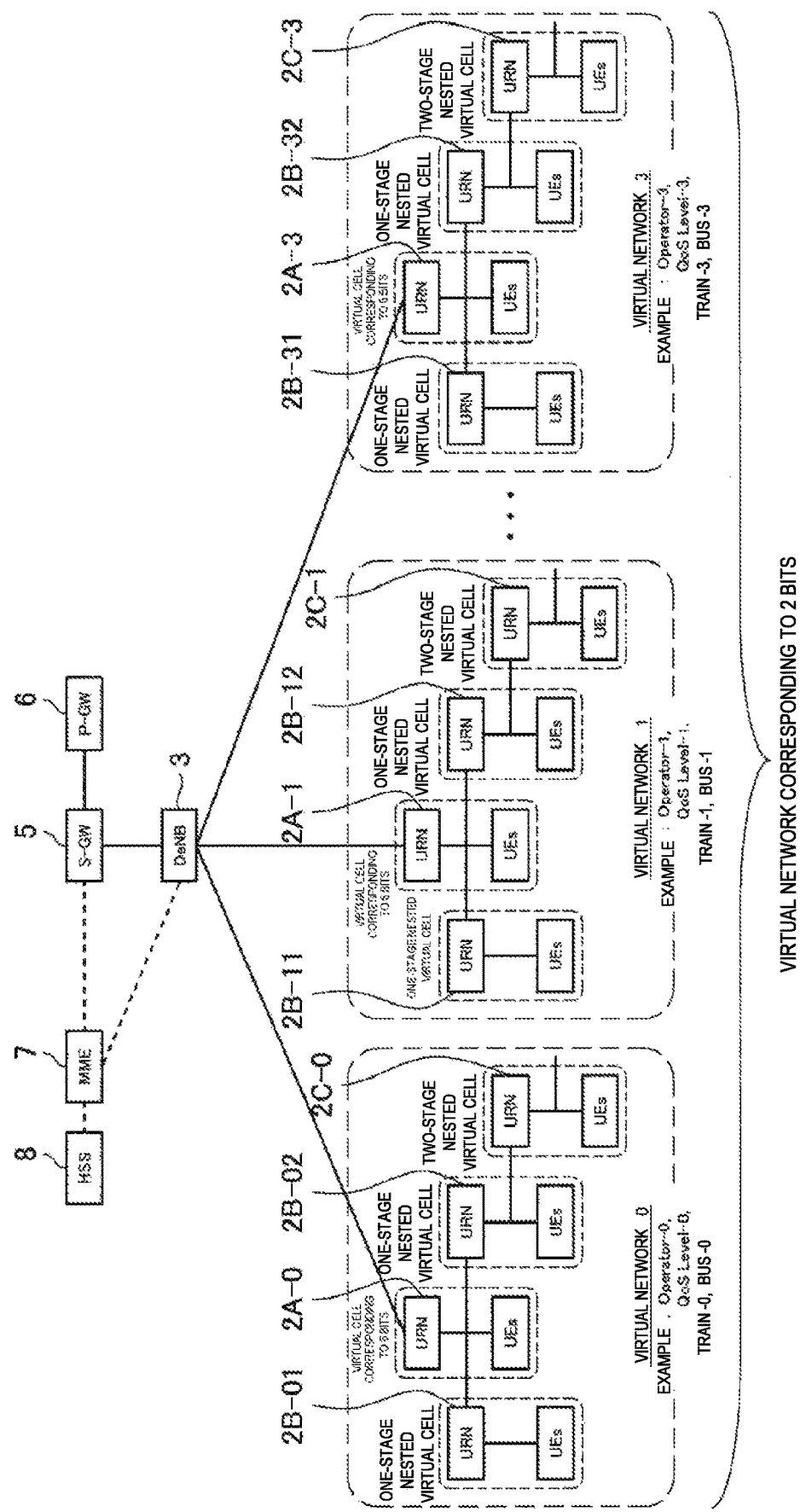
FIG. 23 is an explanatory diagram of technical features in the embodiment.

FIG. 23 is a diagram illustrating an example of the network with the nested structure. As illustrated in FIG. 23, a plurality of virtual networks are connected to the DeNB 3. The virtual network "0" is a group of virtual cells, in which a URN 2A-0 is the highest. The virtual network "1" is a group of virtual cells, in which a URN 2A-1 is the highest. The virtual network "3" is a group of virtual cells, in which a URN 2A-3 is the highest. These respective virtual networks are identified by the middle portion 102.

The plurality of virtual cells are included in the virtual network. Hereinafter, description will be given by focusing on the virtual network "0". A virtual cell formed by the URN 2B-01 and a virtual cell formed by the URN 2B-02 are connected to the virtual cell formed by the URN 2A-0. These virtual cells can also be referred to as one-stage nested virtual cells. In addition, a virtual cell formed by the URN 2C-0 is connected to the virtual cell formed by the URN 2B-02. This virtual cell can also be referred to as two-stage nested virtual cell. Although not illustrated in the drawing, there may be a three-stage or more nested virtual cell. These virtual cells included in a single virtual network are identified by the lower portion 103. Similar description is applied to other virtual networks.

Since the individual virtual cells are uniquely identified by such hierarchization of the prefix portion of the IP address, it is possible to simplify the mapping table (routing table), which will be described later. Further, it becomes unnecessary to update the mapping table in a higher order when the cell or the terminal located in a lower order moves.

Figure 24:
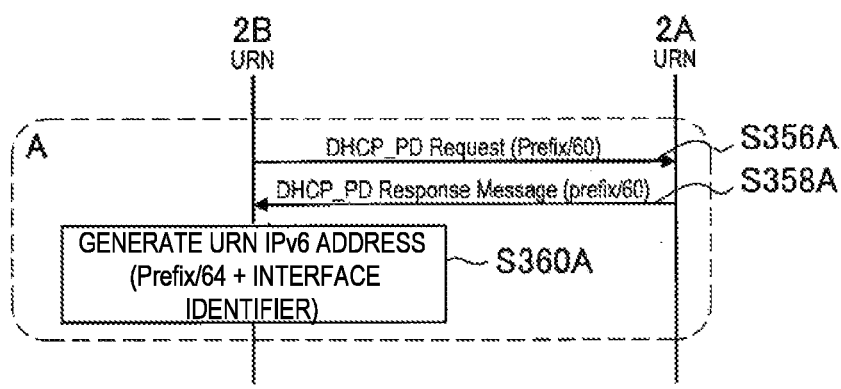
FIG. 24 is an explanatory diagram of technical features in the embodiment.
Figure 25:
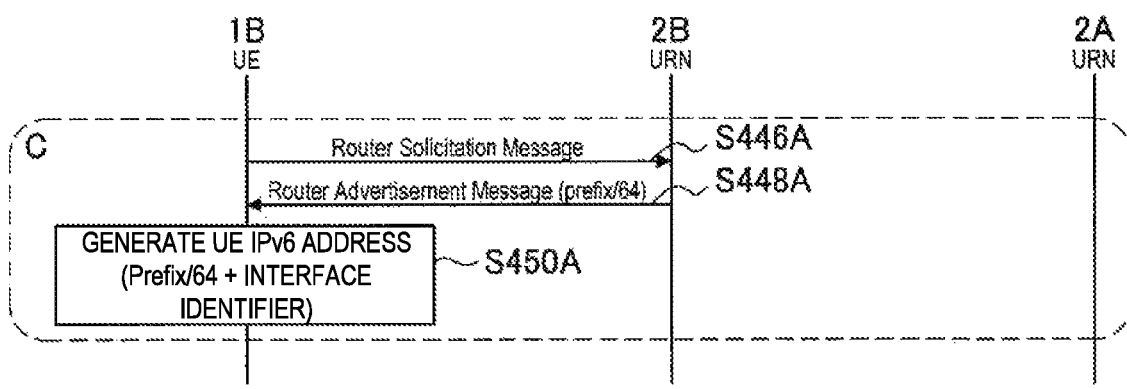
FIG. 25 is an explanatory diagram of technical features in the embodiment.

In order to realize such hierarchization, the rectangular portion "A" of the broken line is replaced with the sequence illustrated in FIG. 24, and the rectangular portion "C" is replaced with the sequence illustrated in FIG. 25 from among the sequences illustrated in FIGS. 18 to 21. FIGS. 24 and 25 are sequence diagrams illustrating an example of a flow of processing of assigning IP addresses to the URN 2B connected to the URN 2A and the UE 1B connected to the URN 2B according to the embodiment.

As illustrated in FIG. 24, the URN 2B transmits a DHCP_PD request (DHCP_PD Request) that is for requesting the prefix portion (Prefix/60) of the IP address of the URN 2B itself to the URN 2A (Step S356A). Next, the URN 2A transmits a DHCP_PD response (DHCP_PD Response) including the prefix portion (Prefix/60) of the IP address of the URN 2B to the URN 2B (Step S358A). Then, the URN 2B designates the lower bits "0000", for example, for the acquired prefix portion (Prefix/60) to creates Prefix/64 and generates a IPv6 address (URN IPv6 Address) of the URN 2B itself that includes Prefix/64 and the interface identification (Step S360A).

The URN 2B hierarchizes the subordinate URN 2C and the like by using the lower 4 bits of the prefix portion (Prefix/60) of the IP address acquired in Step S358A. For example, the URN 2B assigns different lower 4 bits for each subordinate virtual cell, and in a case in which a DHCP_PD request message is received from the subordinate URN 2C or the like, the URN 2B replies the prefix portion (Prefix/64), to which the lower 4 bits have been assigned, in a DHCP_PD response message. Therefore, the UE 1 receives designation of the prefix portion (Prefix/64) of the IP address from the connected URN 2 rather than the URN 2 in the highest order in the virtual network. A sequence in this case is as illustrated in FIG. 25.

Then, the UE 1B transmits an RS message (Router Solicitation Message) to the URN 2B as illustrated in FIG. 25 (Step S446A). Next, the URN 2B transmits an RA message (Router Advertisement Message) including layered Prefix/64 to the UE 1B (Step S448A). Then, the UE 1B generates an IPv6 address (UE IPv6 Address) of the UE 1B itself that includes Prefix/64 and the interface identifier (Step S450A).

Figure 26:
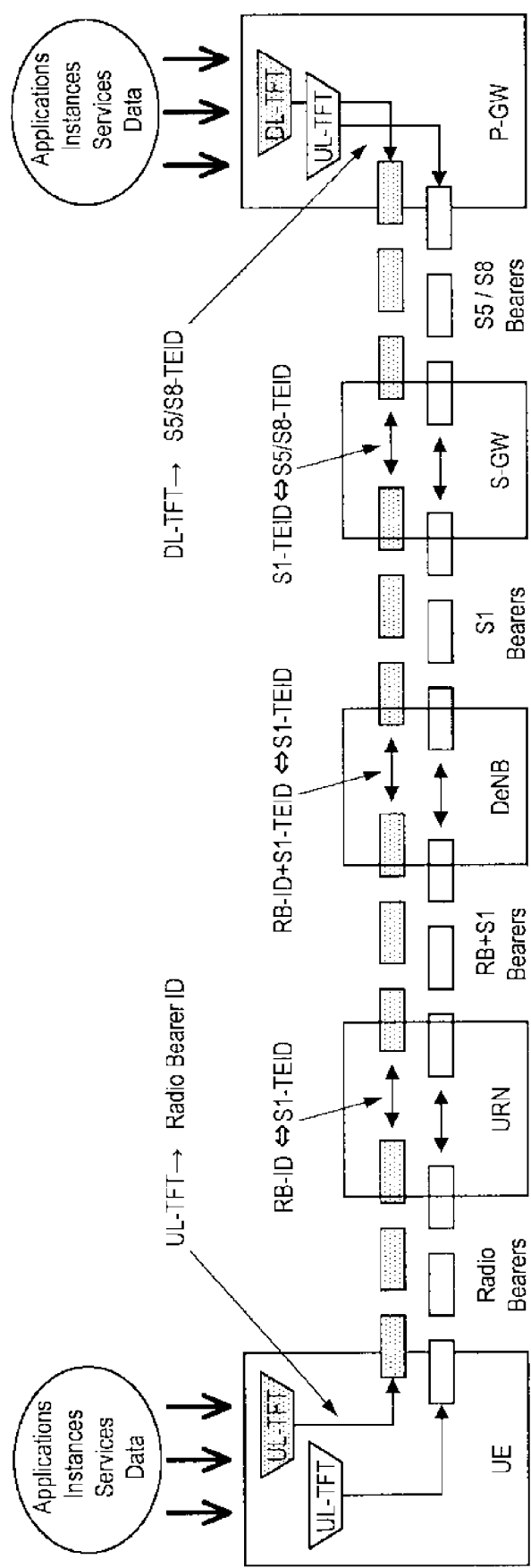
FIG. 26 is an explanatory diagram of technical features in the embodiment.

Here, bears are set from the UE 1 to the P-GW 6 through the URN 2, the DeNB 3, and the S-GW 5 as illustrated in FIG. 26. FIG. 26 is an example illustrating examples of the bears and traffic flow templates (TFTs) set from the UE 1 to the P-GW 6.

A transmission path set between the URN 2 and the P-GW 6 may be diverted for the section between the URN 2 and the P-GW 6 in the transmission path set between the subordinate UE 1 or the subordinate URN 2 and the P-GW 6. Note that the transmission path described here may be a bearer, or in a case in which a bearerless network, the transmission path may be an IP flow. In regard to the sequence described in FIGS. 18 to 21, the bearer from the P-GW 6 to the URN 2A established by the rectangle 'B-1" of the broken line may be diverted for the bearer from the P-GW 6 to the UE 1B established by the rectangle 'B-2" of the broken line. In this manner, bearers of the group of UEs 1 connected to the URN 2, that is, the group of UEs 1 that have IP addresses with common prefix portions can be aggregated, and it becomes possible to significantly reduce the amount of signaling that accompanies establishment of the bearers. Hereinafter, such a bearer configuration of a virtual cell will be described with reference to FIG. 27.

Figure 27:
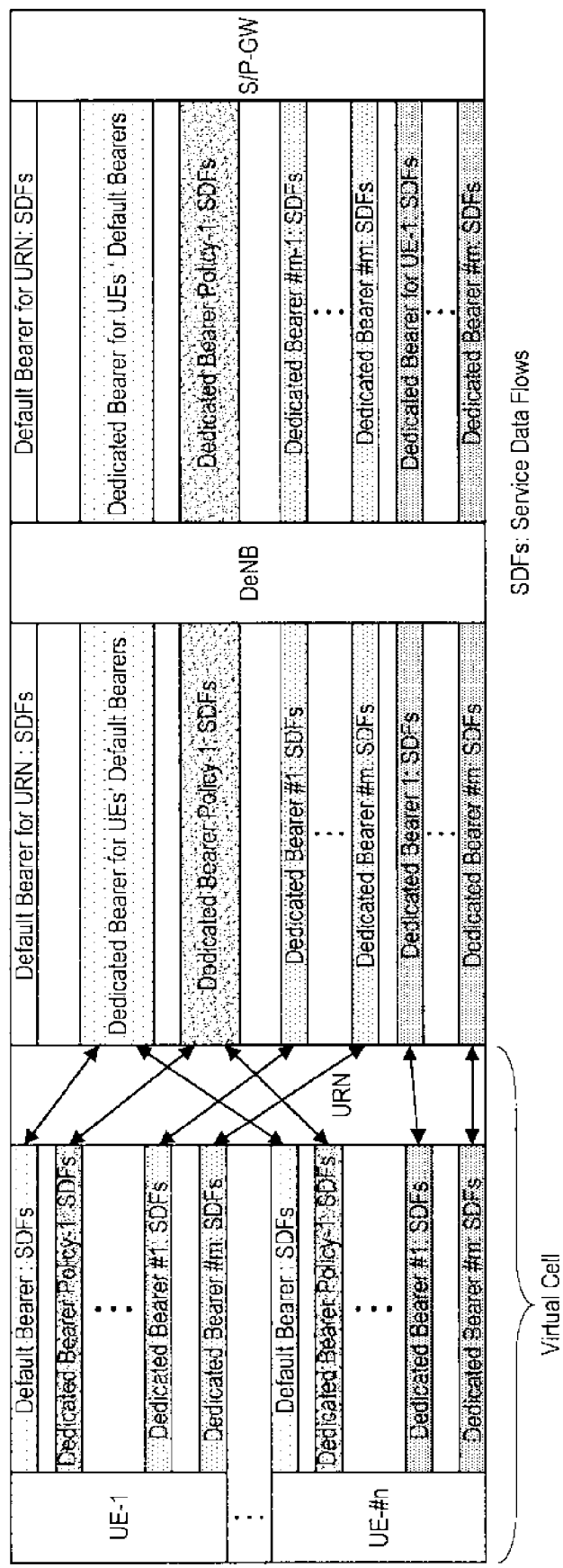
FIG. 27 is an explanatory diagram of technical features in the embodiment.

FIG. 27 is a diagram illustrating an example of a bearer configuration of a virtual cell. As illustrated in FIG. 27, a default bearer and a dedicated bearer (dedicated) are respectively established between the URN 2 and the UE 1. Meanwhile, the individual bearer and the dedicated bearer are not established for each UE 1 between the UE 1 and the P-GW 6. Instead, the default bearer and the dedicated bearer established between the URN 2 and the UE 1 are mapped to the dedicated bearer established between the URN 2 and the P-GW 6. In this manner, the UE 1 can utilize the dedicated bearer that the URN 2 that is the connection destination has established with the P-GW 6 without individually establishing the bearers from the URN 2 to the P-GW 6.

Here, one dedicate bearer established between the URN 2 and the P-GW 6 may be diverted (that is, shared) by a plurality of subordinate UE 1 or may be individually diverted by one UE 1. For example, each of the default bearer of the group of the UEs 1 and the dedicated bearer of "Policy-1" is mapped to one dedicated bearer established between the URN 2 and the P-GW 6. Meanwhile, each of default bearers "#1" and "# m" in the group of UEs 1 are mapped to different dedicated bearers established between the URN 2 and the P-GW 6.

The URN 2 individually utilizes the default bearer of the URN 2 itself. The URN 2 may establish and secure a plurality of dedicated bearer for each band or each policy such as QoS, for example, for the subordinate UE 1 or the subordinate URN 2.

It is a matter of course that the UE 1 may establish a bearer with the P-GW 6 without diverting the bearer established between the URN 2 and the P-GW 6.

Description will be given with reference to the aforementioned sequence. When the bearer between the URN 2 and the P-GW 6 is established in the rectangular portion "A" of the broken line in the sequence illustrated in FIG. 15, for example, the URN 2 establishes and secures a plurality of dedicated bearers in advance for the UE 1 that will be connected to the URN 2 in the future. Then, when the UE 1 establishes the bearer in the rectangular portion "A" of the broken line in the sequence illustrated in FIGS. 16 and 17, only a radio bearer between the UE 1 and the URN 2 is newly established, and a bearer established and secured in advance is utilized as the bearer from the URN 2 to the P-GW 6. The radio bearer newly established corresponds to the thick broken line portion in Step S246 and Step S254 in FIG. 17. Similar description is also applied to the sequence in FIGS. 18 to 21.

It is a matter of course that the proposed protocol can also be applied to an architecture in a next-generation network that is not compatible with EPC of existing 3GPP. Such an architecture will be described with reference to FIGS. 28 and 29.

Figure 28:
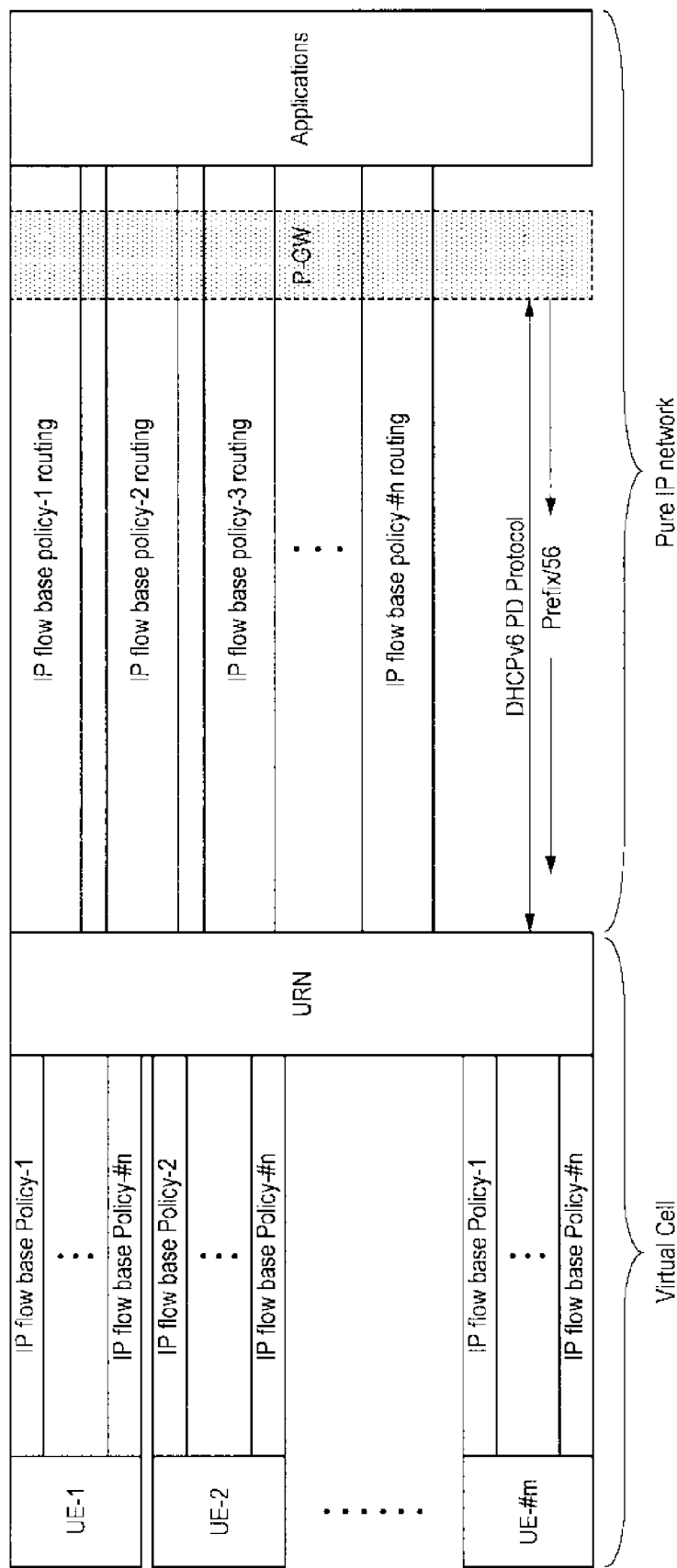
FIG. 28 is an explanatory diagram of technical features in the embodiment.
Figure 29:
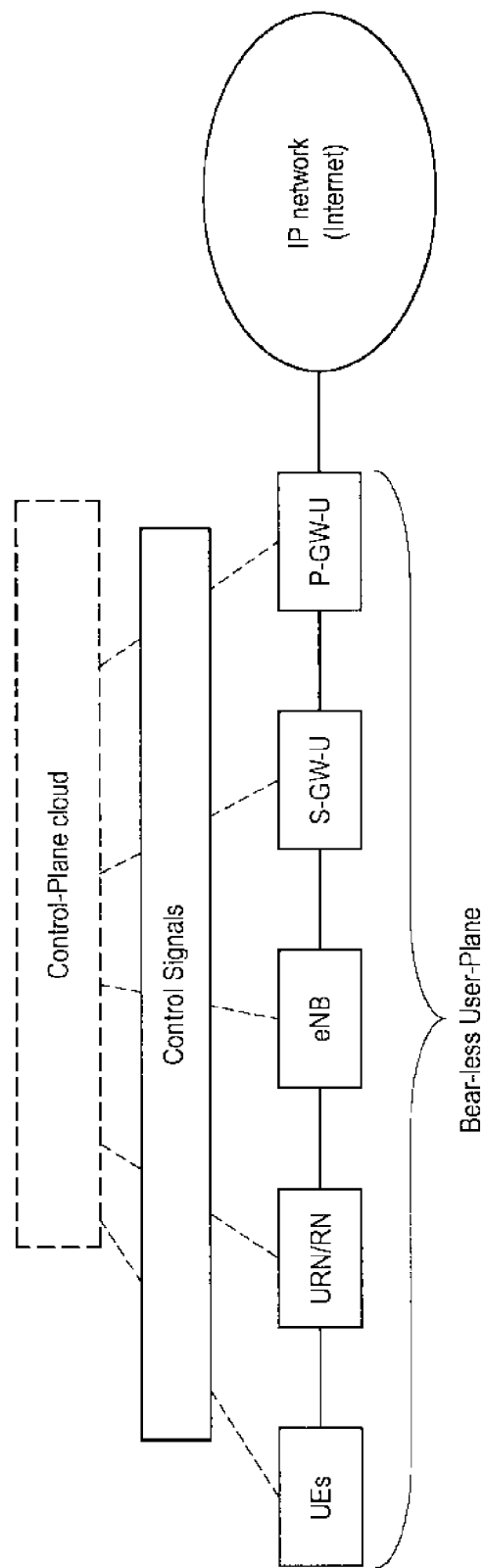
FIG. 29 is an explanatory diagram of technical features in the embodiment.

FIGS. 28 and 29 are diagrams illustrating an example of an architecture of a next-generation network. FIG. 28 illustrates an architecture of a bearerless network that is realized by a so-called pure IP network. In this case, an IP flow is in charge of a role of the bearer. In this architecture, it is possible to realize IP transmittivity of the group of UEs 1 connected to the URN 2 without the mechanism such as a mobile IP, by commonly setting the prefix portions. FIG. 29 illustrates an architecture in which a control plane and a user plane are separated by utilizing a cloud.

<3.2. Handling of Network Layer IP Address During Handover>

Hereinafter, handling of a network layer IP address during handover that accompanies movement of the UE 1 or the URN 2 will be described with reference to FIGS. 30 to 36. In this section, the network layer IP address will also simply be referred to as an IP address.

Figure 30:
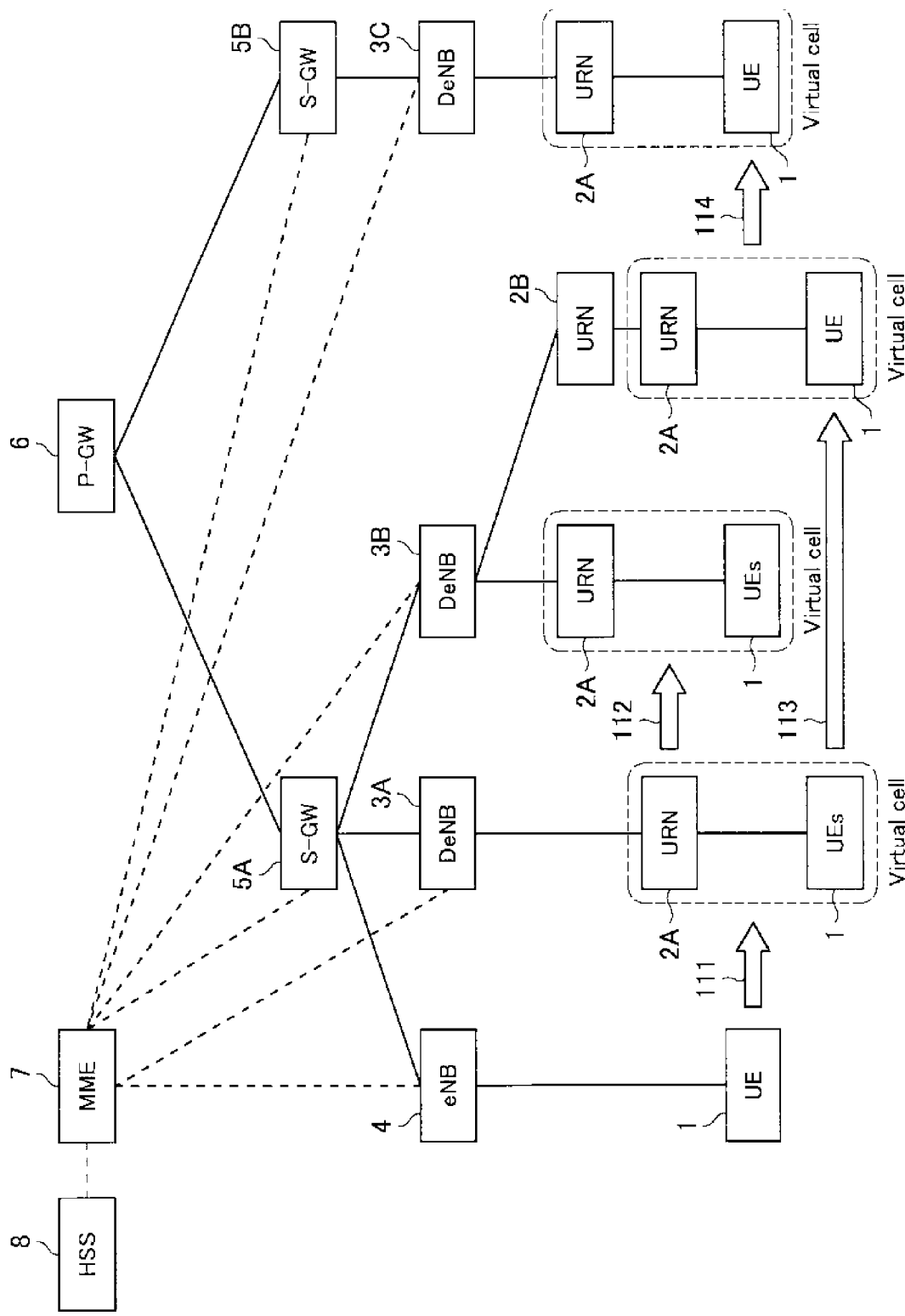
FIG. 30 is an explanatory diagram of technical features in the embodiment.

FIG. 30 is an explanatory diagram of handling of the IP address during handover. In this section, handling of the IP address during handover that accompanies transition of the network configuration illustrated in FIG. 30 will be described. As illustrated in FIG. 30, the UE 1 is initially connected to the eNB 4. The handover represented by the reference numeral 111 is handover of the UE 1. The handover represented by the reference numerals 112 to 114 is handover of the URN 2A. Here, a handover procedure of a relay node is not clearly defined in the 3GPP.

(1) Handover Represented by Reference Numeral 111

The UE 1 performs handover from the eNB 4 to the URN 2A. The UE 1 has already acquired the IP address through the attachment procedure performed at the time of connection to the eNB 4. Therefore, the UE 1 continuously utilizes an IP address acquired before the handover even after the handover in accordance with the framework of the handover according to the 3GPP. Therefore, the UE 1 utilizes an IP address that is different from the IP address which is assigned to the UE that is initially connected to the virtual cell of the URN 2A and has a common prefix portion (Prefix/56) after the handover. Note that an EPS bearer up to the P-GW 6 is updated by the attachment procedure.

In a case in which the UE 1 has already acquired the IP address, has completed the attachment procedure, and has generated the IP address including the prefix portion of the virtual cell after handover, the UE 1 stores a clock time at which the procedure for attachment to the URN 2A has been completed. Then, the UE 1 uses the IP address (that is, a first network layer IP address) newly assigned after the handover to a socket that is opened after the stored clock time at which the procedure for attachment to the URN 2A has been completed. On the other hand, the UE 1 continuously uses the IP address (that is, a second network layer IP address) assigned before the handover to a socket that is opened before the stored clock time at which the attachment to the URN 2 has been completed. Therefore, if the socket that is opened before the stored clock time is closed, this means that use of the IP address acquired before the handover has ended. In this manner, it becomes possible for the UE 1 to utilize the new IP address with elapse of time after the handover and to benefic advantages such as sharing of bearers and utilization of mapping tables, which will be described later. The UE 1 may notify the URN 2A to which the UE 1 is being connected of information indicating that the socket using the IP address assigned before the handover has been closed, that is, information indicating that the utilization of the IP address assigned before the handover has ended. In this manner, it becomes possible to save the amount of information in the mapping tables, which will be described later, and hierarchization and the like of routing in the virtual cell is realized.

In addition, the UE 1 utilizes a bearer established and secured by the URN 2A located in the highest order in the virtual cell for the group of UEs 1 in the virtual cell in advance through the attachment procedure when the UE 1 utilizes the new IP address. Basically, update of the bearer is performed by the MME 7 through the attachment procedure, and an EPS bearer dedicated for each UE 1 and each URN 2 is established. Each bearer is mapped with a tunnel endpoint identifier (TEID) of a general packet radio service (GPRS) tunneling protocol (GTP) and a radio bearer ID and is established. Here, mapping tables managed by the P-GW 6, the S-GW 5, the DeNB 3, and the URN 2 will be described later in detail.

(2) Handover Represented by Reference Numeral 112

The URN 2A performs handover from a DeNB 3A to a DeNB 3B. This handover is handover that utilizes a logical path (X2 interface) between the DeNBs 3 without switching of the S-GW 5. Here, the URN 2A behaves as the UE 1, and handover between base stations from the DeNB 3A to the DeNB 3B is performed.

The URN 2A continuously utilizes the IP address, which has been assigned before the handover, even after the handover in accordance with the frame of handover in 3GPP. In accordance with this, the group of subordinate UEs 1 of the URN 2A also continuously utilizes the IP addresses, which have been assigned before the handover, even after the handover of the URN 2A.

Figure 31:
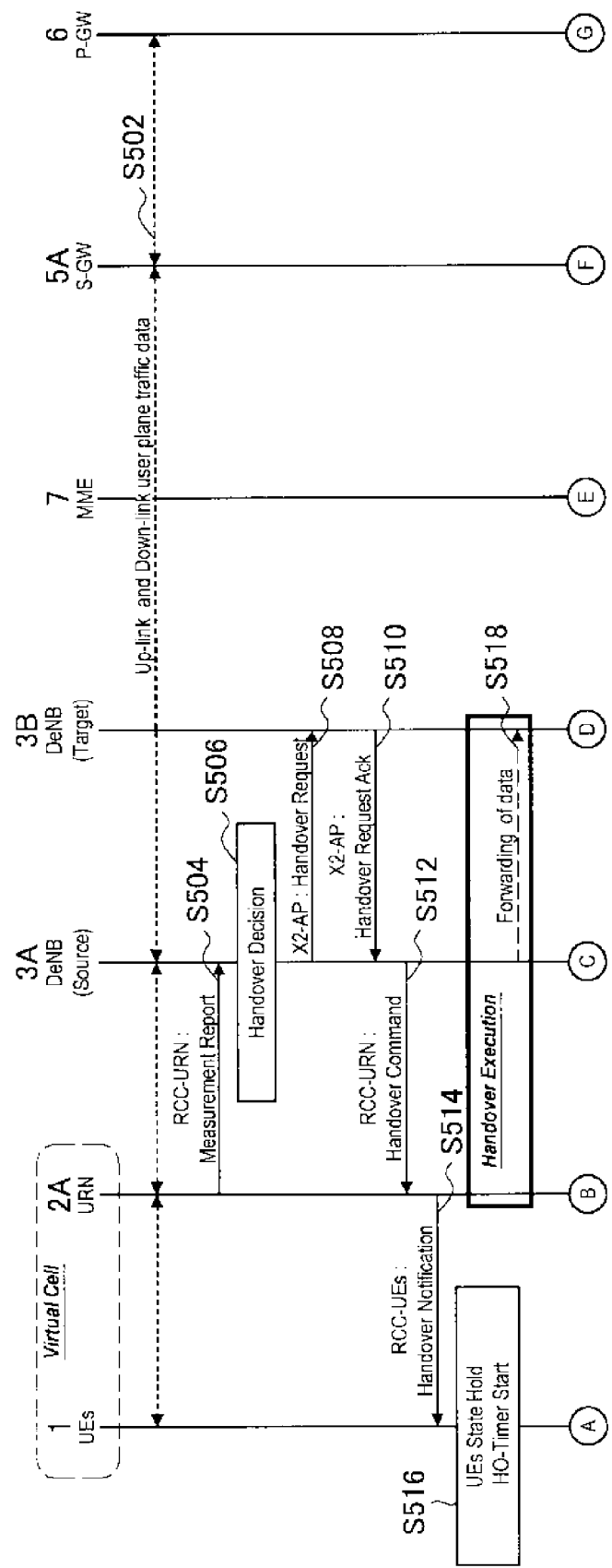
FIG. 31 is an explanatory diagram of technical features in the embodiment.

Here, the URN 2 may notify the group of subordinate UEs 1 of information indicating that the URN 2 itself will start handover (or is attempting to perform handover) (Step S514 in FIG. 31, for example). In addition, the URN 2 may notify the group of subordinate UEs 1 of information indicating that the URN 2 itself has completed the handover (Step S544 in FIG. 32, for example). In this manner, the subordinate devices can prevent shifting to handover to another URN 2 during the handover of the URN 2A. For example, if the UE 1 is notified of the information that the URN 2A that is a connection destination performs handover, the UE 1 may activate a handover timer or the like and prevent the procedure for attachment to another network for a predetermined period of time after the URN 2 starts the handover. In this manner, it becomes possible to suppress unnecessary signaling required for the handover procedure. It is not necessary for the group of the UEs 1 in the virtual cell to individually attempt the attachment procedure after the completion of the handover.

Hereinafter, an example of a flow of processing in the aforementioned hand over represented by the reference numeral 112 will be described with reference to FIGS. 31 and 32.

Figure 32:
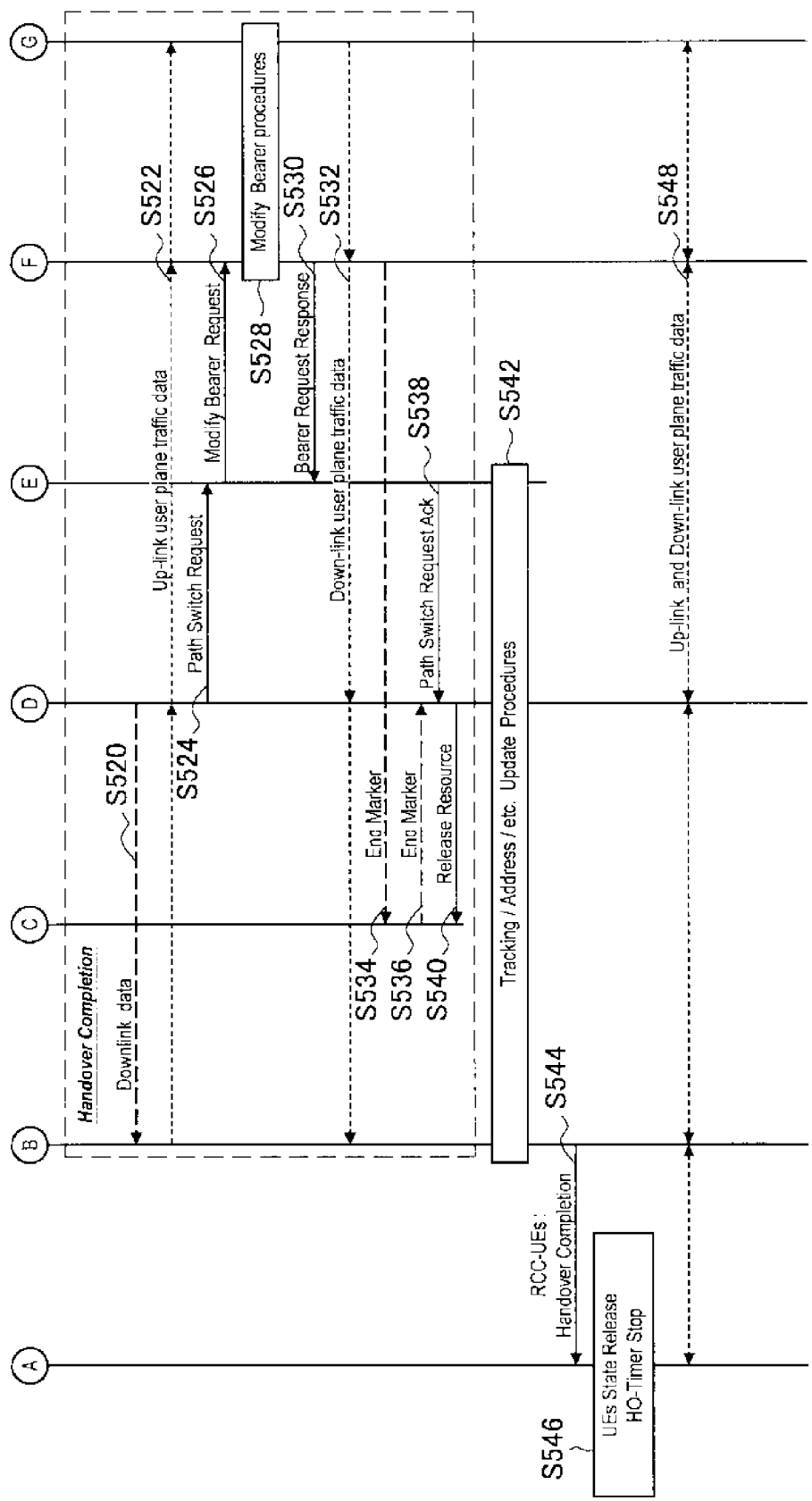
FIG. 32 is an explanatory diagram of technical features in the embodiment.

FIGS. 31 and 32 are sequence diagrams illustrating an example of a flow of handover processing performed by the URN 2 according to the embodiment. The group of UEs 1, the URN 2A, the DeNB 3A, the DeNB 3B, the MME 7, the S-GW 5, and the P-GW 6 are involved in the sequence. In addition, the group of UEs 1 and the URN 2A form a virtual cell. In addition, the DeNB 3A is a source DeNB while the DeNB 3B is a target DeNB.

As illustrated in FIG. 31, the group of UEs 1, the URN 2A, the DeNB 3A, the S-GW 5A, and the P-GW 6 are in a state in which they transmit and receive uplink and downlink user plane traffic data first (Step S502). Then, the URN 2A transmits a measurement report (RCC-URN: Measurement Report) to the DeNB 3A (Step S504). Next, the DeNB 3A performs handover determination (Handover Decision) (Step S506). Then, the DeNB 3A transmits a handover request (X2-AP: Handover Request) to the DeNB 3B (Step S508). Next, the DeNB 3B transmits a handover request ACK (X2-AP: Handover Request Ack) to the DeNB 3A (Step S510). Then, the DeNB 3A transmits a handover command (RCC-URN: Handover Command) to the URN 2A (Step S512). Next, the URN 2A transmits a handover notification (RCC-UEs: Handover Notification) to the group of subordinate UEs 1 (Step S514). In this manner, the group of UEs 1 starts the handover timer, holds the state (UEs State Hold/HO-Timer Start), and suppresses handover to another URN 2 (Step S516). Then, the DeNB 3A transfers data (Forwarding of data) to the DeNB 3B for executing handover (Handover Execution) (Step S518).

Next, the DeNB 3B transmits downlink data (Downlink data) to the URN 2A for completing handover (Handover Completion) as illustrated in FIG. 32 (Step S520). This makes it possible for the URN 2A to transmit uplink user plane traffic data to the P-GW 6 via the DeNB 3B and the S-GW 5A (Step S522). Next, the DeNB 3B transmits a path switch request (Path Switch Request) to the MME 7 (Step S524). Then, the MME 7 transmits a bearer modification request (Modify Bearer Request) to the S-GW 5A (Step S526). Next, the S-GW 5A performs bearer modification procedures (Modify Bearer procedures) with the P-GW 6 (Step S528). Then, the S-GW 5A transmits a bearer modification response (Modify Bearer Response) to the MME 7 (Step S530). This makes it possible for the P-GW 6 to transmit downlink user plane traffic data to the URN 2A via the S-GW 5A and the DeNB 3B (Step S532). Then, the S-GW 5A transmits an end marker (End Marker) to the DeNB 3A (Step S534). Next, the DeNB 3A transmits the end marker (End Marker) to the DeNB 3B (Step S536). Then, the MME 7 transmits a path switch request ACK (Path Switch Request Ack) to the DeNB 3B (Step S538). Next, the DeNB 3B transmits a release resource (Release Resource) to the DeNB 3A (Step S540). Then, the URN 2A performs update procedures (Tracking/Address/etc. Update procedures) of tracking, addresses, and the like between the DeNB 3B and the MME 7 (Step S542). Next, the URN 2A transmits handover completion (RCC-UEs: Handover Completion) to the group of subordinate UEs 1 (Step S544). In this manner, the group of UEs 1 stops the handover timer and opens the state (UEs State Release/HO-Timer Stop (Step S546). Then, the group of UEs 1, the URN 2A, the DeNB 3B, the S-GW 5A, and the P-GW 6 transmit and receive uplink and downlink user plane traffic data (Step S548).

(10) Handover Represented by Reference Numeral 113

The URN 2A performs handover from the DeNB 3A to the URN 2B. The handover described here can be performed by a procedure that is similar to that for the handover represented by the reference numeral 112 described above with reference to FIGS. 31 and 32.

For example, the URN 2A continuously utilizes the IP address, which has been assigned before the handover, even after the handover in accordance with the frame of handover in 3GPP. In accordance with this, the group of subordinate UEs 1 of the URN 2A also continuously utilizes the IP addresses, which have been assigned before the handover, even after the handover of the URN 2A.

For example, the URN 2A may notify the group of subordinate UEs 1 of a report that the URN 2A is attempting to perform handover and that the handover has been completed. Operations of the group of subordinate UEs 1 are also as described above.

(4) Handover Represented by Reference Numeral 114

The URN 2A performs handover from the URN 2B to a DeNB 3C. The handover is handover that utilizes a logical path (X2 Interface) between DeNBs 3 including a change from the S-GW 5A to the S-GW 5B. Here, the URN 2A behaves as the UE 1, and handover between base stations from the URN 2B to the DeNB 3C is performed. Basically, the URN 2B is regarded as a source DeNB, the DeNB 3C is regarded as a target DeNB, and the mechanism of 3GPP is applied. That is, the handover described herein can also be performed by a procedure that is similar to that for the respective handover described above.

For example, the URN 2A continuously utilizes the IP address, which has been assigned before the handover, even after the handover in accordance with the frame of handover in 3GPP. In accordance with this, the group of subordinate UEs 1 of the URN 2A also continuously utilizes the IP addresses, which have been assigned before the handover, even after the handover of the URN 2A.

For example, the URN 2A may notify the group of subordinate UEs 1 of a report that the URN 2A is attempting to perform handover and that the handover has been completed. Operations of the group of subordinate UEs 1 are also as described above.

Hereinafter, an example of a flow of processing in the aforementioned hand over represented by the reference numeral 113 will be described with reference to FIGS. 33 and 34.

Figure 33:
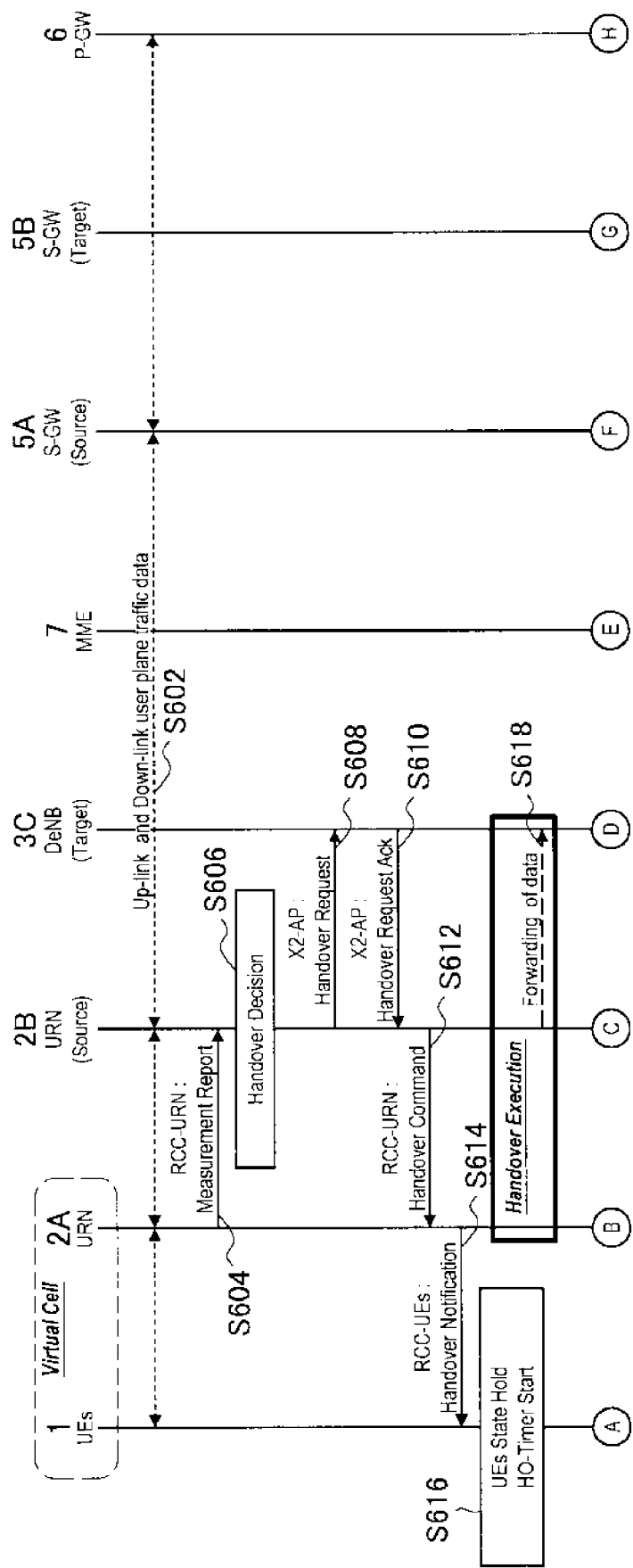
FIG. 33 is an explanatory diagram of technical features in the embodiment.
Figure 34:
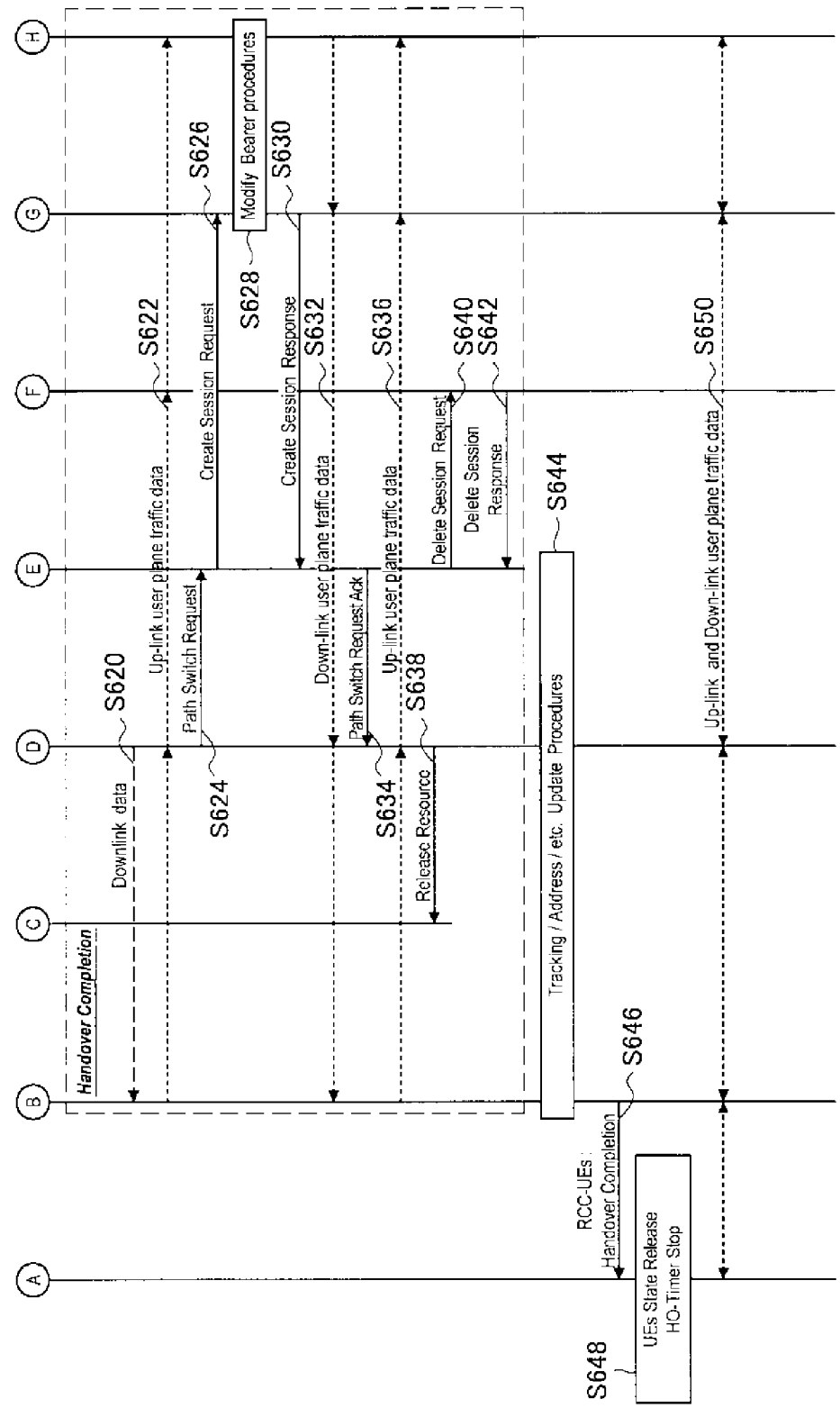
FIG. 34 is an explanatory diagram of technical features in the embodiment.

FIGS. 33 and 34 are sequence diagrams illustrating an example of a flow of handover processing performed by the URN 2 according to the embodiment. The group of UEs 1, the URN 2A, the URN 2B, the DeNB 3C, the MME 7, the S-GW 5A, the S-GW 5B, and the P-GW 6 are involved in the sequence. In addition, the group of UEs 1 and the URN 2A form a virtual cell. In addition, the URN 2B is a source DeNB while the DeNB 3C is a target DeNB. In addition, the S-GW 5A is a source S-GW while the S-GW 5B is a target S-GW.

As illustrated in FIG. 33, the group of UEs 1, the URN 2A, the URN 2B, the S-GW 5A, and the P-GW 6 are in an initial state in which they can transmit and receive uplink and downlink user plane traffic data first (Step S602). Then, the URN 2A transmits a measurement report (RCC-URN: Measurement Report) to the URN 2B (Step S604). Next, the URN 2B performs handover determination (Handover Decision) (Step S606). Then, the URN 2B transmits a handover request (X2-AP: Handover Request) to the DeNB 3C (Step S608). Next, the DeNB 3C transmits a handover request ACK (X2-AP: Handover Request Ack) to the URN 2B (Step S610). Then, the URN 2B transmits a handover command (RCC-URN: Handover Command) to the URN 2A (Step S612). Next, the URN 2A transmits a handover notification (RCC-UEs: Handover Notification) to the group of subordinate UEs 1 (Step S614). In this manner, the group of UEs 1 starts the handover timer, holds the state (UEs State Hold/HO-Timer Start), and suppresses handover to another URN 2 (Step S616). Then, the URN 2B transfers data (Forwarding of data) to the DeNB 3C for executing handover (Handover Execution) (Step S618).

Next, the DeNB 3C transmits downlink data (Downlink data) to the URN 2A for completing handover (Handover Completion) as illustrated in FIG. 34 (Step S620). This makes it possible for the URN 2A to transmit uplink user plane traffic data to the P-GW 6 via the DeNB 3C and the S-GW 5A (Step S622). Next, the DeNB 3C transmits a path switch request (Path Switch Request) to the MME 7 (Step S624). Then, the MME 7 transmits a session creation request (Create Session Request) to the S-GW 5B (Step S626). Next, the S-GW 5B performs bearer modification procedures (Modify Bearer procedures) with the P-GW 6 (Step S628). Then, the S-GW 5B transmits a session creation response (Create Session Response) to the MME 7 (Step S630). Next, the P-GW 6 transmits downlink user plane traffic data to the URN 2A via the S-GW 5B and the DeNB 3C (Step S632). Then, the MME 7 transmits path switch request ACK (Path Switch Request Ack) to the DeNB 3C (Step S634). Next, the URN 2A transmits uplink user plane traffic data to the P-GW 6 via the DeNB 3C and the S-GW 5B (Step S636). Then, the DeNB 3C transmits a release resource (Release Resource) to the URN 2B (Step S638). Next, the MME 7 transmits a session deletion request (Delete Session Request) to the S-GW 5A (S640). Then, the S-GW 5A transmits a session deletion response (Delete Session Response) to the MME 7 (S642). Next, the URN 2A performs update procedures (Tracking/Address/etc. Update procedures) of tracking, addresses, and the like between the DeNB 3C and the MME 7 (Step S644). Next, the URN 2A transmits handover completion (RCC-UEs: Handover Completion) to the group of subordinate UEs 1 (Step S646). In this manner, the group of UEs 1 stops the handover timer and opens the state (UEs State Release/HO-Timer Stop) (Step S648). This makes it possible for the group of UEs 1, the URN 2A, the DeNB 3C, the S-GW 5B, and the P-GW 6 to transmit and receive uplink and downlink user plane traffic data (Step S650).

Although the handover procedure utilizing the X2 interface has been described above, it is a matter of course that a handover procedure utilizing an S1 interface may be performed. Processing in a case in which the handover represented by the reference numeral 114 is performed by utilizing the S1 interface will be described as one example with reference to FIGS. 35 and 36.

Figure 35:
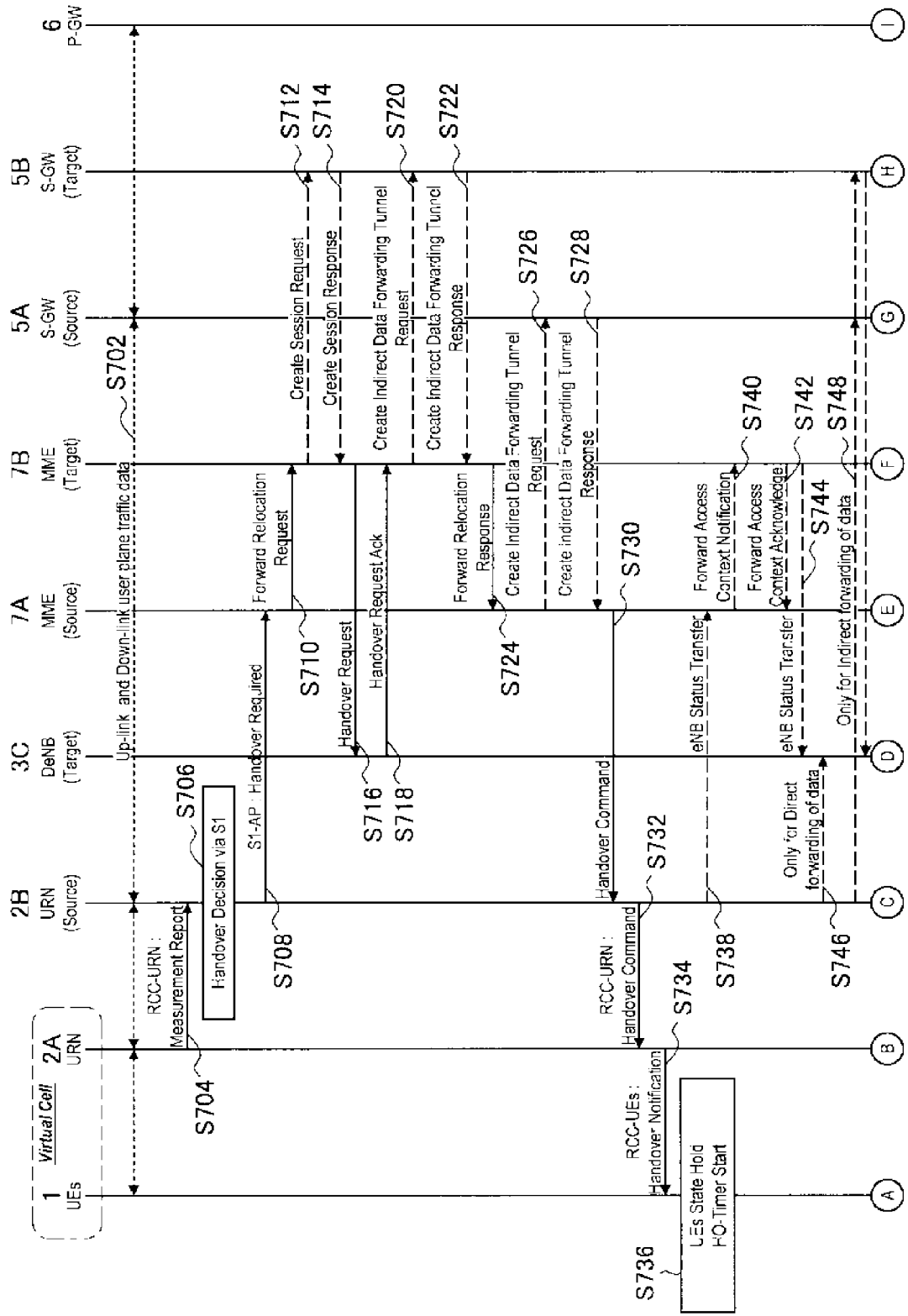
FIG. 35 is an explanatory diagram of technical features in the embodiment.
Figure 36:
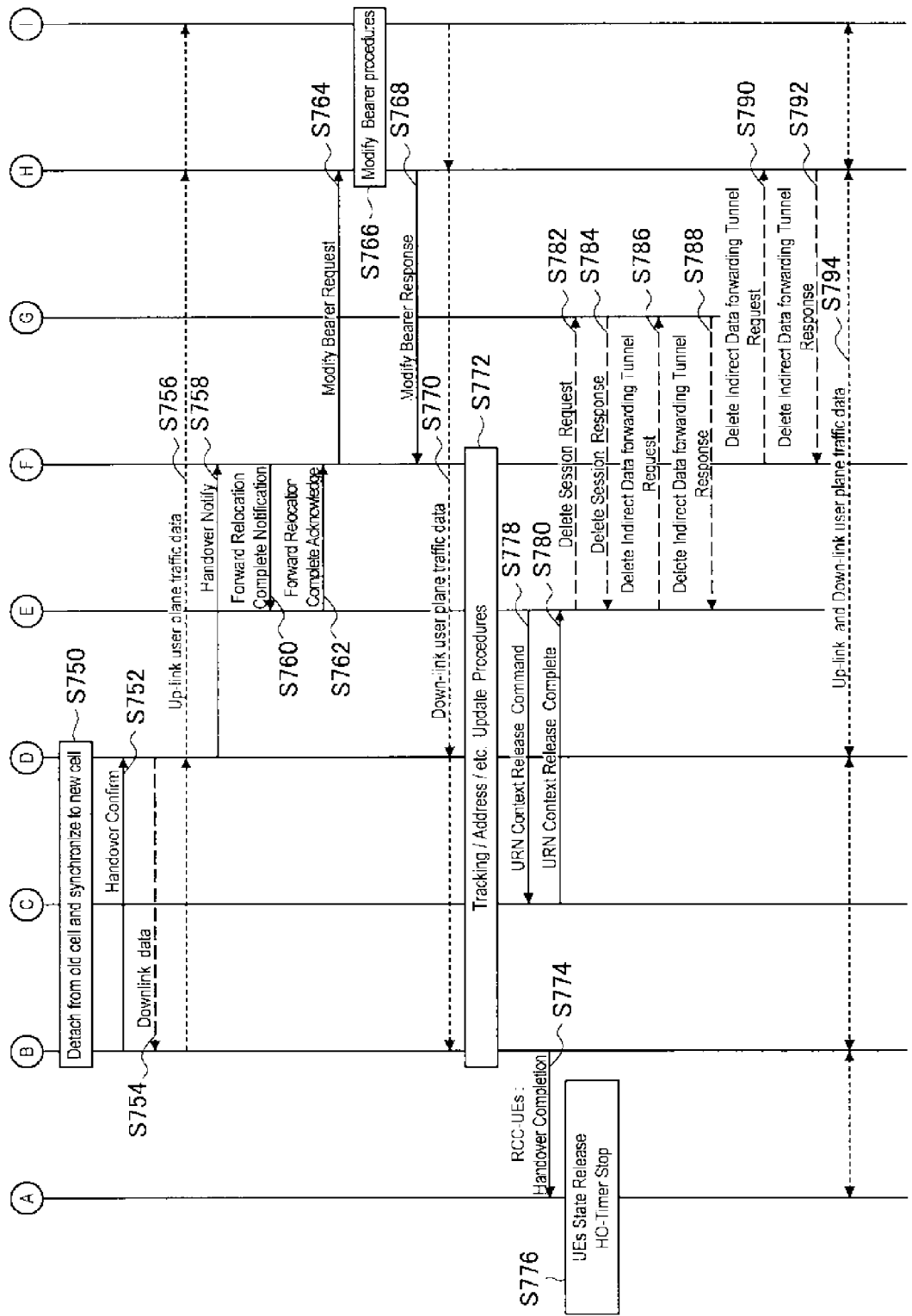
FIG. 36 is an explanatory diagram of technical features in the embodiment.

FIGS. 35 and 36 are sequence diagrams illustrating an example of a flow of handover processing performed by the URN 2 according to the embodiment. The group of UEs 1, the URN 2A, the URN 2B, the DeNB 3C, the MME 7A, the MME 7B, the S-GW 5A, the S-GW 5B, and the P-GW 6 are involved in the sequence. In addition, the group of UEs 1 and the URN 2A form a virtual cell. In addition, the URN 2B is a source DeNB while the DeNB 3C is a target DeNB. In addition, the S-GW 5A is a source S-GW while the S-GW 5B is a target S-GW. In addition, the MME 7A is a source MME while the MME 7B is a target MME.

As illustrated in FIG. 35, the group of UEs 1, the URN 2A, the URN 2B, the S-GW 5A, and the P-GW 6 are brought into an initial state in which they can transmit and receive uplink and downlink user plane traffic data first (Step S702). Then, the URN 2A transmits a measurement report (RCC-URN: Measurement Report) to the URN 2B (Step S704). Then, the URN 2B performs handover determination (Handover Decision via S1) utilizing the S1 interface (Step S706). Then, the URN 2B transmits a handover request (S1-AP: Handover required) to the MME 7A (Step S708). Next, the MME 7A transmits a forward relocation request (Forward Relocation Request) to the MME 7B (Step S710). Then, the MME 7B transmits a session creation request (Create Session Request) to the S-GW 5B (Step S712). Next, the S-GW 5B transmits a session creation response (Create Session Response) to the MME 7B (Step S714). Then, the MME 7B transmits a handover request (Handover Request) to the DeNB 3C (Step S716). Next, the DeNB 3C transmits a handover request ACK (Handover Request Ack) to the MME 7B (Step S718). Then, the MME 7B transmits an indirect data transfer tunnel creation request (Create Indirect Data Forwarding Tunnel Request) to the S-GW 5B (Step S720). Next, the S-GW 5B transmits an indirect data transfer tunnel creation response (Create Indirect Data Forwarding Tunnel Response) to the MME 7B (Step S722). Then, the MME 7B transmits a forward relocation response (Forward Relocation Response) to the MME 7A (Step S724). Next, the MME 7A transmits an indirect data transfer tunnel creation request (Create Indirect Data Forwarding Tunnel Request) to the S-GW 5A (Step S726). Then, the S-GW 5A transmits an indirect data transfer tunnel creation response (Create Indirect Data Forwarding Tunnel Response) to the MME 7A (Step S728). Next, the MME 7A transmits a handover command (Handover Command) to the URN 2B (Step S730). Then, the URN 2B transmits the handover command (RCC-URN: Handover command) to the URN 2A (Step S732). Next, the URN 2A transmits a handover notification (RCC-UEs: Handover Notification) to the group of subordinate UEs 1 (Step S734). In this manner, the group of UEs 1 starts the handover timer, holds the state (UEs State Hold/HO-Timer Start), and suppresses handover to another URN 2 (Step S736). Then, the URN 2B transmits a base station status transfer (eNB Status Transfer) to the MME 7A (Step S738). Next, the MME 7A transmits a forward access context notification (Forward Access Context Notification) to the MME 7B (Step S740). Then, the MME 7B transmits a forward access context approval (Forward Access Context Acknowledge) to the MME 7A (Step S742). Next, the MME 7B transmits a base station status transfer (eNB Status Transfer) to the DeNB 3C (Step S744). Then, the URN 2B transmits only direct transfer data (Only for Direct forwarding of data) to the DeNB 3C (Step S746). Next, the URN 2B transmits indirect transfer data (Only for Indirect forwarding of data) to the DeNB 3C via the S-GW 5A and the S-GW 5B in a case of indirect transfer data (Step S748).

Then, the URN 2A performs detachment from the old cell and synchronization with the new cell (Detach from old cell and synchronization to new cell) with the URN 2B, the DeNB 3C, the MME 7A, and the MME 7B as illustrated in FIG. 36 (Step S750). Next, the URN 2A transmits handover confirmation (Handover Confirm) to the DeNB 3C (Step S752). Then, the DeNB 3C transmits downlink data (Downlink data) to the URN 2A (Step S754). This makes it possible for the URN 2A to transmit uplink user plane traffic data to the P-GW 6 via the DeNB 3*c* and the S-GW 5B (Step S756). Then, the DeNB 3C transmits a handover notification (Handover Notify) to the MME 7B (Step S758). Next, the MME 7B transmits a forward relocation completion notification (Forward Relocation Complete Notification) to the MME 7A (Step S760). Then, the MME 7A transmits a forward relocation completion conformation (Forward Relocation Complete Acknowledge) to the MME 7B (Step S762). Next, the MME 7B transmits a bearer modification request (Modify Bearer Request) to the S-GW 5B (Step s764). Then, the S-GW 5B performs bearer modification procedures (Modify Bearer procedures) with the P-GW 6 (Step S766). Next, the S-GW 5B transmits a bearer modification response (Modify Bearer Response) to the MME 7B (Step S768). This makes it possible for the P-GW 6 to transmit downlink user plane traffic data to the URN 2A via the S-GW 5B and the DeNB 3C (Step S770). Next, the URN 2A performs update procedures (Tracking/Address/etc. Update Procedures) of tracking, addresses, and the like with the URN 2B, the DeNB 3C, the MME 7A, and the MME 7B (Step S772). Then, the URN 2A transmits handover completion (RCC-UEs: Handover Completion) to the group of subordinate UEs 1 (Step S774). In This manner, the group of UEs 1 stops the handover timer and opens the state (UEs State Release/HO-Timer Stop) (Step S776). Next, the MME 7A transmits a URN context release command (URN Context Release Command) to the URN 2B (Step S778). Then, the URN 2B transmits URN context release completion (URN Context Release Complete) to the MME 7A (Step S780). Next, the MME 7A transmits a session deletion request (Delete Session Request) to the S-GW 5A (Step S782). Then, the S-GW 5A transmits a session deletion response (Delete Session Response) to the MME 7A (Step S784). Next, the MME 7A transmits an indirect data transfer tunnel deletion request (Delete Indirect Data forwarding Tunnel Request) to the S-GW 5A (Step S786). Then, the S-GW 5A transmits an indirect data transfer tunnel deletion response (Delete Indirect Data forwarding Tunnel Response) to the MME 7A (Step S788). Next, the MME 7B transmits an indirect data transfer tunnel deletion request (Delete Indirect Data forwarding Tunnel Request) to the S-GW 5B (Step S790). Then, the S-GW 5B transmits an indirect data transfer tunnel deletion response (Delete Indirect Data forwarding Tunnel Response) to the MME 7B (Step S792). This makes it possible to transmit and receive uplink and downlink user plane traffic data via the group of UEs 1, the URN 2A, the DeNB 3C, the S-GW 5B, and the P-GW 6 (Step S794).

<3.3. Handling of Transport Layer IP Address During Handover>

Hereinafter, handling of a transport layer IP address during handover that accompanies movement of the UE 1 or the URN 2 will be described.

As illustrated in FIG. 8, an EPC transport layer IP address is ordinarily applied to a network device. However, mobility of the network is not taken into consideration in 3GPP. If a case in which the URN 2 behaves as the UE 1 is assumed, it is difficult to assign the transport layer IP address to the URN 2 in advance in some cases. Thus, a mechanism in which a transport layer IP address is automatically assigned at the time of network connection, such as a so-called automatic configuration (Auto Configuration) can be considered. If the automatic configuration and mobility of the URN 2 are taken into consideration as described above, it is assumed that the transport layer IP address is changed whenever the URN 2 moves.

For example, the URN 2 sets an ID (an eNB ID or the like assigned to the IMSI or the URN 2, for example) for specifying the URN 2 itself as an IPv6 interface identifier when the URN 2 connects to a network. In addition, the URN 2 acquire Prefix/64 through an RS message and an RA message exchanged with the DeNB 3 that is a connection destination by using the IPv6 link local address. Then, the URN 2 may generate the transport layer IP address of the URN 2 itself by combining the set IPv6 interface identifier with Prefix/64.

The URN 2 may continuously utilize the thus generated transport layer IP address even after the handover. In addition, the URN 2 may generate a new transport layer IP address by the similar method every time handover is performed. The handover described herein can mean that the DeNB 3 that is a connection destination changes or that the URN 2 that is a connection destination changes.

In any cases, the MME 7 updates management information related to the transport layer IP address of the URN 2 when the URN 2 performs RCC/S1-AP/NAS communication with the MME 7 (for example, update procedures (Tracking/Address/etc. Update procedures) of tracking, addresses, and the like in FIGS. 32, 34, and 36, for example). Note that Step S806 in FIG. 38 and Step S1106 in FIG. 41, which will be described later, are examples of the aforementioned automatic configuration.

<3.4. Effects>

Hereinafter, main effects of the aforementioned protocol will be described.

For example, a network layer IP address is assigned to the URN 2. Therefore, IP moving transmittivity is realized. In addition, the URN 2 can utilize the IP application in a manner similar to that in the UE 1. Further, D2D communication using network layer IP addresses between the UE1 and the UE 1, between the UE 1 and the URN 2, or between the URN 2 and the URN 2 is easily realized.

In addition, the automatic configuration with the EPC transport layer IP address is realized. This makes it possible to dynamically assign the transport layer IP address to the URN 2 that an end user utilizes every time the URN 2 connects to the network or every time handover is performed. Therefore, in a manner similar to that in a stationary RN, it is possible to perform network maintenance, bearer establishment by the MME 7, and the like in a manner similar to that in other EPC devices even in a case in which the URN 2 moves.

In addition, the UEs 1 connected to the URN 2 can omit performing the connection processing again even in a case in which the URN 2 performs handover. Therefore, the UEs 1 can perform reception of paging, utilization of a push application, and the like without updating position registration (Tracking Area Update) and the like. In this manner, it becomes possible to significantly reduce the amount of signaling (for example, a tracking area update message) from the subordinate UEs 1 of the URN 2. In this manner, reduction of signaling messages, which accompany movement, from a group of wearable devices connected to a virtual cell or the UEs 1 connected to a virtual cell formed in a moving vehicle is realized.

In addition, the URN 2 can take the UEs 1 and the URN 2 that have addresses other than ones with common Prefix/56 utilized in the subordinate virtual cells into the virtual cell. Accordingly, it is possible to taken terminals, which have already been connected to the network, into the virtual cell.

4. SECOND EMBODIMENT

In the embodiment, the first embodiment will be described in detail in terms of generation and update of mapping tables.

<4.1. Introduction>

Figure 37:
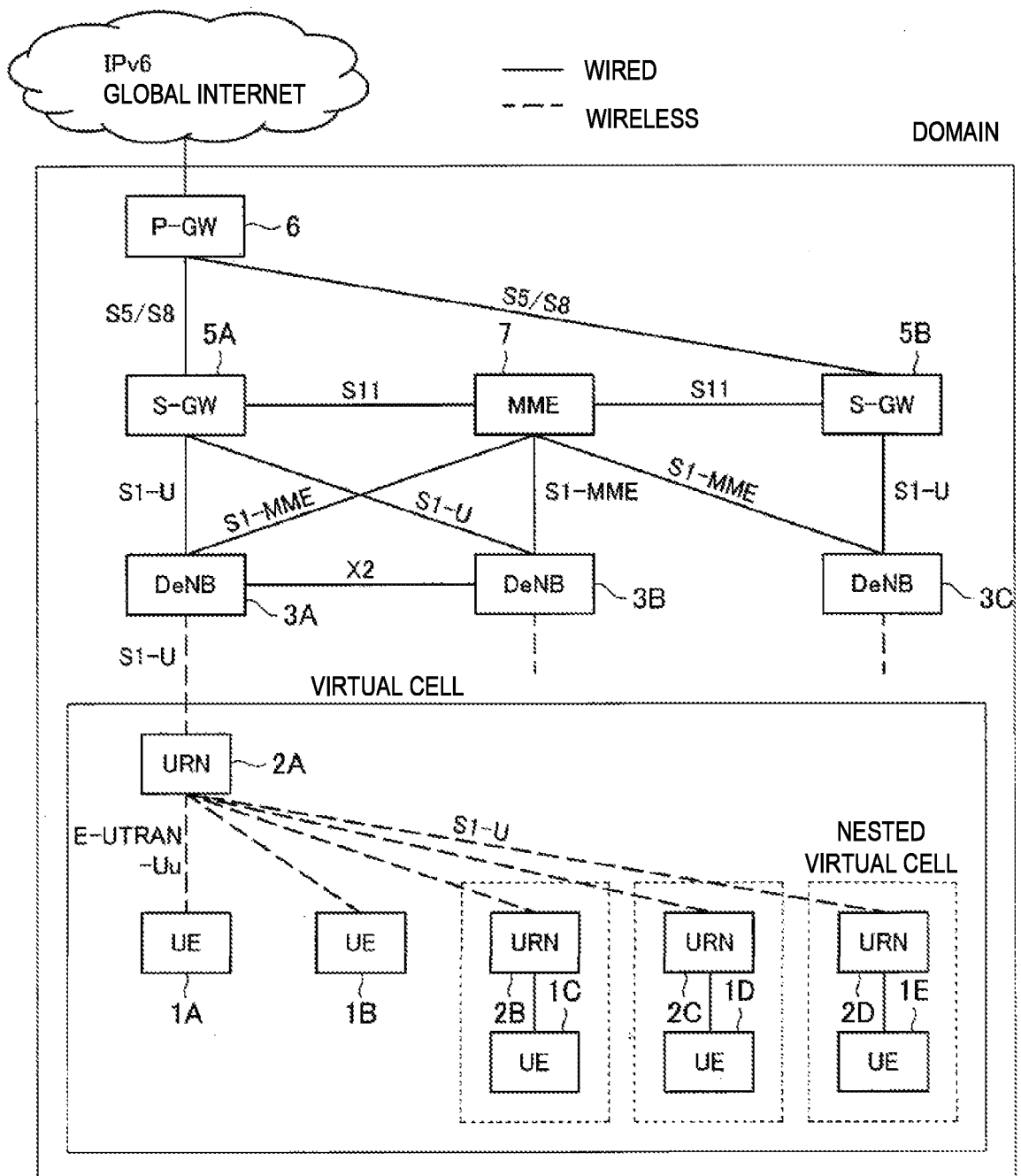
FIG. 37 is an explanatory diagram of technical features in a second embodiment.

FIG. 37 is a diagram illustrating a network configuration example according to the embodiment. Hereinafter, the embodiment will be described on the assumption of the network configuration example illustrated in FIG. 37. As illustrated in FIG. 37, the system includes virtual cells that are formed by a P-GW 6, an S-GW 5A, an S-GW 5B, an MME 7, a DeNB 3A, a DeNB 3B, and URN 2A. A UE 1A and a UE 1B, a URN 2B that forms a nested virtual cell to which a UE 1C is connected, a URN 2C that forms a nested virtual cell to which a UE 1D is connected, and a URN 2D that forms a nested virtual cell to which a UE 1E is connected can be connected to the virtual cell formed by the URN 2A.

An IPv6 address of an interface on a downstream side of the P-GW will be represented as $IP^D_{PGW}$. An IPv6 address of an interface on an upstream or downstream side of the S-GW will be represented as $IP^U_{SGW}$ or $IP^D_{SGW}$, respectively. An IPv6 address of an interface on an upstream or downstream side of the DeNB will be represented as $IP^U_{DeNB}$ or $IP^D_{DeNB}$. An IPv6 address for the URN 2 to operate as an eNB and to be connected to a DeNB on the upstream side with an S1-U interface will be referred to as $IP^U_{URN}$. An IPv6 address, which is for the URN 2 to operate as a UE and is used by an application on the URN, will be represented as $IP^{UE}_{URN}$. An IPv6 address, which is for the URN 2 to operate as a moving router and is used for communicating with a device in a virtual cell on the downstream side will be represented as $IP^D_{URN}$.

<4.2. Flow of Processing>

(1) Procedure for Connection of URN 2A which has not Yet Acquired IPv6 Address to DeNB 3A>

Hereinafter, a flow of processing performed when the URN 2A, which has not yet acquired an IPv6 address, is connected to the DeNB 3A and acquires the IPv6 address will be described with reference to FIG. 38. For example, the processing can be executed in a case in which a power source of the URN 2A is turned on in the vicinity of the DeNB 3A.

Figure 38:
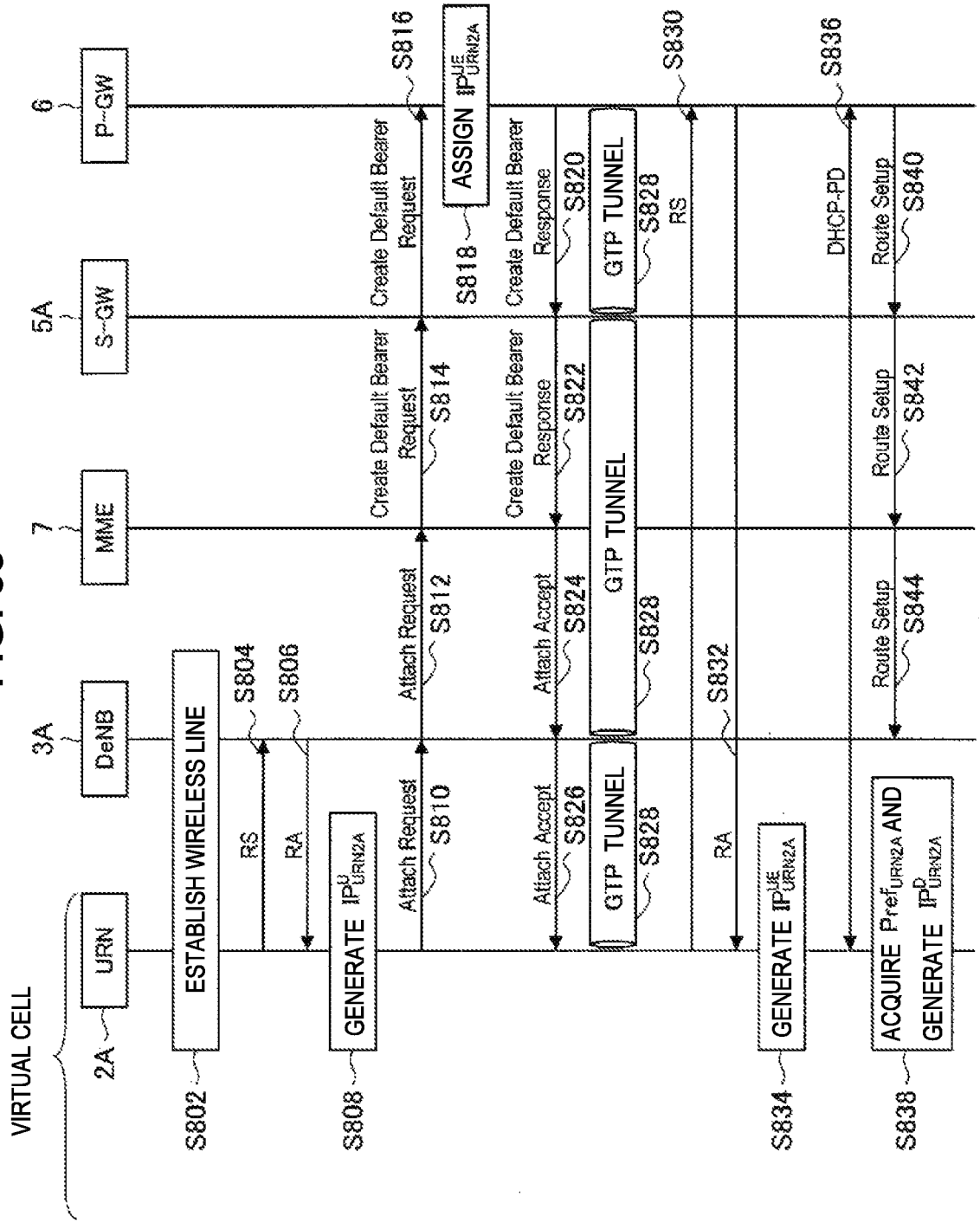
FIG. 38 is an explanatory diagram of technical features in the embodiment.

FIG. 38 is a sequence diagram illustrating an example of a flow of processing of connecting the URN 2A to the DeNB 3A according to the embodiment. The URN 2A, the DeNB 3A, the MME 7, the S-GW 5A, and the P-GW 6 are involved in the sequence.

As illustrated in FIG. 38, the URN 2A establishes a wireless line with the DeNB 3A first (Step S802).

Then, the URN 2A transmits router solicitation (RS) directed to a link local all-router multiple-cast address (Step S804). The source address of the RS is a link local IPv6 address of the URN 2A.

Next, the DeNB 3A receives the RS and transmits router advertisement (RA) directed to the link local IPv6 address of the URN 2A (Step S806). The RA includes higher 64 bits (prefix) of $IP^D_{DeNB3A}$.

Then, the URN 2A receives the RA and generates an IPv6 address $IP^U_{URN2A}$ (Step S808). The $IP^U_{URN2A}$ is used when the URN 2A establishes a GTP tunnel with the DeNB 3A.

Next, the URN 2A transmits an attachment request to the DeNB 3A (Step S810). The attachment request includes an identifier $ID_{URN2A}$ and $IP^U_{URN2A}$ of the URN 2A.

Then, the DeNB 3A receives the attachment request and transfers the attachment request to the MME 7 (Step S812).

Next, the MME 7 transmits a default bearer creation request (Create Default Bearer Request) to the S-GW 5A (Step S814). The default bearer creation request includes $ID_{URN2A}$ and $IP^U_{URN2A}$.

Then, the S-GW 5A receives the default bearer creation request and transfers the default bearer creation request to the P-GW 6 (Step S816).

Next, the P-GW 6 receives the default bearer creation request and assigns the IPv6 address $IP^{UE}_{URN2A}$ from an IPv6 address space that the P-GW 6 itself has (Step S818). $IP^{UE}_{URN2A}$ is an IPv6 address that is used by the application when the URN 2A operates as a UE. The P-GW 6 forms a GTP tunnel with the S-GW 5A and associates a transfer destination of $IP^{UE}_{URN2A}$ with the GTP tunnel. The association is stored in a mapping table. End points of the GTP tunnel are $IP^D_{PGW6}$ and $IP^U_{SGW5A}$.

Then, the P-GW 6 transmits a default bearer creation response (Create Default Bearer Response) to the S-GW 5A (Step S820). The default bearer creation response (Create Default Bearer Response) includes $ID_{URN2A}$, $IP^{UE}_{URN2A}$, and $IP^{DP}_{PGW6}$.

Next, the S-GW 5A receives the default bearer creation response and transfers the default bearer creation response to the MME 7 (Step S822). The S-GW 5A forms a GTP tunnel with the P-GW 6. End points of the GTP tunnel are $IP^U_{SGW5A}$ and $IP^D_{PGW6}$. Further, the S-GW 5A forms a GTP tunnel with the DeNB 3A and associates $IP^{UE}_{URN2A}$ with the GTP tunnel. The association is stored in a mapping table. End points of the GTP tunnel are $IP^D_{SGW5A}$ and $IP^U_{DeNB3A}$.

Then, the MME 7 receives the default bearer creation response and transmits attachment acceptance to the DeNB 3A (Step S824). The attachment acceptance includes $ID_{URN2A}$, lower 64 bits (if-id: interface identification) of $IP^{UE}_{URN2A}$, and $IP^D_{PGW6}$.

Next, the DeNB 3A receives the attachment acceptance and transfers the attachment acceptance to the URN 2A (Step S826). The DeNB 3A forms a GTP tunnel with the S-GW 5A. End points of the GTP tunnel are $IP^U_{DeNB3A}$ and $IP^D_{SGW5A}$. Further, the DeNB 3A forms a GTP tunnel with the URN 2A and associates a transfer destination of $IP^{UE}_{URN2A}$ with the GTP tunnel. The association is stored in a mapping table. End points of the GTP tunnel are $IP^D_{DeNB3A}$ and $IP^U_{URN2A}$. The URN 2A receives the attachment acceptance and obtains lower 64 bits (if-id) of $IP^{UE}_{URN2A}$.

As a result of the aforementioned signaling, the GTP tunnels are generated between the P-GW 6 and the S-GW 5A, between the S-GW 5A and the DeNB 3A, and between the DeNB 3A and the URN 2A (Step S828).

Then, the URN 2A transmits RS to the P-GW 6 in accordance with provisions of the IPv6 in order to obtain the IPv6 address $IP^{UE}_{URN2A}$ for operating as a UE (Step S830).

Next, the P-GW 6 receives the RS and replies RA to the URN 2A (Step S832). The RA includes higher 64 bits (prefix) of $IP^{UE}_{URN2A}$.

Then, the URN 2A receives the RA and obtains higher 64 BITS (prefix) of $IP^{UE}_{URN2A}$. Then, the URN 2A generates $IP^{UE}_{URN2A}$ (Step S834). $IP^{UE}_{URN2A}$ is used when an application above the URN 2A performs communication.

Next, the URN 2A executes DHCP-PD (Prefix Delegation) with the P-GW 6 (Step S836).

As a result of the DHCP-PD, the URN 2A obtains prefix $Pref_{URN2A}$ (an IPv6 address space of /60, for example) of the IPv6 address (Step S838). The P-GW 6 associates the transfer destination of $Pref_{URN2A}$ with the GTP tunnel to the S-GW 5A. The association is stored in a mapping table. Meanwhile, the URN 2A selects the IPv6 address $IP^D_{URN2A}$ from the space of $Pref_{URN2A}$. $IP^D_{URN2A}$ is assigned to an interface on the downstream side of the URN 2A.

Then, the P-GW 6 transmits a route setup message to the S-GW 5A (Step S840). The router setup message is information for associating the prefix $Pref_{URN2A}$ of the IPv6 address with the URN 2A, and devices (for example, the S-GW 5A, the DeNB 3A, and the like) that relay communication between the URN 2A and the P-GW 6 is notified of the information. Specifically, the route setup message includes information indicating that the transfer destination of $Pref_{URN2A}$ is to be associated with $IP^{UE}_{URN2A}$.

Next, the S-GW 5A receives the route setup message and associates the transfer destination of $Pref_{URN2A}$ with $IP^{UE}_{URN2A}$ (Step S842). Then, the S-GW 5A relays the route setup message to the MME 7.

Then, the MME 7 receives the route setup message and transfers the route setup message to the DeNB 3A (Step S844). The DeNB 3A receives the route setup message and associates the transfer destination of $Pref_{URN2A}$ with $IP^{UE}_{URN2A}$.

As a result, the P-GW 6, the S-GW 5A, and the DeNB 3A store the mapping tables illustrated in Tables 2, 3, and 4, respectively.

TABLE 2

(Mapping table stored in P-GW 6)

| End point IPv6 address | Transfer destination | Route URN |
|---|---|---|
| $IP^{UE}_{URN2A}$ | $GTP_{SGW5A}$ | — |
| $Pref_{URN2A}$ | See $IP^{UE}_{URN2A}$ | $ID_{URN2A}$ |

TABLE 3

(Mapping table stored in S-GW 5A)

| End point IPv6 address | Transfer destination | Route URN |
|---|---|---|
| $IP^{UE}_{URN2A}$ | $GTP_{DeNB3A}$ | — |
| $Pref_{URN2A}$ | See $IP^{UE}_{URN2A}$ | $ID_{URN2A}$ |

TABLE 4

(Mapping table stored in DeNB 3A)

| End point IPv6 address | Transfer destination | Route URN |
|---|---|---|
| $IP^{UE}_{URN2A}$ | $GTP_{URN2A}$ | — |
| $Pref_{URN2A}$ | See $IP^{UE}_{URN2A}$ | $ID_{URN2A}$ |

The above mapping tables will be described. For example, according to the entry on the first row in Table 2, a packet directed to $IP^{UE}_{URN2A}$ is transferred to "$GTP_{SGW5A}$" (that is, the GTP tunnel directed to the S-GW 5A) described in the transfer section of the entry with the end point IPv6 address of $IP^{UE}_{URN2A}$. In this manner, the packet is transferred to the S-GW 5A. Then, according to the entry on the first row in Table 3, the packet directed to $IP^{UE}_{URN2A}$ is transferred to "$GTP_{DeNB3A}$" (that is, the GTP tunnel directed to the DeNB 3A) described in the transfer section of the entry with the end point IPv6 address of $IP^{UE}_{URN2A}$. In this manner, the packet is transferred to the DeNB 3A. Then, according to the entry on the first row in Table 4, the packet directed to $IP^{UE}_{URN2A}$ is transferred to "$GTP_{URN2A}$" (that is, the GTP tunnel directed to the URN 2A) described in the transfer section of the entry with the end point IPv6 address of $IP^{UE}_{URN2A}$. In this manner, the packet is transferred to the URN 2A. In this manner, each entity can appropriately transfer the packet and cause the packet to reach the destination by referring to the stored mapping table.

In addition, according to the entry on the second row in Table 2, the packet with the destination IP address with the prefix portion of $Pref_{URN2A}$ is transferred to "$GTP_{SGW5A}$" that is the transfer destination of the entry on the first row with the end point IPv6 address of $IP^{UE}_{URN2A}$ on the basis of "See $IP^{UE}_{URN2A}$" described in the transfer section. In this manner, the packet is transferred to the S-GW 5A. In addition, according to the entry on the second row in Table 3, the packet with the destination IP address with the prefix portion of $Pref_{URN2A}$ is transferred to "$GTP_{DeNB3A}$" that is a transfer destination of the entry on the first row with the end point IPv6 address of $IP^{UE}_{URN2A}$ on the basis of "See $IP^{UE}_{URN2A}$" described in the transfer section. In this manner, the packet is transferred to the DeNB 3A. In addition, according to the entry on the second row in Table 4, the packet with the destination IP address with the prefix portion of $Pref_{URN2A}$ is transferred to "$GTP_{URN2A}$" that is a transfer destination of the entry on the first row with the end point IPv6 address of $IP^{UE}_{URN2A}$ on the basis of "See $IP^{UE}_{URN2A}$" described in the transfer section. In this manner, the packet is transferred to the URN 2A. Each entity can appropriately transfer the packet and cause the packet to reach the destination with reference to the stored mapping table.

In this manner, the respective entities (the P-GW 6, the S-GW 5, the DeNB 3, and the like) store the prefix portion assigned to the terminal (the UE 1 or the URN 2) connected to the URN 2 in association with the URN 2. The respective entities can transmit packets directed to the subordinate terminals of the URN 2 to the URN 2 and finally cause the packets to reach the respective terminals with reference to the association.

(2) Procedure for Connection of UE1A which has not Yet Acquired IPv6 Address to URN 2A Hereinafter, a flow of processing performed in a case in which the UE 1A that has not yet acquired the IPv6 address is connected to the URN 2A to acquire the IPv6 address after the aforementioned connection processing will be described. The processing can be executed in a case in which the power source of the UE 1A is turned on in the vicinity of the URN 2A, for example.

Figure 39:
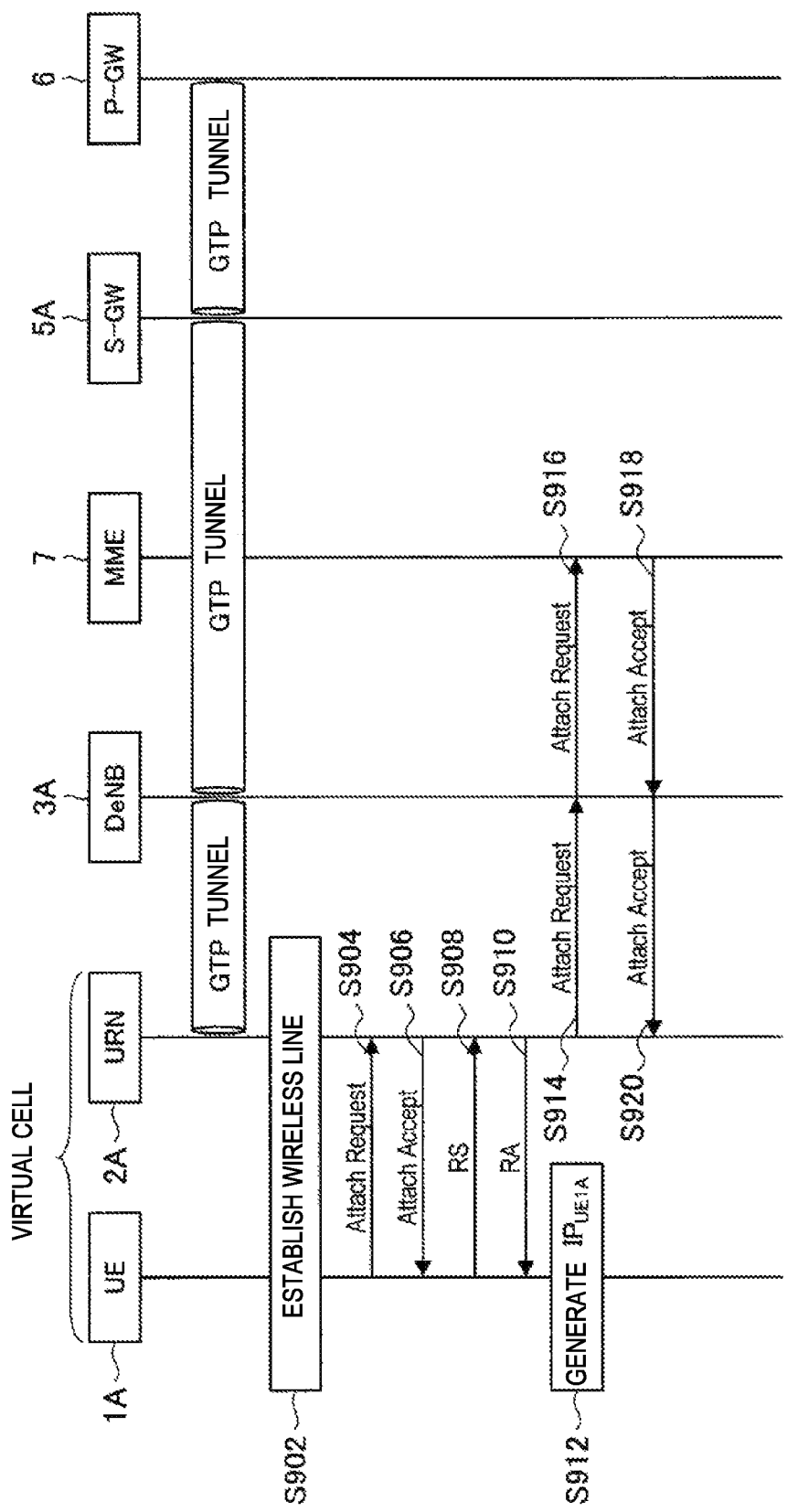
FIG. 39 is an explanatory diagram of technical features in the embodiment.

FIG. 39 is a sequence diagram illustrating an example of a flow of processing of connecting the UE 1A to the URN 2A according to the embodiment. The UE 1A, the URN 2A, the DeNB 3A, the MME 7, the S-GW 5A, and the P-GW 6 are involved in the sequence.

As illustrated in FIG. 39, the UE 1A establishes a wireless line with the URN 2A first (Step S902).

Then, the UE 1A transmits an attachment request to the URN 2A. The attachment request includes an identifier $ID_{UE1A}$ of the UE 1A (Step S904).

Next, the URN 2A transmits an attachment acceptance to the UE 1A (STEP s906). The attachment acceptance includes lower 64 bits (if-id) for the UE 1A to form $IP_{UE1A}$ and $IP^D_{URN2A}$. The UE 1A receives the attachment acceptance and obtains the lower 64 bits of $IP_{UE1A}$.

Then, the UE 1A transmits RS to the URN 2A (Step S908).

Next, the URN 2A receives the RS and transmits RA including the higher 64 bits (prefix) of $IP^D_{URN2A}$ to the UE1A (Step S910).

Then, the UE 1A receives the RA and generates $IP_{UE1A}$ (Step S912).

Thereafter, the URN 2A waits for a time to some extent (for example, 1 second) and collectively transmit attachment requests related to the UEs 1 connected on the downstream side of the URN 2A during the time to the DeNB 3A (Step S914). That is, the URN 2A can avoid transmittance of an attachment request every time each UE 1 is connected to the downstream of the URN 2A, by transmitting the attachment requests related to the plurality of UEs 1 at a time. Each attachment request includes an identifier (for example, $ID_{UE1A}$) and an IPv6 address (for example, $IP_{UE1A}$) of the UE 1A connected to the URN 2A and information indicating that the connection is UE connection to the virtual cell.

Next, the DeNB 3A receives the attachment requests and transfers the attachment requests to the MME 7 (Step S916).

Then, the MME 7 receives the attachment requests and transmits attachment acceptance to the DeNB 3A (Step S918).

Next, the DeNB 3A receives the attachment accept and transfers the attachment acceptance to the URN 2A (Step S920).

As a result of the above processing, there is no change in the mapping table stored in each of the P-GW 6, the S-GW 5A, and the DeNB 3A. That is, the amount of information stored in the P-GW 6, the S-GW 5A, and the DeNB 3A does not depend on the number of UEs 1 with power sources that have been turned on in the virtual cell provided by the URN 2.

(3) Procedure for Connection of UE 1B which has Already Acquired IPv6 Address to URN 2A Hereinafter, a flow of processing performed in a case in which the UE 1B that has already acquired the IPv6 address is connected to the URN 2A after the aforementioned connection processing will be described. For example, it is assumed that the UE 1B has obtained the IPv6 address $IP_{UE1B}$ before the connection to the URN 2A. What is to be noted here is that $IP_{UE1B}$ does not belong to $Pref_{URN2A}$. For example, the processing can be executed in a case in which the UE 1B that has been connected to anther eNB 4 is connected to the virtual cell that the URN 2A provides.

Figure 40:
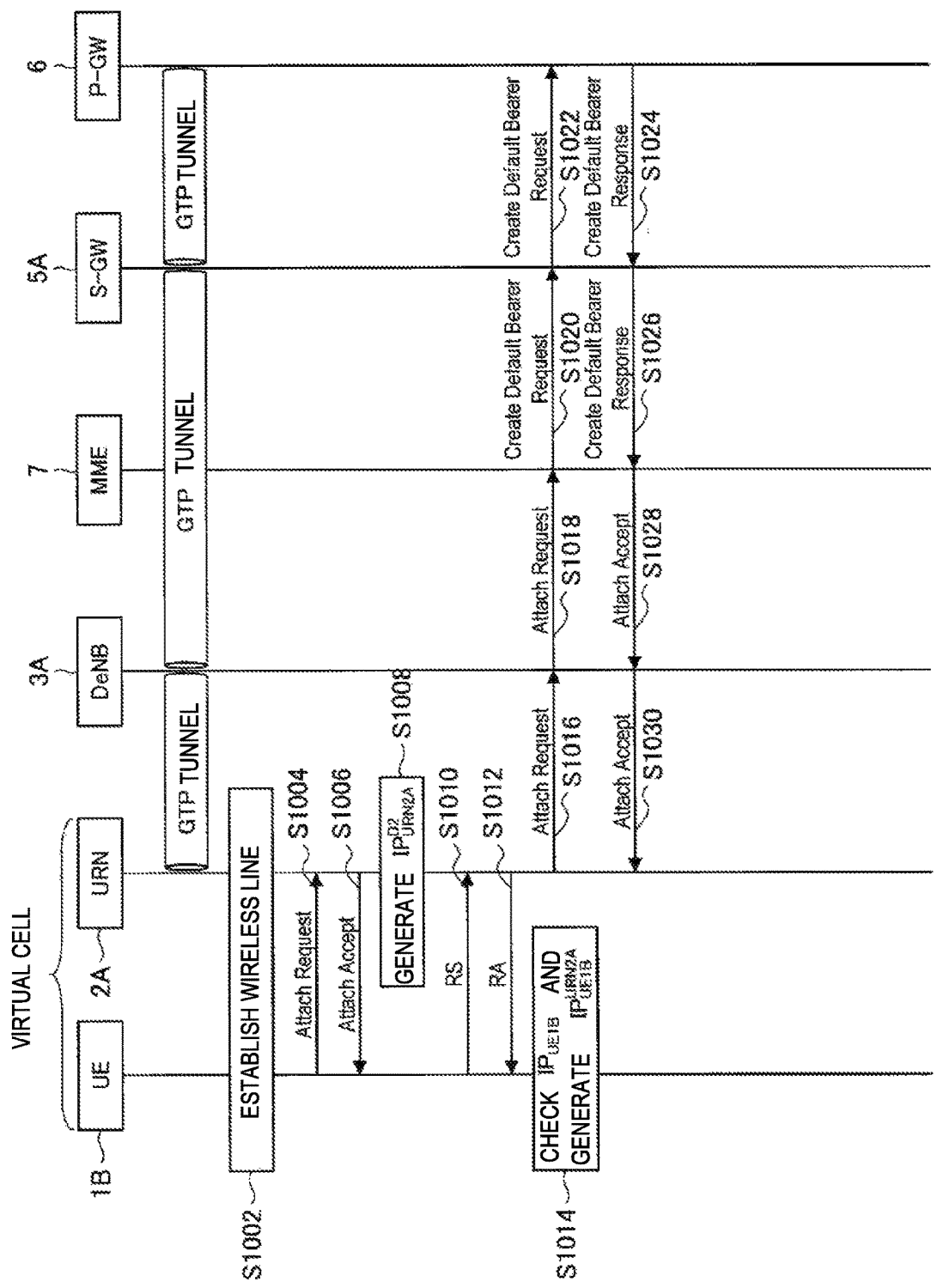
FIG. 40 is an explanatory diagram of technical features in the embodiment.

FIG. 40 is a sequence diagram illustrating an example of a flow of processing of connecting the UE 1B to the URN 2A according to the embodiment. The UE 1B, the URN 2A, the DeNB 3A, the MME 7, the S-GW 5A, and the P-GW 6 are involved in the sequence.

As illustrated in FIG. 40, the UE 1B establishes a wireless line with the URN 2A first (Step S1002).

Then, the UE 1B transmits an attachment request to the URN 2A (Step S1004). The attachment request includes the identifier $ID_{UE1B}$ and $IP_{UE1B}$ of the UE 1B.

Next, the URN 2A transmits attachment acceptance including the lower 64 bits (if-id) of $IP_{UE1B}$ to the UE 1B (Step S1006).

Then, the URN 2A generates an IPv6 address $IP^{D2}_{URN2A}$ and assigns the IPv6 address to the interface on the downstream side (Step S1008). At that time, the URN 2A sets the higher 64 bits (prefix) of $IP^{D2}_{URN2A}$ to be equal to the higher 64 bits (prefix) of $IP_{UE1B}$.

Next, the UE 1B transmits RS to the URN 2A in accordance with provisions of the IPv6 (Step S1010).

Then, the URN 2A receives the RS and transmits RA including the higher 64 bits (prefix) of $IP_{UE1B}$ and the higher 64 bits (prefix) of $IP^D_{URN2A}$ to the UE 1B (Step S1012).

Next, the UE 1B receives the RA and checks that $IP_{UE1B}$ is available (Step S1014). In addition, the UE 1B uses the higher 64 bits (prefix) of $IP^D_{URN2A}$ and generates an IPv6 address $IP^{URN2A}_{UE1B}$. $IP_{UE1B}$ does not belong to $Pref_{URN2A}$ while $IP^{URN2A}_{UE1B}$ belongs to $Pref_{URN2A}$. The application that has performed communication before the UE 1B connects to the URN 2A continuously uses $IP_{UE1B}$, and the application that has started communication after the UE 1B connects to the URN 2A uses $IP^{URN2A}_{UE1B}$. In this manner, $IP_{UE1B}$ is not used in the course of time. The fact that $IP_{UE1B}$ has not been used by the UE 1B can be detected by the following method. For example, the UE 1B records a clock time at which the UE 1B connects to the URN 2A. The UE 1B uses $IP^{URN2A}_{UE1B}$ for a socket opened at or after the clock time. Then, if all the sockets opened at or before the clock time are closed, this means that $IP_{UE1B}$ is not used. The UE 1B detects this fact and notifies the URN 2A of this fact.

Thereafter, the URN 2A waits for a time to some extent (for example, 1 second) and collectively transmit attachment requests related to the UEs 1 connected on the downstream side of the URN 2A during the time to the DeNB 3A (Step S1016). That is, the URN 2A can avoid transmittance of an attachment request every time each UE 1 is connected to the downstream of the URN 2A, by transmitting the attachment requests related to the plurality of UEs 1 at a time. Each attachment request includes an identifier (for example, $ID_{UE1B}$), an IPv6 address (for example, $IP_{UE1B}$), $IP^{UE}_{URN2A}$, and $ID_{URN2A}$ of the UE 1B connected to the URN 2A and information indicating that the connection is UE connection to the virtual cell.

Then, the DeNB 3A receives the attachment request and transfers the attachment request to the MME 7 (Step S1018).

Next, the MME 7 receives the attachment request and transmits a default bearer creation request to the S-GW 5A (Step S1020). The default bearer creation request includes $ID_{UE1B}$, $IP_{UE1B}$, $IP^{UE}_{URN2A}$, and $ID_{URN2A}$.

Then, the S-GW 5A receives the default bearer creation request and transfers the default bearer creation request to the P-GW 6 (Step S1022).

Next, the P-GW 6 receives the default bearer creation request, associates the transfer destination of $IP_{UE1B}$ with $IP^{UE}_{URN2A}$, and transmits a default bearer creation response to the S-GW 5A (Step S1024). The default bearer creation response includes $ID_{UE1B}$, $IP_{UE1B}$, $IP^{UE}_{URN2A}$, and $ID_{URN2A}$.

Then, the S-GW 5A receives the default bearer creation response, associates the transfer destination of $IP_{UE1B}$ with $IP^{UE}_{URN2A}$, and transmits a default bearer creation response to the MME 7 (Step S1026).

Next, the MME 7 receives the default bearer creation response and transmits attachment acceptance to the DeNB 3A (Step S1028). The attachment acceptance includes $ID_{UE1B}$, $IP_{UE1B}$, $IP^{UE}_{URN2A}$, and $ID_{URN2A}$.

Then, the DeNB 3A receives the attachment acceptance, associates the transfer destination of $IP_{UE1B}$ with $IP^{UE}_{URN2A}$, and transfers the attachment acceptance to the URN 2A (Step S1030).

As a result, the P-GW 6, the S-GW 5A, and the DeNB 3A store the mapping tables illustrated in Tables 5, 6, and 7, respectively.

TABLE 5

(Mapping table stored in P-GW 6)

| End point IPv6 address | Transfer destination | Route URN |
|---|---|---|
| $IP^{UE}_{URN2A}$ | $GTP_{SGW5A}$ | — |
| $Pref_{URN2A}$ | See $IP^{UE}_{URN2A}$ | $ID_{URN2A}$ |
| $IP_{UE1B}$ | See $IP^{UE}_{URN2A}$ | $ID_{URN2A}$ |

TABLE 6

(Mapping table stored in S-GW 5A)

| End point IPv6 address | Transfer destination | Route URN |
|---|---|---|
| $IP^{UE}_{URN2A}$ | $GTP_{DeNB3A}$ | — |
| $Pref_{URN2A}$ | See $IP^{UE}_{URN2A}$ | $ID_{URN2A}$ |
| $IP_{UE1B}$ | See $IP^{UE}_{URN2A}$ | $ID_{URN2A}$ |

TABLE 7

(Mapping table stored in DeNB 3A)

| End point IPv6 address | Transfer destination | Route URN |
|---|---|---|
| $IP^{UE}_{URN2A}$ | $GTP_{URN2A}$ | — |
| $Pref_{URN2A}$ | See $IP^{UE}_{URN2A}$ | $ID_{URN2A}$ |
| $IP_{UE1B}$ | See $IP^{UE}_{URN2A}$ | $ID_{URN2A}$ |

The above mapping tables will be described. An entry on the third row is newly added to each of the above mapping tables. According to the entry on the third row, the packet directed to $IP_{UE1B}$ is transferred to the transfer destination of the entry on the first row with the end point IPv6 address of $IP^{UE}_{URN2A}$ on the basis of "See $IP^{UE}_{URN2A}$" described in the transfer section. The packet is transferred to "$GTP_{SGW5A}$" by the P-GW 6 according to Table 5, is transferred to "$GTP_{DeNB3A}$" by the S-GW 5A according to Table 6, and is transferred to '$GTP_{URN2A}$" by the DeNB 3A according to Table 7. In this manner, the packet is transferred to the URN 2A. Then, the packet is transferred from the URN 2A to the UE 1B.

(4) Procedure for Connection of URN 2B which has not Yet Acquired IPv6 Address to URN 2A Hereinafter, a flow of processing performed in a case in which the URN 2B that has not yet acquired the IPv6 address connects to the URN 2A after the aforementioned connection processing will be described. The processing is executed in a case in which the power source of the URN 2B is turned on in the vicinity of the URN 2A, for example.

Figure 41:
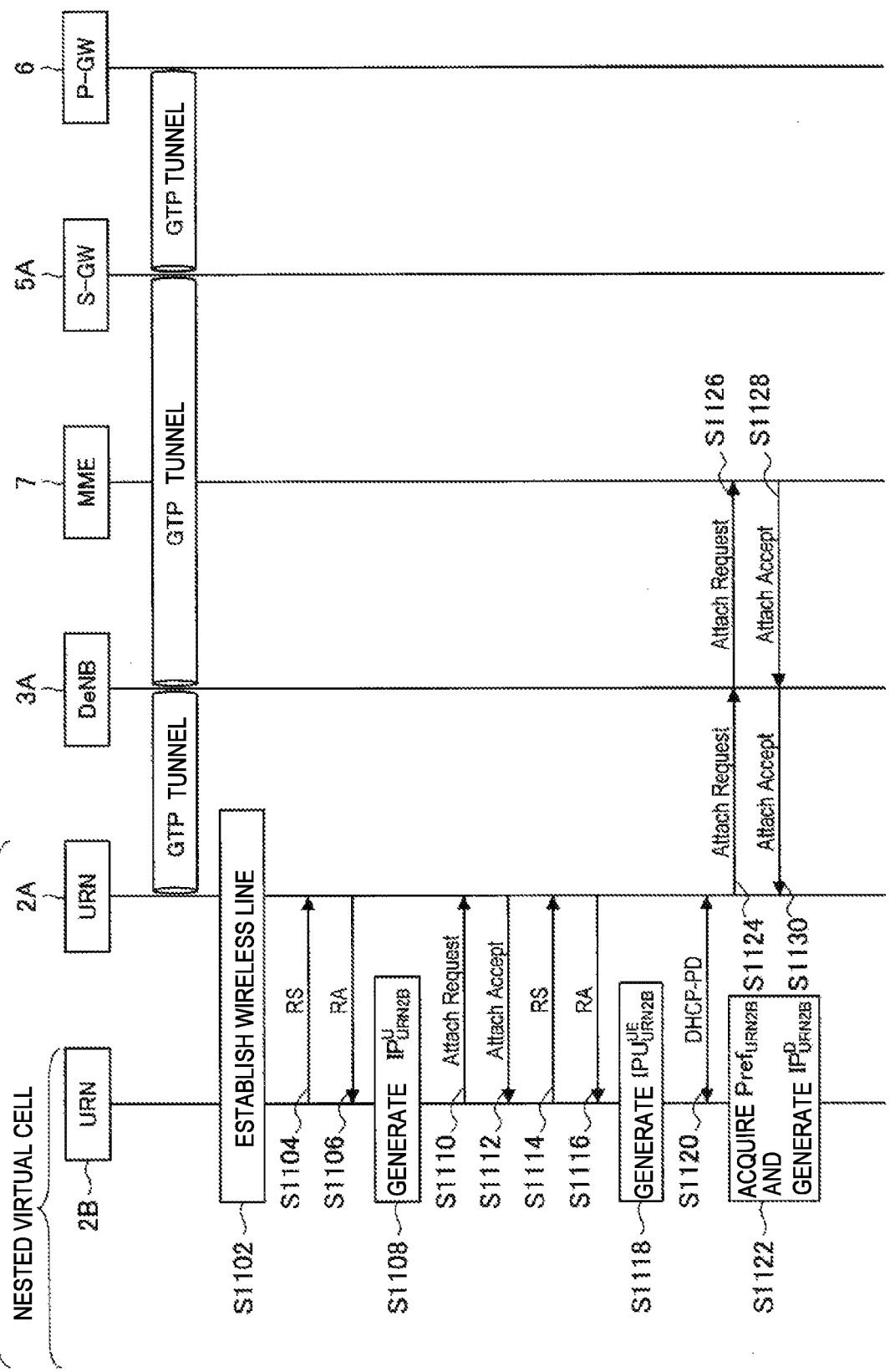
FIG. 41 is an explanatory diagram of technical features in the embodiment.

FIG. 41 is a sequence diagram illustrating an example of a flow of processing of connecting the URN 2B to the URN 2A according to the embodiment. The URN 2B, the URN 2A, the DeNB 3A, the MME 7, the S-GW 5A, and the P-GW 6 are involved in the sequence.

As illustrated in FIG. 41, the URN 2B establishes a wireless line with the URN 2A first (Step S1102).

Then, the URN 2B transmits RS directed to a link local all-router multiple-cast address (Step S1104). The source address of the RS is a link local address of the URN 2B.

Next, the URN 2A transmits RA directed to a link local address of the URN 2B (Step S1106). The RA includes the higher 64 bits (prefix) of $IP^D_{URN2A}$ and information indicating that the URN 2A is present in the virtual cell.

Then, the URN 2B receives the RA and generates an IPv6 address $IP^U_{URN2B}$ (Step S1108). In addition, the URN 2B sets $IP^{UE}_{URN2B}$ to the same value as $IP^U_{URN2B}$.

Next, the URN 2B transmits an attachment request to the URN 2A (Step S1110). The attachment request includes an identifier $ID_{URN2B}$ and $IP^U_{URN2B}$ of the URN 2B.

Then, the URN 2A receives the attachment request and transmits attachment acceptance to the URN 2B (Step S1112). The attachment acceptance includes $IP^D_{URN2A}$ and lower 64 bits (if-id) of $IP^U_{URN2B}$.

Next, the URN 2B transmits RS to the URN 2A (Step S1114).

Then, the URN 2A receives the RS and transmits RA to the URN 2B (Step S1116). The RA includes the higher 64 bits (prefix) of $IP^D_{URN2A}$.

Next, the URN 2B receives the RA and generates $IP^{UE}_{URN2B}$ (Step S1118). As a result, $IP^U_{URN2B}$ and $IP^{UE}_{URN2B}$ become equal to each other.

Then, the URN 2B executes DHCP-PD with the URN 2A (Step S1120).

Next, the URN 2A cuts $Pref_{URN2B}$ that is a prefix of /64, for example, of $Pref_{URN2A}$ and assigns $Pref_{URN2B}$ to the URN 2B as a result of executing the DHCP-PD (Step S1122). The URN 2B generates an IPv6 address $IP^D_{URN2B}$ from $Pref_{URN2B}$ and uses the IPv6 address $IP^D_{URN2B}$ for communication in the nested virtual cell on the downstream side. The URN 2A sets the transfer destination of $Pref_{URN2B}$ to $IP^U_{URN2B}$.

Thereafter, the URN 2A waits for a time to some extent (for example, 1 second) and collectively transmit attachment requests related to the URNs 2 connected on the downstream side of the URN 2A during the time to the DeNB 3A (Step S1124). That is, the URN 2A can avoid transmittance of an attachment request every time each URN 2 is connected to the downstream of the URN 2A, by transmitting the attachment requests related to the plurality of URNs 2 at a time. Each attachment request includes an identifier (for example, $ID_{URN2B}$) and an IPv6 address (for example, $IP_{URN2B}$) of the URN 2B connected to the URN 2A, the $ID_{URN2A}$ and information indicating that the connection is RN connection to the virtual cell.

Then, the DeNB 3A receives the attachment request and transfers the attachment request to the MME 7 (Step S1126).

Next, the MME 7 receives the attachment requests and transmits attachment acceptance to the DeNB 3A (Step S1128).

Then, the DeNB 3A receives the attachment accept and transfers the attachment acceptance to the URN 2A (Step S1130).

As a result of the processing, there is no change in the mapping table stored in the P-GW 6, the S-GW 5A, and the DeNB 3A. That is, the amount of information stored in the P-GW 6, the S-GW 5A, and the DeNB 3A does not depend on the number of URNs 2 with power sources that have been turned on in the virtual cell provided by the URN 2A.

(5) Procedure for Connection of URN 2C which has Already Acquired IPv6 Address to URN 2A Hereinafter, a flow of processing performed in a case in which the URN 2C that has acquired an IPv6 address connects to the URN 2A after the aforementioned connection processing will be described. For example, it is assumed that the URN 2C has obtained the IPv6 address $IP^{UE}_{URN2C}$ and the prefix $Pref_{URN2C}$ before the connection to the URN 2A. In addition, it is assumed that the UE 1D has been connected to the URN 2C, and that the UE 1D has obtained $IP_{UE1D}$ that is the IPv6 address that belongs to $Pref_{URN2C}$. The processing can be executed in a case in which the virtual cell that has been connected to the DeNB 3 is connected to the downstream of the URN 2A, for example.

Figure 42:
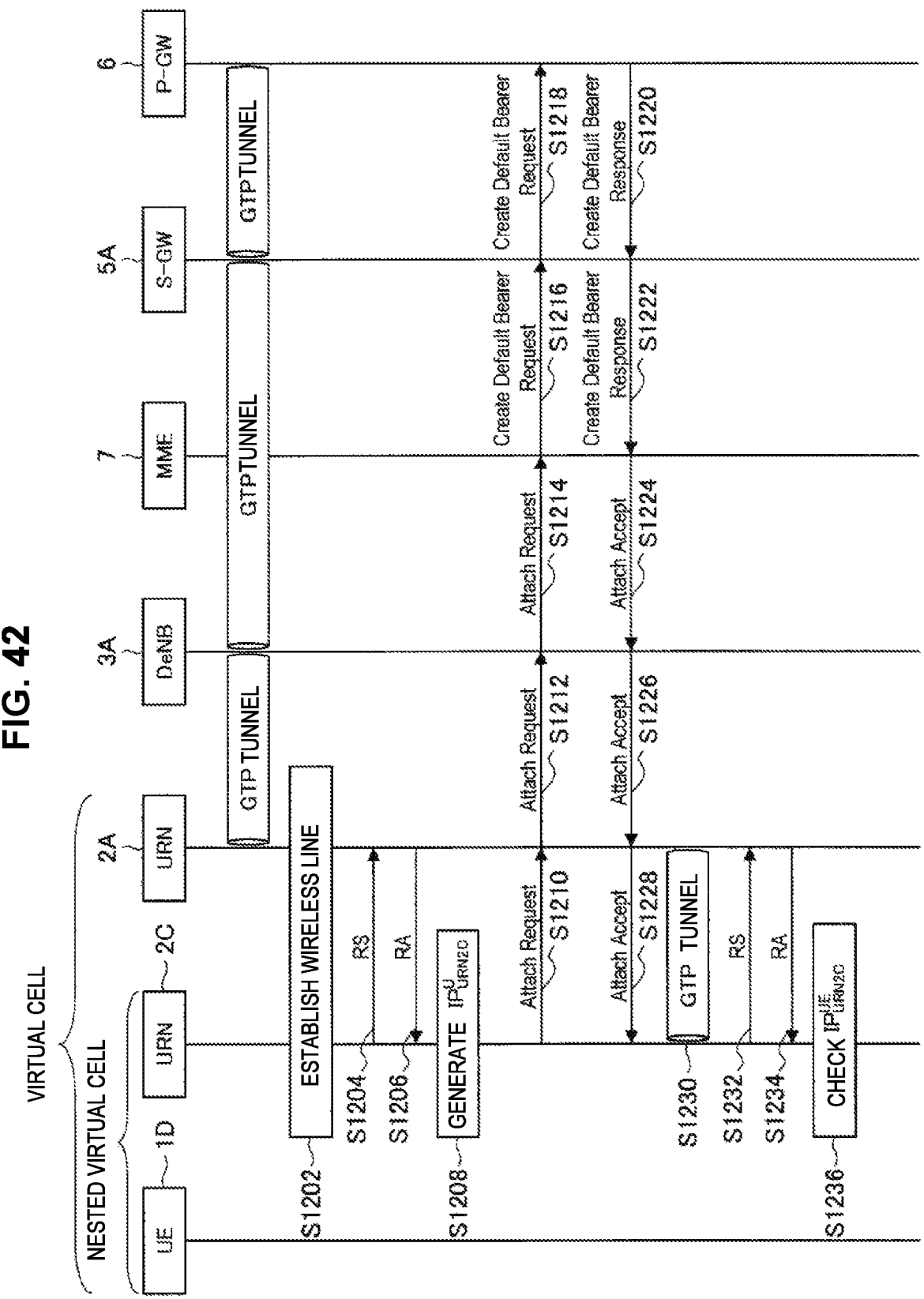
FIG. 42 is an explanatory diagram of technical features in the embodiment.

FIG. 42 is a sequence diagram illustrating an example of a flow of processing of connecting the URN 2C to the URN 2A according to the embodiment. The URN 2C, the URN 2A, the DeNB 3A, the MME 7, the S-GW 5A, and the P-GW 6 are involved in the sequence.

As illustrated in FIG. 42, the URN 2C establishes a wireless line with the URN 2A first (Step S1202).

Then, the URN 2C transmits RS directed to a link local all-router multiple-cast address (Step S1204). The source address of the RS is a link local address of the URN 2C.

Next, the URN 2A transmits RA directed to a link local address of the URN 2C (Step S1206). The RA includes the prefix of /64 that belongs to $Pref_{URN2A}$, for example, $Pref^{URN2A}_{URN2C}$.

Then, the URN 2C receives the RA and generates $IP^U_{URN2C}$ (Step S1208).

Next, the URN 2C transmits an attachment request to the URN 2A (Step S1210). The attachment request includes an identifier $ID_{URN2C}$, $IP^{UE}_{URN2C}$, and $Pref_{URN2C}$ of the URN 2C.

Then, the URN 2A receives the attachment request and transfers the attachment request to the DeNB 3A (Step S1212). At that time, the URN 2A adds $IP^{UE}_{URN2A}$ and $ID_{URN2A}$ to the attachment request.

Next, the DeNB 3A receives the attachment requests and transfers the attachment requests to the MME 7 (Step S1214).

Then, the MME 7 receives the attachment request and transmits a default bearer creation request to the S-GW 5A (Step S1216). The default bearer creation request includes $ID_{URN2A}$, $ID_{URN2C}$, $IP^{UE}_{URN2A}$, $IP^{UE}_{URN2C}$, and $Pref_{URN2C}$.

Next, the S-GW 5A receives the default bearer creation request and transfers the default bearer creation request to the P-GW 6 (Step S1218).

Then, the P-GW 6 associates transfer destinations of $IP^{UE}_{URN2C}$ and $Pref_{URN2C}$ with $IP^{UE}_{URN2A}$. Then, the P-GW 6 transmits a default bearer creation response to the S-GW 5A (Step S1220). The default bearer creation response includes $ID_{URN2A}$, $IP^{UE}_{URN2A}$, $IP^{UE}_{URN2C}$, and $Pref_{URN2C}$.

Next, the S-GW 5A receives the default bearer creation response and associates transfer destinations of $IP^{UE}_{URN2C}$ and $Pref_{URN2C}$ with $IP^{UE}_{URN2A}$. Then, the S-GW 5A transmits the default bearer creation response to the MME 7 (Step S1222).

Then, the MME 7 receives the default bearer creation response and transmits attachment acceptance to the DeNB 3A (Step S1224). The attachment acceptance includes $ID_{URN2A}$, $IP^{UE}_{URN2A}$, $IP^{UE}_{URN2C}$, and $Pref_{URN2C}$.

Next, the DeNB 3A receives the attachment request and associates the transfer destinations of $IP^{UE}_{URN2C}$ and $Pref_{URN2C}$ with $IP^{UE}_{URN2A}$. Then, the DeNB 3A transmits the default bearer creation response to the URN 2A (Step S1226).

Then, the URN 2A receives the attachment acceptance and forms a GTP tunnel with the URN 2C. End points of the GTP tunnel are $IP^D_{URN2A}$ and $IP^U_{URN2C}$. Next, the URN 2A associates the transfer destinations of $IP^{DE}_{URN2C}$ and $Pref_{URN2C}$ with the GTP tunnel. Then, the URN 2A transmits attachment acceptance to the URN 2C (Step S1228). The attachment acceptance includes the lower 64 bits (if-id) of $IP^{UE}_{URN2C}$ and $IP^{UE}_{URN2A}$.

Next, the URN 2C receives the attachment acceptance and obtains the lower 64 bits (if-id) of $IP^{UE}_{URN2C}$. Then, the URN 2C forms a GTP tunnel with the URN 2A (Step S1230). End points of the GTP tunnel are $IP^U_{URN2C}$ and $IP^D_{URN2A}$.

Then, the URN 2C transmits RS to the URN 2A (IP$^{UE}_{URN2A}$) (Step S1232).

Next, the URN 2A receives the RS and transmits RA to the URN 2C (Step S1234). The RA includes the higher 64 bits (prefix) of IP$^{UE}_{URN2C}$.

Then, the URN 2C receives the RA and checks that IP$^{UE}_{URN2C}$ is available (Step S1236).

As a result, the P-GW 6, the S-GW 5A, and the DeNB 3A store the mapping tables illustrated in Tables 8, 9, and 10, respectively.

TABLE 8

(Mapping table stored in P-GW 6)

| End point IPv6 address | Transfer destination | Route URN |
|---|---|---|
| IP$^{UE}_{URN2A}$ | GTP$_{SGW5A}$ | — |
| Pref$_{URN2A}$ | See IP$^{UE}_{URN2A}$ | ID$_{URN2A}$ |
| IP$_{UE1A}$ | See IP$^{UE}_{URN2A}$ | ID$_{URN2A}$ |
| IP$^{UE}_{URN2C}$ | See IP$^{UE}_{URN2A}$ | ID$_{URN2A}$ |
| Pref$_{URN2C}$ | See IP$^{UE}_{URN2A}$ | ID$_{URN2A}$ |

TABLE 9

(Mapping table stored in S-GW 5A)

| End point IPv6 address | Transfer destination | Route URN |
|---|---|---|
| IP$^{UE}_{URN2A}$ | GTP$_{DeNB3A}$ | — |
| Pref$_{URN2A}$ | See IP$^{UE}_{URN2A}$ | ID$_{URN2A}$ |
| IP$_{UE1A}$ | See IP$^{UE}_{URN2A}$ | ID$_{URN2A}$ |
| IP$^{UE}_{URN2C}$ | See IP$^{UE}_{URN2A}$ | ID$_{URN2A}$ |
| Pref$_{URN2C}$ | See IP$^{UE}_{URN2A}$ | ID$_{URN2A}$ |

TABLE 10

(Mapping table stored in DeNB 3A)

| End point IPv6 address | Transfer destination | Route URN |
|---|---|---|
| IP$^{UE}_{URN2A}$ | GTP$_{URN2A}$ | — |
| Pref$_{URN2A}$ | See IP$^{UE}_{URN2A}$ | ID$_{URN2A}$ |
| IP$_{UE1A}$ | See IP$^{UE}_{URN2A}$ | ID$_{URN2A}$ |
| IP$^{UE}_{URN2C}$ | See IP$^{UE}_{URN2A}$ | ID$_{URN2A}$ |
| Pref$_{URN2C}$ | See IP$^{UE}_{URN2A}$ | ID$_{URN2A}$ |

The above mapping tables will be described. Entries on the fourth and fifth rows are newly added to each of the above mapping tables. According to the entry on the fourth row, the packet directed to IP$^{UE}_{URN2C}$ is transferred to the transfer destination of the entry on the first row with the end point IPv6 address of IP$^{UE}_{URN2A}$ on the basis of "See IP$^{UE}_{URN2A}$" described in the transfer section. The packet is transferred to "GTP$_{SGW5A}$" by the P-GW 6 according to Table 8, is transferred to "GTP$_{DeNB3A}$" by the S-GW 5A according to Table 9, and is transferred to 'GTP$_{URN2A}$" by the DeNB 3A according to Table 10. In this manner, the packet is transferred to the URN 2A. Thereafter, the packet is transferred from the URN 2A to the URN 2C.

According to the entry of the fifth row, a packet with a destination IP address with a prefix portion that is Pref$_{URN2C}$ is transferred to a transfer destination of an entry of the first row with an end point IPv6 address that is IP$^{UE}_{URN2A}$ on the basis of "See IP$^{UE}_{URN2A}$" described in the transfer destination section. The packet is transferred to "GTP$_{SGW5A}$" by the P-GW 6 according to Table 8, is transferred to "GTP$_{DeNB3A}$" by the S-GW 5A according to Table 9, and is transferred to 'GTP$_{URN2A}$" by the DeNB 3A according to Table 10. In this manner, the packet is transferred to the URN 2A. Thereafter, the packet is transferred from the URN 2A to the URN 2C.

(6) Procedure for Connection of URN 2D which has Already Acquired IPv6 Address to URN 2A Hereinafter, a flow of processing performed in a case in which the URN 2D that has acquired an IPv6 address connects to the URN 2A after the aforementioned connection processing will be described. For example, it is assumed that the URN 2D has obtained the IPv6 address IP$^{UE}_{URN2D}$ and the prefix Pref$_{URN2D}$ before the connection to the URN 2A. In addition, it is assumed that the UE 1E has been connected to the URN 2D, and that the UE 1E has obtained IP$_{UE1E}$ that is the IPv6 address that does not belong to Pref$_{URN2D}$. The processing can be executed in a case in which the virtual cell that has been connected to the DeNB 3 is connected to the downstream of the URN 2A, for example.

Figure 43:
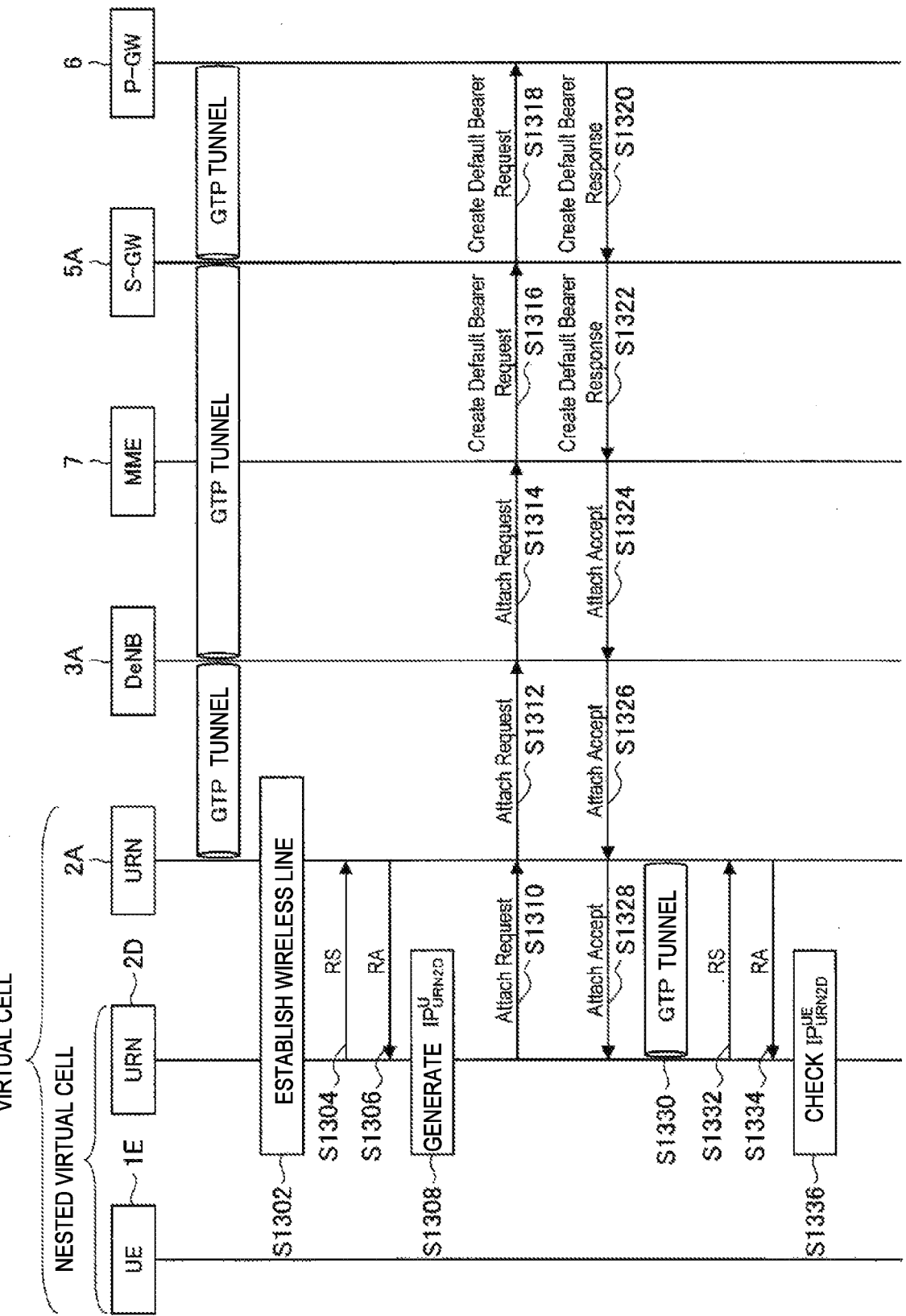
FIG. 43 is an explanatory diagram of technical features in the embodiment.

FIG. 43 is a sequence diagram illustrating an example of a flow of processing of connecting the URN 2D to the URN 2A according to the embodiment. The URN 2D, the URN 2A, the DeNB 3A, the MME 7, the S-GW 5A, and the P-GW 6 are involved in the sequence.

As illustrated in FIG. 43, the URN 2D establishes a wireless line with the URN 2A first (Step S1302).

Then, the URN 2D transmits RS directed to a link local all-router multiple-cast address (Step S1304). The source address of the RS is a link local address of the URN 2D.

Next, the URN 2A receives the RS, and transmits RA directed to a link local address of the URN 2D (Step S1306). The RA includes the prefix of /64 that belongs to Pref$_{URN2A}$, for example, Pref$^{URN2A}_{URN2D}$.

Then, the URN 2D receives the RA and generates IP$^{U}_{URN2D}$ (Step S1308).

Next, the URN 2D transmits an attachment request to the URN 2A (Step S1310). The attachment request includes an identifier ID$_{URN2D}$, IP$^{U}_{URN2D}$, Pref$_{URN2D}$, and IP$_{UE1E}$ of the URN 2D.

Then, the URN 2A receives the attachment request and transfers the attachment request to the DeNB 3A (Step S1312). At that time, the URN 2A adds IP$^{UE}_{URN2A}$ and ID$_{URN2A}$ to the attachment request.

Next, the DeNB 3A receives the attachment requests and transfers the attachment requests to the MME 7 (Step S1314).

Then, the MME 7 receives the attachment request and transmits a default bearer creation request to the S-GW 5A (Step S1316). The default bearer creation request includes ID$_{URN2A}$, ID$_{URN2D}$, IP$^{UE}_{URN2A}$, IP$^{UE}_{URN2D}$, Pref$_{URN2D}$, and IP$_{UE1E}$.

Next, the S-GW 5A receives the default bearer creation request and transfers the default bearer creation request to the P-GW 6 (Step S1318).

Then, the P-GW 6 associates the transfer destinations of IP$^{UE}_{URN2D}$ and Pref$_{URN2D}$ with IP$^{UE}_{URN2A}$. In addition, the P-GW 6 associates the transfer destination of UE 1E with Pref$_{URN2D}$. Then, the P-GW 6 transmits the default bearer creation response to the S-GW 5A (Step S1320). The default bearer creation response includes ID$_{URN2A}$, IP$^{UE}_{URN2A}$, IP$^{UE}_{URN2D}$, Pref$_{URN2D}$, and IP$_{UE1E}$.

Next, the S-GW 5A receives the default bearer creation response and associates the transfer destinations of IP$^{UE}_{URN2D}$ and Pref$_{URN2D}$ with IP$^{UE}_{URN2A}$. In addition, the S-GW 5A associates the transfer destination of the UE 1E with Pref$_{URN2D}$. In addition, the S-GW 5A transmits the default bearer creation response to the MME 7 (Step S1322).

Then, the MME 7 receives the default bearer creation response and transmits attachment acceptance to the DeNB 3A (Step S1324). The attachment acceptance includes $ID_{URN2A}$, $IP^{UE}_{URN2A}$, $IP^{UE}_{URN2D}$, $Pref_{URN2D}$, and $IP_{UE1E}$.

Next, the DeNB 3A receives the attachment acceptance associates the transfer destinations of $IP^{UE}_{URN2D}$ and $Pref_{URN2D}$ with $IP^{UE}_{URN2A}$. In addition, the DeNB 3A associates the transfer destination of the UE 1E with $Pref_{URN2D}$. Then, the DeNB 3A transmits the default bearer creation response to the URN 2A (Step S1326).

Then, the URN 2D receives the attachment acceptance and forms a GTP tunnel with the URN 2D. End points of the GTP tunnel are $IP^D_{URN2A}$ and $IP^U_{URN2D}$. Next, the URN 2A associates the transfer destinations of $IP^{UE}_{URN2D}$ and $Pref_{URN2D}$ with the GTP tunnel. Then, the URN 2A transmits attachment acceptance to the URN 2D (Step S1328). The attachment acceptance includes the lower 64 bits (if-id) of $IP^{UE}_{URN2A}$ and $IP^{UE}_{URN2A}$.

Next, the URN 2D receives the attachment acceptance and obtains the lower 64 bits (if-id) of $IP^{UE}_{URN2D}$. Then, the URN 2D forms a GTP tunnel with the URN 2A (Step S1330). End points of the GTP tunnel are $IP^U_{URN2D}$ and $IP^D_{URN2A}$.

Then, the URN 2D transmits RS to the URN 2A ($IP^{UE}_{URN2A}$) (Step S1332).

Next, the URN 2D receives the RS and transmits RA to the URN 2C (Step S1334). The RA includes the higher 64 bits (prefix) of $IP^{UE}_{URN2D}$.

Then, the URN 2D receives the RA and checks that $IP^{UE}_{URN2D}$ is available (Step S1336).

As a result, the P-GW 6, the S-GW 5A, and the DeNB 3A store the mapping tables illustrated in Tables 11, 12, and 13, respectively.

TABLE 11

(Mapping table stored in P-GW 6)

| End point IPv6 address | Transfer destination | Route URN |
|---|---|---|
| $IP^{UE}_{URN2A}$ | $GTP_{SGW5A}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

TABLE 12

(Mapping table stored in S-GW 5A)

| End point IPv6 address | Transfer destination | Route URN |
|---|---|---|
| $IP^{UE}_{URN2A}$ | $GTP_{DeNB3A}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

TABLE 13

(Mapping table stored in DeNB 3A)

| End point IPv6 address | Transfer destination | Route URN |
|---|---|---|
| $IP^{UE}_{URN2A}$ | $GTP_{URN2A}$ | — |
| $Pref_{URN2A}$ | See $IP^{UE}_{URN2A}$ | $ID_{URN2A}$ |

TABLE 13-continued (Mapping table stored in DeNB 3A)

| End point IPv6 address | Transfer destination | Route URN |
|---|---|---|
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

The above mapping tables will be described. Entries on the sixth to eighth rows are newly added to each of the above mapping tables. According to the entry on the sixth row, the packet directed to $IP^{UE}_{URN2D}$ is transferred to the transfer destination of the entry on the first row with the end point IPv6 address of $IP^{UE}_{URN2A}$ on the basis of "See $IP^{UE}_{URN2A}$" described in the transfer section. The packet is transferred to "$GTP_{SGW5A}$" by the P-GW 6 according to Table 11, is transferred to "$GTP_{DeNB3A}$" by the S-GW 5A according to Table 12, and is transferred to '$GTP_{URN2A}$" by the DeNB 3A according to Table 13. In this manner, the packet is transferred to the URN 2A. Thereafter, the packet is transferred from the URN 2D to the URN 2C.

According to the entry of the seventh row, a packet with a destination IP address with a prefix portion that is $Pref_{URN2D}$ is transferred to a transfer destination of an entry of the first row with an end point IPv6 address that is $IP^{UE}_{URN2A}$ on the basis of "See $IP^{UE}_{URN2A}$" described in the transfer destination section. The packet is transferred to "$GTP_{SGW5A}$" by the P-GW 6 according to Table 11, is transferred to "$GTP_{DeNB3A}$" by the S-GW 5A according to Table 12, and is transferred to '$GTP_{URN2A}$" by the DeNB 3A according to Table 13. In this manner, the packet is transferred to the URN 2A. Thereafter, the packet is transferred from the URN 2A to the URN 2D.

According to the entry on the eighth row, the packet directed to IPUE1E is transferred to the transfer destination of the entry on the first row with the end point IPv6 address of $IP^{UE}_{URN2A}$ on the basis of "See $Pref_{URN2D}$" described in the transfer section and further on the basis of "See $IP^{UE}_{URN2A}$" described in the transfer section of the entry on the seventh row with the end point IPv6 address of $Pref_{URN2D}$. The packet is transferred to "$GTP_{SGW5A}$" by the P-GW 6 according to Table 11, is transferred to "$GTP_{DeNB3A}$" by the S-GW 5A according to Table 12, and is transferred to '$GTP_{URN2A}$" by the DeNB 3A according to Table 13. In this manner, the packet is transferred to the URN 2A. Thereafter, the packet is transferred from the URN 2A to the URN 2D and then from the URN 2D to the UE 1E.

(7) Procedure for Handover in S-GW 5

Hereinafter, a flow of processing performed in a case in which the URN 2A performs handover from the DeNB 3A to the DeNB 3B in a state in which the UE 1A, the UE 1B, the URN 2B and the UE 1C, the URN 2C and the UE 1D, and the URN 2D and the UE 1E are connected on the downstream side of the URN 2A by the aforementioned connection processing will be described.

Figure 44:
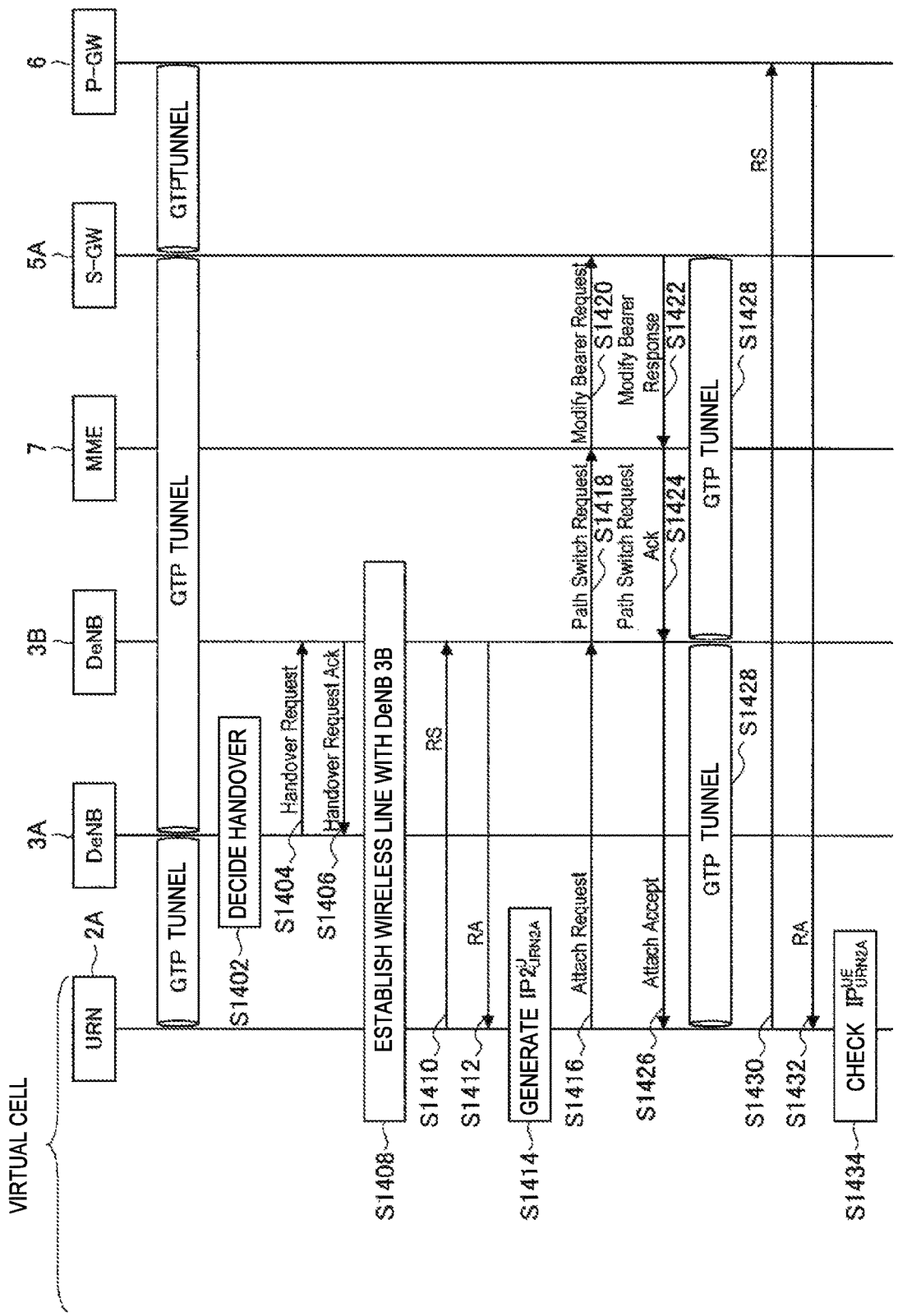
FIG. 44 is an explanatory diagram of technical features in the embodiment.

FIG. 44 is a sequence diagram illustrating an example of a flow of handover processing to the DeNB 3B performed by the URN 2A according to the embodiment. The URN 2A, the DeNB 3A, the DeNB 3B, the MME 7, the S-GW 5A, and the P-GW 6 are involved in the sequence.

As illustrated in FIG. 44, the DeNB 3A decides to execute handover to the DeNB 3B by the URN 2A first (Step S1402).

Then, the DeNB 3A transmits a handover request to the DeNB 3B (Step S1404). The handover request includes $ID_{URN2A}$.

Next, the DeNB 3B transmits a handover request ACK to the DeNB 3A (Step S1406). The handover request ACK includes $ID_{URN2A}$.

Then, the URN 2A establishes a wireless line with the DeNB 3B (Step S1408).

Next, the URN 2A transmits RS directed to a link local all-router multiple-cast address (Step S1410). The source address of the RS is a link local address of the URN 2A.

Then, the DeNB 3B receives the RS and transmits RA directed to the link local address of the URN 2A (Step S1412). The RA includes higher 64 bits (prefix) of $IP^D_{DeNB3B}$.

Next, the URN 2A receives the RA and generates an IPv6 address $IP2^U_{URN2A}$ (Step S1414). The $IP2^U_{URN2A}$ is used when the URN 2A establishes a GTP tunnel with the DeNB 3B.

Then, the URN 2A transmits an attachment request to the DeNB 3B (Step S1416). The attachment request includes the identifier $ID_{URN2A}$, $IP2^U_{URN2A}$, and $IP^{UE}_{URN2A}$ of the URN 2A.

Next, the DeNB 3B receives the attachment request and transmits a path switch request to the MME 7 (Step S1418). The path switch request includes $ID_{URN2A}$, $IP2^U_{URN2A}$, and $IP^{UE}_{URN2A}$.

Then, the MME 7 receives the path switch request and transmits a bearer modification request to the S-GW 5A (Step S1420). The bearer modification request includes $ID_{URN2A}$, $IP2^U_{URN2A}$, and $IP^{UE}_{URN2A}$.

Next, the S-GW 5A receives the bearer modification request, detects that the URN 2A has performed the handover with the DeNB 3 on the downstream side of the S-GW 5A, releases the GTP tunnel established between the S-GW 5A and the DeNB 3A, and forms the GTP tunnel between the S-GW 5A and the DeNB 3B. End points of the GTP tunnel are $IP^D_{SGW5A}$ and $IP^U_{DeNB}$ 3B. Then, the S-GW 5A associates the transfer destination of $IP^{UE}_{URN2A}$ with the GTP tunnel. Then, the S-GW 5A transmits a bearer modification response to the MME 7 (Step S1422). The bearer modification response includes $ID_{URN2A}$, $IP2^U_{URN2A}$, $IP^{UE}_{URN2A}$, and the entry with a route URN of URN 2A in the mapping table.

Then, the MME 7 receives the bearer modification response and transmits a path switch request ACK to the DeNB 3B (Step S1424). The path switch request ACK includes $ID_{URN2A}$, $IP2^U_{URN2A}$, $IP^{UE}_{URN2A}$, and an entry with a route URN of URN 2A in the mapping table of the S-GW 5A.

Next, the DeNB 3B receives the path switch request ACK and forms a GTP tunnel between the DeNB 3B and the S-GW 5A. End points of the GTP tunnel are $IP^U_{DeNB3B}$ and $IP^D_{SGW5A}$. Further, the DeNB 3B forms a GTP tunnel with the URN 2A. End points of the GTP tunnel are $IP^D_{DeNB3B}$ and $IP^U_{URN2A}$. Next, the DeNB 3B registers mapping table entries included in the attachment acceptance in the mapping table of the DeNB 3B itself. Further, the DeNB 3B associates the transfer destination of $IP^{UE}_{URN2A}$ with the GTP tunnel to the URN 2A. Next, the DeNB 3B transmits attachment acceptance to the URN 2A (Step S1426). The attachment acceptance includes the lower 64 bits (if-id) of $IP^{UE}_{URN2A}$.

As a result of the aforementioned operations, GTP tunnels are established among the URN 2A, the DeNB 3B, and the S-GW 5A (Step S1428). In addition, the GTP tunnel between the S-GW 5A and the P-GW 6 is maintained.

Then, the URN 2A receives the attachment acceptance and transmits RS to the P-GW 6 in order to obtain an IPv6 address for operating as a UE (Step S1430).

Next, the P-GW 6 receives the RS and transmits RA to the URN 2A (Step S1432). The RA includes the higher 64 bits (prefix) of $IP^{UE}_{URN2A}$.

Then, the URN 2A receives the RA and confirms that $IP^{UE}_{URN2A}$ is available (Step S1434).

As a result, the P-GW 6, the S-GW 5A, and the DeNB 3B store the mapping tables illustrated in Tables 14, 15, and 16, respectively.

TABLE 14

(Mapping table stored in P-GW 6)

| End point IPv6 address | Transfer destination | Route URN |
|---|---|---|
| $IP^{UE}_{URN2A}$ | $GTP_{SGW5A}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

TABLE 15

(Mapping table stored in S-GW 5A)

| Endpoint IPv6 address | Transfer destination | Route URN |
|---|---|---|
| $IP^{UE}_{URN2A}$ | $GTP_{DeNB3B}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

TABLE 16

(Mapping table stored in DeNB 3B)

| End point IPv6 address | Transfer destination | Route URN |
|---|---|---|
| $IP^{UE}_{URN2A}$ | $GTP_{URN2A}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

The above mapping tables will be described. If Table 11 and Table 14 are compared, these tables are the same, and there is no change caused by the handover. If Table 12 and Table 15 are compared, the transfer destination of the entry on the first row changes from "$GTP_{DeNB3A}$" to "$GTP_{DeNB3B}$". That is, the S-GW 5A may update only the entry on the first row in the mapping table during the handover in the S-GW 5A. If Table 13 and Table 16 are compared, these tables are the same. The entry on the first row in the mapping table illustrated in Table 16 is registered by the DeNB 3B. Meanwhile, the entries with the description of "$ID_{URN2A}$" in the sections of the route URN in the mapping table illustrated in Table 16, that is, all the entries in and below the second rows are taken over through the handover. That is, the DeNB 3B can omit a part of processing of generating the mapping table by taking over the mapping table during the handover. In this manner, it is possible to significantly reduce signaling for position registration and the like of the subordinate UEs 1 of the URN 2 since resetting of the transfer destination is completed by updating or taking over a small part of the mapping table during the handover.

(8) Procedure for Handover Between S-GWs 5

Hereinafter, a flow of processing performed in a case in which the URN 2A performs handover from the DeNB 3A to the DeNB 3C in a state in which the UE 1A, the UE 1B, the URN 2B and the UE 1C, the URN 2C and the UE 1D, and the URN 2D and the UE 1E are connected to the downstream of the URN 2A will be described.

Figure 45:
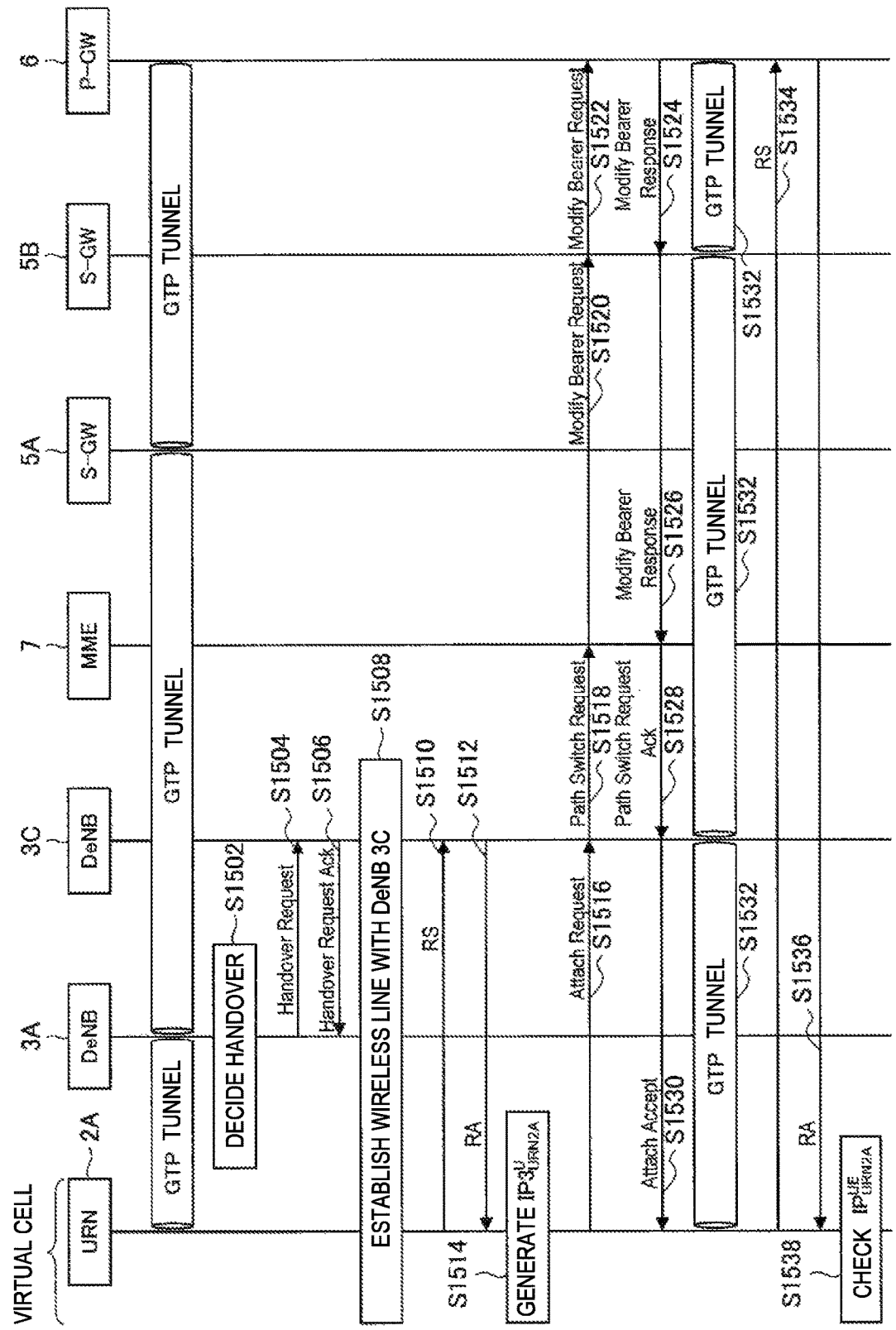
FIG. 45 is an explanatory diagram of technical features in the embodiment.

FIG. 45 is a sequence diagram illustrating an example of a flow of handover processing to the DeNB 3C performed by the URN 2A according to the embodiment. The URN 2A, the DeNB 3A, the DeNB 3C, the MME 7, the S-GW 5A, the S-GW 5B, and the P-GW 6 are involved in the sequence.

As illustrated in FIG. 45, the DeNB 3A decides to execute handover to the DeNB 3C by the URN 2A first (Step S1502).

Then, the DeNB 3A transmits a handover request to the DeNB 3C (Step S1504). The handover request includes $ID_{URN2A}$.

Next, the DeNB 3C transmits a handover request ACK to the DeNB 3A (Step S1506). The handover request ACK includes $ID_{URN2A}$.

Then, the URN 2A establishes a wireless line with the DeNB 3C (Step S1508).

Next, the URN 2A transmits RS directed to a link local all-router multiple-cast address (Step S1510). The source address of the RS is a link local address of the URN 2A.

Then, the DeNB 3C receives the RS, and then transmits RA directed to the link local address of the URN 2A (Step S1512). The RA includes higher 64 bits (prefix) of $IP^D_{DeNB3C}$.

Next, the URN 2A receives the RA and generates an IPv6 address $IP3^U_{URN2A}$ (Step S1514). The $IP3^U_{URN2A}$ is used when the URN 2A establishes a GTP tunnel with the DeNB 3C.

Then, the URN 2A transmits an attachment request to the DeNB 3C (Step S1516). The attachment request includes the identifier $ID_{URN2A}$, $IP3^U_{URN2A}$, and $IP^{UE}_{URN2A}$ of the URN 2A.

Next, the DeNB 3C receives the attachment request and transmits a path switch request to the MME 7 (Step S1518). The path switch request includes $ID_{URN2A}$, $IP3^U_{URN2A}$, and $IP^{UE}_{URN2A}$.

Then, the MME 7 receives the path switch request and transmits a bearer modification request to the S-GW 5B (Step S1520). The bearer modification request includes $ID_{URN2A}$, $IP3^U_{URN2A}$, and $IP^{UE}_{URN2A}$.

Next, the S-GW 5B receives the bearer modification request and transfers the bearer modification request to the P-GW 6 (Step S1522).

Then, the P-GW 6 receives the bearer modification request, detects that the URN 2A has performed the handover between the S-GW 5A and the S-GW 5B, releases the GTP tunnel established between the P-GW 6 and the S-GW 5A, and forms a GTP tunnel between the P-GW 6 and the S-GW 5B. End points of the GTP tunnel are $IP^D_{PGW6}$ and $IP^U_{SGW5B}$. In addition, the P-GW 6 associates the transfer destination of $IP^{UE}_{URN2A}$ with the GTP tunnel. Then, the P-GW 6 transmits a bearer modification response to the S-GW 5B (Step S1524). The bearer modification response includes $ID_{URN2A}$, $IP3^U_{URN2A}$, $IP^{UE}_{URN2A}$, and entries with a route URN of URN 2A in the mapping table.

Next, the S-GW 5B receives the bearer modification response and forms a GTP tunnel between the P-GW 6 and the S-GW 5B. End points of the GTP tunnel are $IP^U_{SGW5B}$ and $IP^D_{PGW6}$. Further, the S-GW 5B forms a GTP tunnel with the DeNB 3C. End points of the GTP tunnel are $IP^D_{SGW5B}$ and $IP^U_{DeNB3C}$. Next, the S-GW 5B registers the mapping table entry included in the bearer modification response in the mapping table of the S-GW 5B itself. Further, the S-GW 5B associates the transfer destination of $IP^{UE}_{URN2A}$ with the GTP tunnel to the DeNB 3C. Next, the S-GW 5B transfers the bearer modification response to the MME 7 (Step S1526). The bearer modification response includes $ID_{URN2A}$, $IP3^U_{URN2A}$, $IP^{UE}_{URN2A}$, lower 64 bits (if-id) of $IP^{UE}_{URN2A}$, and entries with a route URN of URN 2A in the mapping table.

Then, the MME 7 receives the bearer modification response and transmits a path switch request ACK to the DeNB 3C (Step S1528). The path switch request ACK includes $ID_{URN2A}$, $IP3^U_{URN2A}$, $IP^{UE}_{URN2A}$, lower 64 bits (if-id) of $IP^{UE}_{URN2A}$, and entries with a route URN of URN 2A in the mapping table of the S-GW 5B.

Next, the DeNB 3C receives the path switch request ACK and forms a GTP tunnel between the DeNB 3C and the S-GW 5B. End points of the GTP tunnel are $IP^U_{DeNB3C}$ and $IP^D_{SGW5B}$. Further, the DeNB 3C forms a GTP tunnel with the URN 2A. End points of the GTP tunnel are $IP^D_{DeNB3C}$ and $IP^U_{URN2A}$. Next, the DeNB 3C registers mapping table entries included in the pas switch request ACK in the mapping table of the DeNB 3C itself. Further, the DeNB 3C associates the transfer destination of $IP^{UE}_{URN2A}$ with the GTP tunnel to the URN 2A. Next, the DeNB 3C transfers attachment acceptance to the URN 2A (Step S1530). The attachment acceptance includes the lower 64 bits (if-id) of $IP^{UE}_{URN2A}$.

As a result of the aforementioned processing, the GTP tunnels are established among the URN 2A, the DeNB 3C, the S-GW 5B, and the P-GW 6 (Step S1532).

Then, the URN 2A receives the attachment acceptance and transmits RS to the P-GW 6 in order to obtain an IPv6 address for operating as a UE (Step S1534).

Next, the P-GW 6 receives the RS and transmits RA to the URN 2A (Step S1536). The RA includes the higher 64 bits (prefix) of $IP^{UE}_{URN2A}$.

Then, the URN 2A receives the RA and confirms that $IP^{UE}_{URN2A}$ is available (Step S1538).

As a result, the P-GW 6, the S-GW 5B, and the DeNB 3C store the mapping tables illustrated in Tables 17, 18, and 19, respectively.

TABLE 17

(Mapping table stored in P-GW 6)

| End point IPv6 address | Transfer destination | Route URN |
|---|---|---|
| $IP^{UE}_{URN2A}$ | $GTP_{SGW5B}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

TABLE 18

(Mapping table stored in S-GW 5B)

| End point IPv6 address | Transfer destination | Route URN |
|---|---|---|
| $IP^{UE}_{URN2A}$ | $GTP_{DeNB3C}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

TABLE 19

(Mapping table stored in DeNB 3C)

| End point IPv6 address | Transfer destination | Route URN |
|---|---|---|
| $IP^{UE}_{URN2A}$ | $GTP_{URN2A}$ | — |
| $Pref_{URN2A}$ | See $IP^{UE}_{URN2A}$ | $ID_{URN2A}$ |
| $IP_{UE1A}$ | See $IP^{UE}_{URN2A}$ | $ID_{URN2A}$ |
| $IP^{UE}_{URN2C}$ | See $IP^{UE}_{URN2A}$ | $ID_{URN2A}$ |
| $Pref_{URN2C}$ | See $IP^{UE}_{URN2A}$ | $ID_{URN2A}$ |
| $IP^{UE}_{URN2D}$ | See $IP^{UE}_{URN2A}$ | $ID_{URN2A}$ |
| $Pref_{URN2D}$ | See $IP^{UE}_{URN2A}$ | $ID_{URN2A}$ |
| $IP^{UE}_{UE1E}$ | See $Pref_{URN2D}$ | $ID_{URN2A}$ |

The above mapping tables will be described. If Tables 14 and Table 17 are compared, the transfer destination of the entry on the first row changes from "$GTP_{SGW5A}$" to "$GTP_{SGW5B}$". That is, the P-GW 6 may update only the entry on the first row in the mapping table for the handover over the S-GW 5. If Table 15 and Table 18 are compared, the transfer destination of the entry on the first row is changed from "$GTP_{DeNB3B}$" to "$GTP_{DeNB3C}$". The entry on the first row in the mapping table in Table 18 is registered by the S-GW 5B. Meanwhile, entries with description of "$ID_{URN2A}$" in the section of the route URN in the mapping table illustrated in Table 18, that is, all the entries in and below the second row are taken over through the handover. That is, the S-GW 5B can omit a part of the processing of generating the mapping table by taking over the mapping table during the handover. If Table 16 and Table 19 are compared, these tables are the same. The entry on the first row in the mapping table illustrated in Table 19 is registered by the DeNB 3C. Meanwhile, entries with description of "$ID_{URN2A}$" in the section of the route URN in the mapping table illustrated in Table 19, that is, all the entries in and below the second row is taken over through the handover. That is, the DeNB 3C can omit a part of the processing of generating the mapping table by taking over the mapping table during the handover. In this manner, it is possible to significantly reduce signaling or position registration and the like of the subordinate UEs 1 of the URN 2 since resetting of the transfer destination is completed by updating or taking over a small part of the mapping table even for the handover over the S-GW 5.

<4.3. Effects>

Hereinafter, main effects of the aforementioned protocol will be described.

For example, the aforementioned protocol is a protocol adapted to a 3GPP architecture. For example, functions assigned to the P-GW, the S-GW, the MME, the eNB, the DeNB, the RN, and the UE are maintained. In addition, interfaces defined among these devices are maintained. In addition, message sequences defined among these devices are maintained.

In addition, the UE1 that has already acquired the IPv6 address can continue communication even after the connection to the virtual cell.

In addition, the DHCP-PD is used in the protocol. In this manner, it is possible to realize the nested virtual cell. In addition, the amount of information to be stored in the P-GW 6, the S-GW 5, or the DeNB 3 does not depend on the number of UEs 1 or URNs 2 that have obtained IPv6 addresses in the virtual cell by using the DHCP-PD.

In addition, the mapping tables are utilized in the protocol. In this manner, the number of items to be updated when the virtual cell performs handover decreases. In addition, only the URN 2 performs signaling when the URN 2 performs handover between the DeNBs 3. In this manner, the subordinate UEs 1 and the like of the URN 2 are prevented from individually performing signaling, and the amount of signaling is suppressed during the handover.

In addition, signaling traffic during the handover of the URN 2 does not increase depending on the number of UEs 1 or the URNs 2 that have obtained the IPv6 addresses in the virtual cell.

In addition, the URN 2 can collectively perform registration of a plurality of UEs or the URNs 2 connected to the virtual cell in the MME 7 instead of registering them one by one. In this manner, it is possible to suppress the number of signaling packets.

In addition, it is possible to state that a route of communication performed by the UEs 1 and the URN 2 in the 3GPP network includes no detour routing and is optimal.

In addition, no tunneling is used other than the tunneling defined by 3GPP in this protocol. Accordingly, header overhead does not increase when this protocol is introduced.

<<5. Use Case>>

The aforementioned protocol can be applied to a variety of use cases.

(1) Realization of Network Service During Movement

In a case in which the URN 2 is mounted on a public transportation such as a bus or a train, for example, the URN 2 can solve discontinuity and the like of access, which accompany the movement, by providing local content to the UEs 1 of the passengers from a server that is connected to the URN 2. In addition, it is possible to realize moving transmittivity for services from the DeNB 3 to which the URN 2 is connected or a server connected to an entity on a core network. The server connected to the URN 2 is effectively used for services that require a short delay time. In addition, in a case in which a nested virtual cell formed by a URN 2 of a passenger is connected to the URN 2 mounted on the public transportation, continuity of the nested virtual cell to the network is continued by only the URN 2 of the passenger performing connection processing. Since a situation in which all the UEs 1 on board perform processing of establishing connection to the network is avoided, an improvement in wireless utilization efficiency is realized.

(2) Improvement in Wireless Utilization Efficiency in Environment in which UEs 1 are Crowded In an environment in which the density of the UEs 1 is significantly high, such as in downtown or during an event, the improvement in the wireless utilization efficiency is realized, and more UEs 1 can be accommodated by providing the UEs 1 RN functions and realizing moving transmittivity of other UEs in the surroundings.

(3) Application to Security System

It is possible to provide an advanced security system to a moving environment by a camera being connected to the URN 2 that is mounted on a moving transportation. For example, an advanced security system is realized by accumulating captured images in a server connected to the URN 2, performing data analysis thereon, and as needed, performing, by the URN 2, communication with an entity in the core network or a calculation resource on the cloud.

(4) Realization of Dynamic Operating Service of Cognitive Wireless System

A cognitive wireless system is a system that provides an access network utilizing frequencies by utilizing frequency database for managing available frequencies for the respective areas. For example, it is considered that functions as an access point (that is, a base station) of the cognitive wireless system are mounted on the URN 2. In that case, the URN 2 can specify an available frequency at a current position from the frequency database by utilizing location information (GPS information, wireless base station information, or the like) and then provides a virtual cell by utilizing the frequency. In addition, it also becomes possible to provide a network access service via the URN 2 or a device-to-device (D2D) communication service between the UE 1 and the UE 1 or between the URN 2 and the UE 1.

(5) Realization of Dynamic Operating Services by Drone

It is possible to provide wireless services to various device groups in a flight area by mounting functions of the URN 2 providing a virtual cell on a drone. The drone that functions as the URN 2 will also be referred to as a king drone in the following description. The king drone may have a function of a cognitive wireless system and may specify an available frequency in a flying area through communication with a frequency database. The device groups connected to the virtual cell may be sensor devices, for example. In regard to agriculture, for example, a geographical feature sensor, a temperature sensor, a humidity sensor, a maturity sensor, and the like may be arranged in a vegetable farm, a king drone may flow above the farm, and network layer IP addresses may be assigned to the group of sensor devices. Then, the king drone may acquire sensor information from the group of sensor devices every time the king drone flies over the area and may relay the sensor information to a server on a cloud. Also, in regard to areas in which people gather in limited periods, such as an event site or a swimming beach, a king drone may fly over the area, assign network layer IP addresses to LTE devices in the area, and provide services in corporation with applications on the terminals. The king drone may invalidate (that is, recover) the distributed network layer IP addresses after end of the period of the event and the like.

(6) Realization of in-Vehicle Sensor System

It is possible to collect sensor information acquired by various sensors (a road surface sensor, a radar, and the like) for monitoring the inside or the outside of a vehicle and to accumulate and analyze the sensor information in the vehicle by mounting the functions of the URN 2 on the vehicle. In addition, the URN 2 may be connected to the server on a cloud as needed and perform more advanced analysis processing in corporation with big data and the like. It is possible to feed back the analysis service to the vehicle, the URN 2, or the sensor even during the movement of the vehicle by realizing moving transmittivity of the virtual cell.

(7) Realization of Long-Distance Wireless Connection Service

An increase in coverage is expected by realizing the virtual cells with the nested structure and through so-called multiple-hop connection (that is, connection of the virtual cells in series in a row), in which hops of URN2-UE1 are connected in series in a row.

6. APPLICATION EXAMPLES

The technology of the present disclosure can be applied to various products. For example, the P-GW 6 may be realized as a server of any type such as a tower server, a rack server, a blade server, or the like. In addition, at least some of these constituent elements of the P-GW 6 may be implemented by a control module mounted in a server (e.g., an integrated circuit module configured in one die or a card or a blade inserted into a slot of a blade server).

In addition, the UE 1 or the URN 2 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the UE 1 or the URN 2 may be realized as a terminal that performs machine-to-machine (M2M) communication (also referred to as a machine type communication (MTC) terminal). Furthermore, at least some of these constituent elements of the UE 1 or the URN 2 may be implemented by a module mounted in such a terminal (for example, an integrated circuit module configured in one die).

6.1. Application Example with Regard to Communication Control Device

Figure 46:
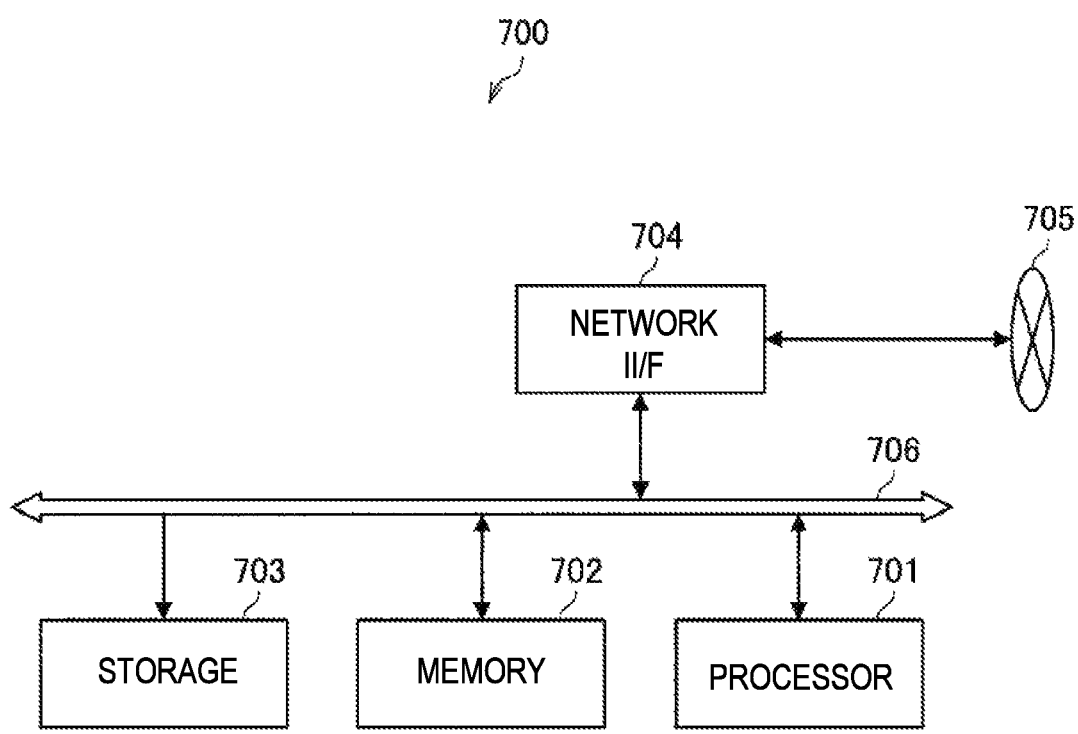
FIG. 46 is a block diagram illustrating an example of a schematic configuration of a server.

FIG. 46 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 46, one or more constituent elements included in the P-GW 6 described with reference to FIG. 11 (the communication control unit 631) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

In addition, in the server 700 shown in FIG. 46, the network communication unit 610 described, for example, with reference to FIG. 11 may be implemented by the network interface 704. Moreover, the storage unit 620 may be implemented by the memory 702 and/or the storage 703.

6.2. Application Example with Regard to Terminal Device and Relay Device

First Application Example

Figure 47:
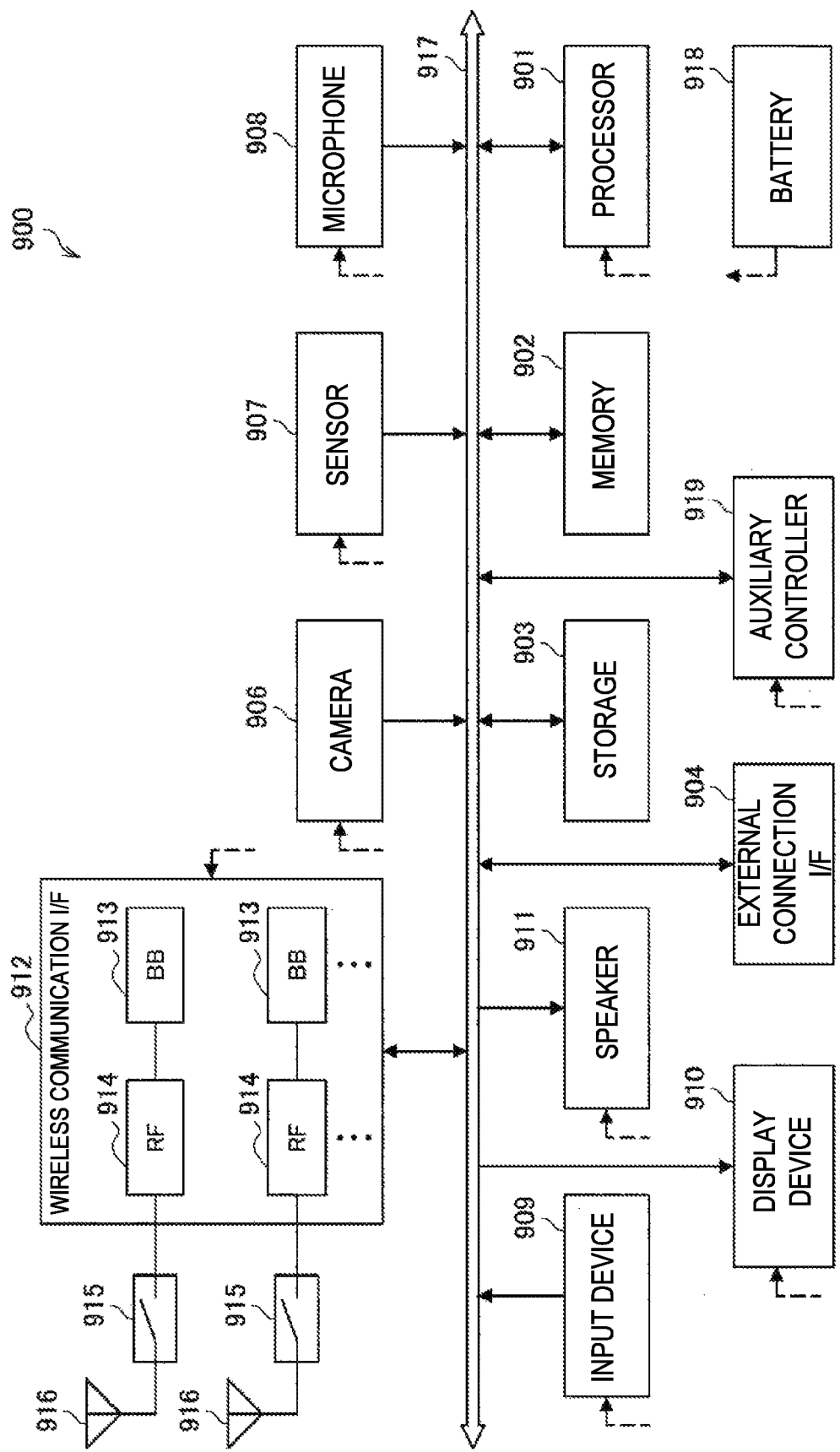
FIG. 47 is a block diagram illustrating an example of a schematic configuration of a smartphone.

FIG. 47 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 47. Although FIG. 47 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 47. Although FIG. 47 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 47 via feeder lines, which are partially shown as dashed lines in the figure. The auxiliary controller 919 operates a minimum necessary function of the smartphone 900, for example, in a sleep mode.

In the smartphone 900 shown in FIG. 47, one or more constituent elements included in the UE 1 (the communication control unit 141) described with reference to FIG. 9, or one or more constituent elements included in the URN 2 (the relay unit 241 and/or the communication control unit 243) described with reference to FIG. 10 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 47, the wireless communication unit 120 described with reference to FIG. 9, or the wireless communication unit 220 described with reference to FIG. 10, for example, may be implemented by the wireless communication interface 912 (for example, the RF circuit 914). Moreover, the antenna unit 110 or the antenna unit 210 may be implemented by the antenna 916. Moreover, the storage unit 130 or the storage unit 230 may be implemented by the memory 902.

Second Application Example

Figure 48:
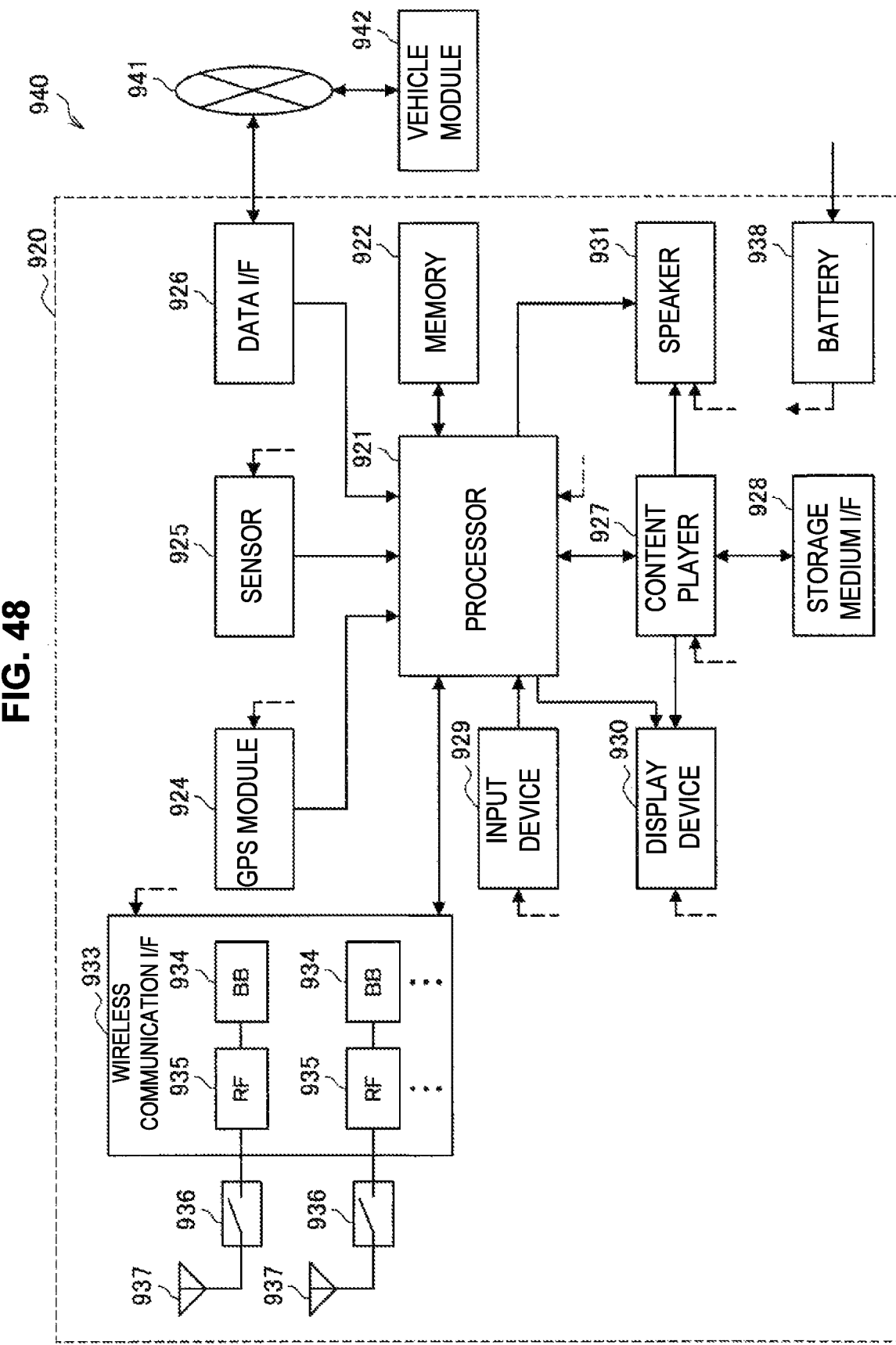
FIG. 48 is a block diagram illustrating an example of a schematic configuration of a car navigation device.

FIG. 48 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 48. Although FIG. 48 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 48. Although FIG. 48 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 48 via feeder lines that are partially shown as dashed lines in the figure. The battery 938 accumulates power supplied form the vehicle.

In the car navigation device 920 shown in FIG. 48, one or more constituent elements included in the UE 1 (the communication control unit 141) described with reference to FIG. 9, or one or more constituent elements included in the URN 2 (the relay unit 241 and/or the communication control unit 243) described with reference to FIG. 10 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 48, the wireless communication unit 120 described with reference to FIG. 9, or the wireless communication unit 220 described with reference to FIG. 10, for example, may be implemented by the wireless communication interface 933 (for example, the RF circuit 935). Moreover, the antenna unit 110 or the antenna unit 210 may be implemented by the antenna 937. Moreover, the storage unit 130 or the storage unit 230 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the communication control unit 141, or the relay unit 241 and the communication control unit 243. The vehicle module 942 generates vehicle data such as vehicle speed, engine speed, and trouble information, and outputs the generated data to the in-vehicle network 941.

7. CONCLUSION

The embodiment of the present disclosure has been described above with reference to FIGS. 1 to 48. As described above, the URN 2 according to the embodiment assigns the network layer IP address, which has a prefix portion that is at least partially common, to each of the one or more second devices while relaying the wireless signals between the first device that is the connection destination and the one or more subordinate second devices. In this manner, IP moving transmittivity in the virtual cell is realized, and it becomes possible to suppress the amount of information to be stored in the P-GW 6, the S-GW 5, or the DeNB 3 for the URN 2 or the subordinate second devices.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the processing described by using the flowcharts and the sequence diagrams in this specification may not be necessarily executed in the orders described in the drawings. Some processing steps may be executed in parallel. In addition, additional processing steps may be employed, and a part of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A relay device including:

a relay unit that relays a wireless signal between a first device that is a connection destination and one or more subordinate second devices; and a control unit that assigns a network layer IP address, which has a prefix portion that is at least partially common, to each of the one or more second devices.

(2)

The relay device according to (1), in which a transmission path set between the relay device and a packet data network gateway (P-GW) is diverted for a section between the relay device and the P-GW in a transmission path set between the second devices and the P-GW.

(3)

The relay device according to (2), in which the transmission path is a bearer.

(4)

The relay device according to (2) or (3), in which the transmission path is an IP flow.

(5)

The relay device according to any one of (1) to (4), in which the control unit notifies the second devices of information indicating that the relay device is to start handover.

(6)

The relay device according to (5), in which the control unit notifies the second devices of information indicating that the relay device has completed the handover.

(7)

The relay device according to any one of (1) to (6), in which each virtual cell formed by the relay device or another relay device is identified by a non-common portion of the prefix portion.

(8)

The relay device according to any one of (1) to (7), in which the prefix portion is a subnet prefix in IPv6.

(9)

The relay device according to any one of (1) to (8), in which the control unit assigns the network layer IP address to the relay device.

(10)

A terminal device including:

a processing unit that performs communication with a relay device by using a first network layer IP address, which is assigned to one or more terminal devices connected to the same relay device, and has a prefix portion that is at least partially common.

(11)

The terminal device according to (10), in which the processing unit suppresses a procedure for attachment to another network for a predetermined period of time after the relay device starts handover.

(12)

The terminal device according to (10) or (11), further including:

a storage unit that stores a clock time at which a procedure for attachment to the relay device has been completed.

(13)

The terminal device according to (12), in which the processing unit uses the first network layer IP address for a socket that is opened after the clock time at which the procedure for attachment to the relay device has been completed and continuously uses a second network layer IP address assigned before the handover for a socket that is opened before the clock time at which the procedure for attachment to the relay device has been completed.

(14)

The terminal device according to (13), in which the processing unit notifies the relay device of information indicating that the socket, for which the second network layer IP address has been used, has been closed.

(15)

A communication control device including:

a processing unit that notifies a relay device that relays a wireless signal between a first device that is a connection destination and one or more subordinate second devices and assigns a network layer IP address, which has a prefix portion that is at least partially common, to each of the one or more second devices of the common portion of the prefix portion.

(16)

The communication control device according to (15), further including:

a storage unit that stores the prefix portion in association with the relay device.

(17)

The communication control device according to (15) or (16), in which the processing unit notifies a device that relays communication between the relay device and the communication control device of information for associating the prefix portion with the relay device.

(18)

A method including:

relaying a wireless signal between a first device that is a connection destination and one or more subordinate second devices; and a control unit that assigns a network layer IP address, which has a prefix portion that is at least partially common, to each of the one or more second devices by a processor.

(19)

A method including:

performing, by a processor, communication with a relay device by using a first network layer IP address, which is assigned to one or more terminal devices connected to the same relay device, and has a prefix portion that is at least partially common.

(20)

A method including:

notifying, by a processor, a relay device that relays a wireless signal between a first device that is a connection destination and one or more subordinate second devices and assigns a network layer IP address, which has a prefix portion that is at least partially common, to each of the one or more second devices of the common portion of the prefix portion.

REFERENCE SIGNS LIST

1 UE
2 URN
3 DeNB
4 eNB
5 S-GW
6 P-GW
7 MME
8 HSS
9 PCRF
10 PDN
110 antenna unit
120 wireless communication unit
130 storage unit
140 processing unit
141 communication control unit
210 antenna unit
220 wireless communication unit
230 storage unit
240 processing unit
241 relay unit
243 communication control unit
610 network communication unit
620 storage unit
630 processing unit
631 communication control unit

The invention claimed is:

1. A terminal device comprising:

a processing unit that performs communication with a relay device by using a first network layer IP address, which is assigned to one or more terminal devices connected to the same relay device, and has a prefix portion that is at least partially common; and a storage unit that stores a clock time at which a procedure for attachment to the relay device has been completed, wherein the processing unit uses the first network layer IP address for a socket that is opened after the clock time at which the procedure for attachment to the relay device has been completed and continuously uses a second network layer IP address assigned before the handover for a socket that is opened before the clock time at which the procedure for attachment to the relay device has been completed.

2. The terminal device according to claim 1, wherein the processing unit suppresses a procedure for attachment to another network for a predetermined period of time after the relay device starts handover.

3. The terminal device according to claim 1, wherein the processing unit notifies the relay device of information indicating that the socket, for which the second network layer IP address has been used, has been closed.

4. A communication control device comprising:

a processing unit that notifies a relay device that relays a wireless signal between a first device that is a connection destination and one or more subordinate second devices and assigns a first network layer IP address, which has a prefix portion that is at least partially common, to each of the one or more second devices of the common portion of the prefix portion; and a storage unit that stores a clock time at which a procedure for attachment to the relay device has been completed, wherein the processing unit uses the first network layer IP address for a socket that is opened after the clock time at which the procedure for attachment to the relay device has been completed and continuously uses a second network layer IP address assigned before the handover for a socket that is opened before the clock time at which the procedure for attachment to the relay device has been completed.

5. The communication control device according to claim 4, wherein the processing unit notifies a device that relays communication between the relay device and the communication control device of information for associating the prefix portion with the relay device.

6. A method comprising:

relaying a wireless signal between a first device that is a connection destination and one or more subordinate second devices; and assigning a network layer IP address, which has a prefix portion that is at least partially common, to each of the one or more second devices by a processor, storing a clock time at which a procedure for attachment to a relay device has been completed, using the first network layer IP address for a socket that is opened after the clock time at which the procedure for attachment to the relay device has been completed, and continuously using a second network layer IP address assigned before the handover for a socket that is opened before the clock time at which the procedure for attachment to the relay device has been completed.

7. A terminal device comprising:
circuitry configured to
communicate with a relay device by using a first network layer IP address, which is assigned to one or more terminal devices connected to the same relay device, and has a prefix portion that is at least partially common; and
store a clock time at which a procedure for attachment to the relay device has been completed,
use the first network layer IP address for a socket that is opened after the clock time at which the procedure for attachment to the relay device has been completed and continuously use a second network layer IP address assigned before the handover for a socket that is opened before the clock time at which the procedure for attachment to the relay device has been completed.

* * * * *